(12) United States Patent
Van Mill et al.

(10) Patent No.: US 9,706,713 B2
(45) Date of Patent: Jul. 18, 2017

(54) GRAIN CART WITH FOLDING AUGER HAVING ADJUSTABLE ELEVATION

(71) Applicant: Unverferth Manufacturing Company, Inc., Kalida, OH (US)

(72) Inventors: Michael D. Van Mill, Shell Rock, IA (US); Ronald J. Schlimgen, Shell Rock, IA (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 79 days.

(21) Appl. No.: 14/642,449

(22) Filed: Mar. 9, 2015

(65) Prior Publication Data
US 2015/0237804 A1 Aug. 27, 2015

Related U.S. Application Data

(63) Continuation-in-part of application No. 14/231,166, filed on Mar. 31, 2014, which is a continuation of
(Continued)

(51) Int. Cl.
*A01D 90/10* (2006.01)
*B60P 1/42* (2006.01)
*B65G 41/00* (2006.01)

(52) U.S. Cl.
CPC ............... *A01D 90/10* (2013.01); *B60P 1/42* (2013.01); *B65G 41/002* (2013.01)

(58) Field of Classification Search
CPC .......... A01D 90/10; B60P 1/42; B65G 41/002
See application file for complete search history.

(56) References Cited

U.S. PATENT DOCUMENTS

| 2,380,840 A | 7/1945 | Hanna |
| 3,035,682 A | 5/1962 | Ferch |

(Continued)

OTHER PUBLICATIONS

Unverferth Manufacturing Co., Inc., Brochure "Reach Up. Reach OUT!" 2009.
(Continued)

*Primary Examiner* — James Keenan
(74) *Attorney, Agent, or Firm* — Rothwell, Figg, Ernst & Manbeck, P.C.

(57) ABSTRACT

According to one aspect, a cart for transporting and conveying agricultural materials is provided. The cart includes a frame and a plurality of wheels coupled with the frame. The cart further includes a bin supported on the frame and including a plurality of bin walls defining a storage space for an agricultural material. The cart further includes a conveyor assembly having an intake end configured to receive agricultural material from the bin and a discharge end configured to discharge agricultural material, the conveyor assembly including a lower conveyor section, an intermediate conveyor section, and an upper conveyor section. The lower conveyor section includes a lower conveyor housing and a lower conveyor extending within the lower conveyor housing, the intermediate conveyor section includes an intermediate conveyor housing, and the upper conveyor section includes an upper conveyor housing and an upper conveyor extending within the upper conveyor housing. The cart further includes a folding assembly coupled to an end of the intermediate conveyor housing and having a fold axis, the folding assembly configured to move the upper conveyor section between a stored position and an operating position. The cart further includes a tilting assembly coupled to an end of the intermediate conveyor housing and having a tilt axis, the tilting assembly configured to pivot the upper conveyor
(Continued)

section relative to the tilt axis when the upper conveyor section is in the operating position.

32 Claims, 48 Drawing Sheets

Related U.S. Application Data application No. 13/190,311, filed on Jul. 25, 2011, now Pat. No. 8,702,368.

(60) Provisional application No. 61/982,693, filed on Apr. 22, 2014.

(56) References Cited

U.S. PATENT DOCUMENTS

| | | | |
|---|---|---|---|
| 3,100,052 A | | 8/1963 | Brernbeck |
| 3,175,676 A | * | 3/1965 | Vander Schaaf ...... B65G 67/24 198/550.1 |
| 3,198,314 A | * | 8/1965 | Duram ................. A01D 90/00 198/589 |
| 3,773,164 A | * | 11/1973 | Bradley ............... B65G 41/002 198/592 |
| 4,119,223 A | | 10/1978 | Flechter |
| 4,411,581 A | | 10/1983 | Niewold |
| 5,538,388 A | | 7/1996 | Bergkamp et al. |
| 5,655,872 A | | 8/1997 | Plotkin |
| 5,733,094 A | | 3/1998 | Bergkamp et al. |
| 5,788,055 A | | 8/1998 | Stewart et al. |
| 5,980,189 A | | 11/1999 | Rubner |
| 6,017,182 A | | 1/2000 | Grieshop |
| 6,042,326 A | | 3/2000 | Thomas et al. |
| 6,113,339 A | * | 9/2000 | Adams ...................... B60P 1/42 198/314 |
| 6,209,880 B1 | | 4/2001 | Turnwald et al. |
| 6,497,546 B2 | | 12/2002 | Wood et al. |
| 6,767,174 B2 | | 7/2004 | Cresswell |
| 6,893,202 B2 | | 5/2005 | Hunt |
| 7,381,131 B1 | | 6/2008 | Harpole |
| 7,393,275 B2 | | 7/2008 | Voss et al. |
| 7,690,499 B2 | | 4/2010 | Smith et al. |
| 8,328,497 B2 | * | 12/2012 | Wood ........................ B60P 1/42 296/26.15 |
| 9,061,834 B2 | | 6/2015 | Mulder et al. |
| 9,090,198 B2 | * | 7/2015 | Engle ........................ B60P 1/42 |
| 9,137,945 B2 | * | 9/2015 | Farley ................ A01D 41/1217 |
| 2013/0259615 A1 | | 10/2013 | Van Mill et al. |
| 2014/0090958 A1 | * | 4/2014 | Mulder .................. B65G 33/32 198/586 |

OTHER PUBLICATIONS

Art's Way Brochure, "Sugar Beet Harvester", 4 pages.
Brent, "Avalanche Grain Can", 1999, 3 pages.

* cited by examiner

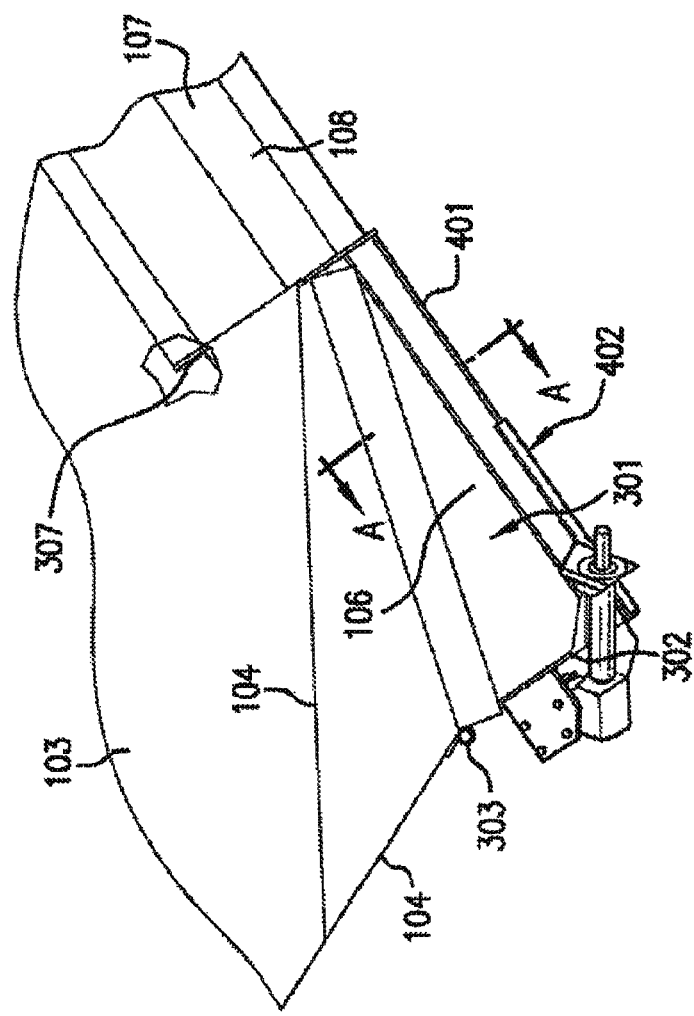
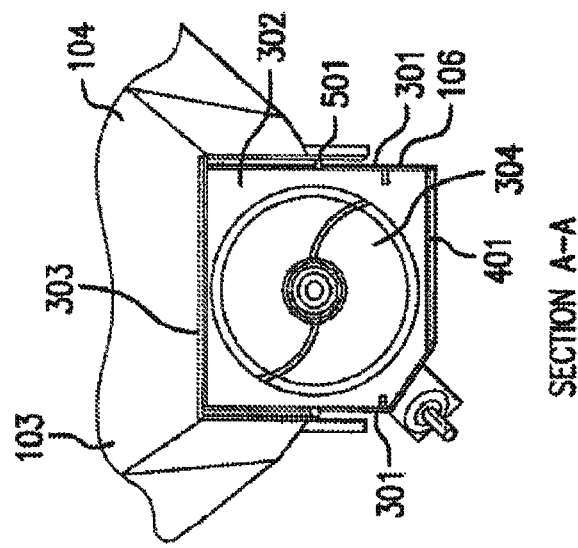

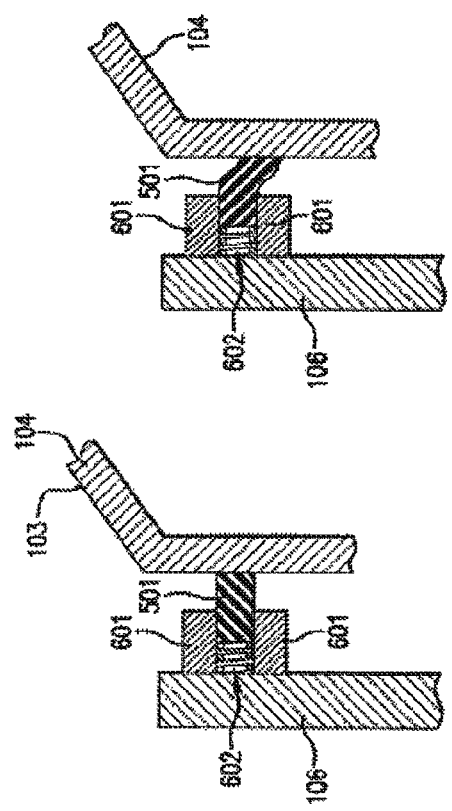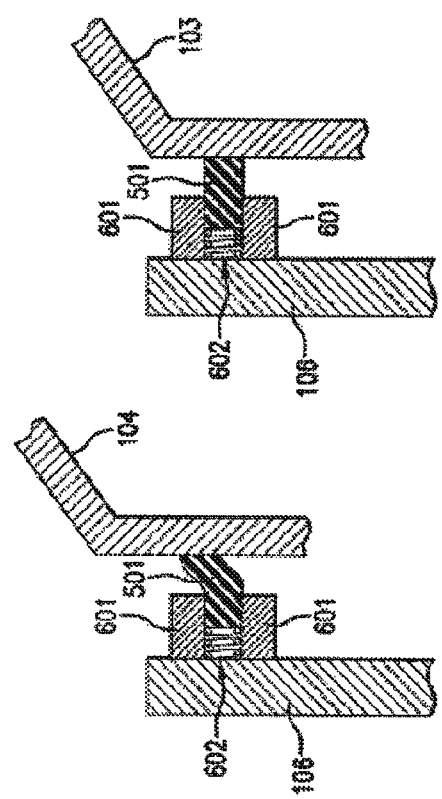

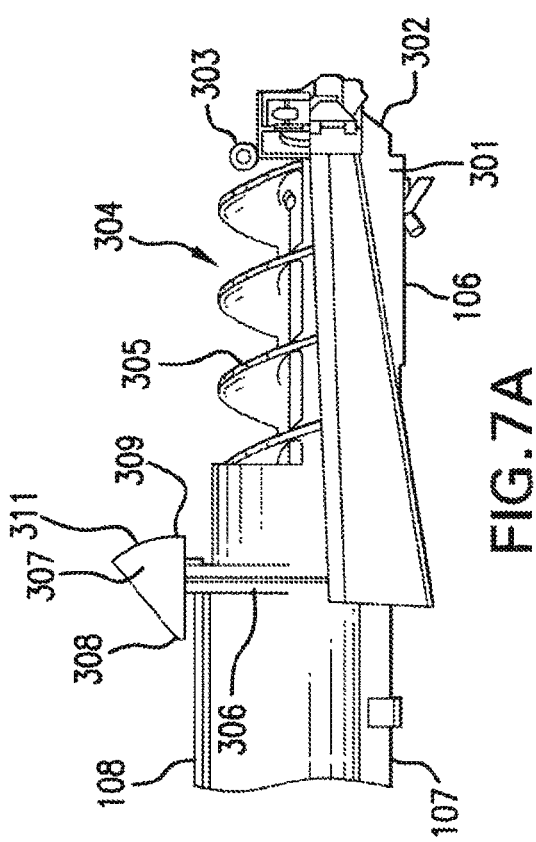
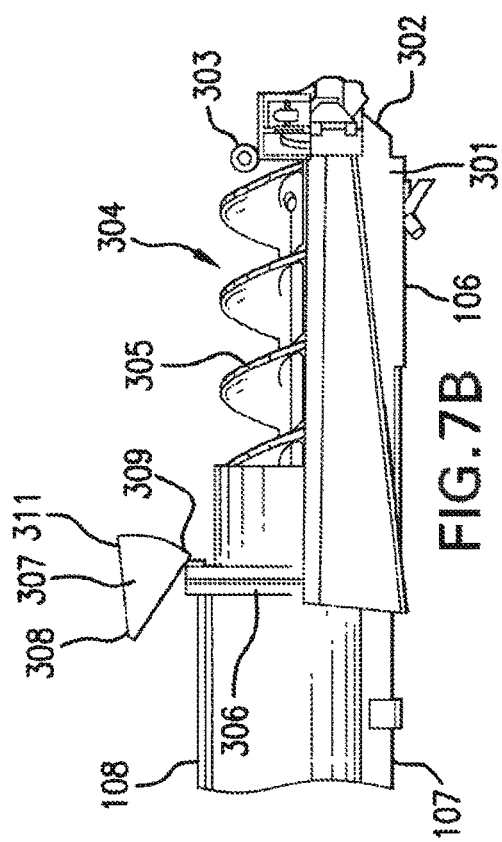

SECTION A-A

SECTION B-B

SECTION C-C

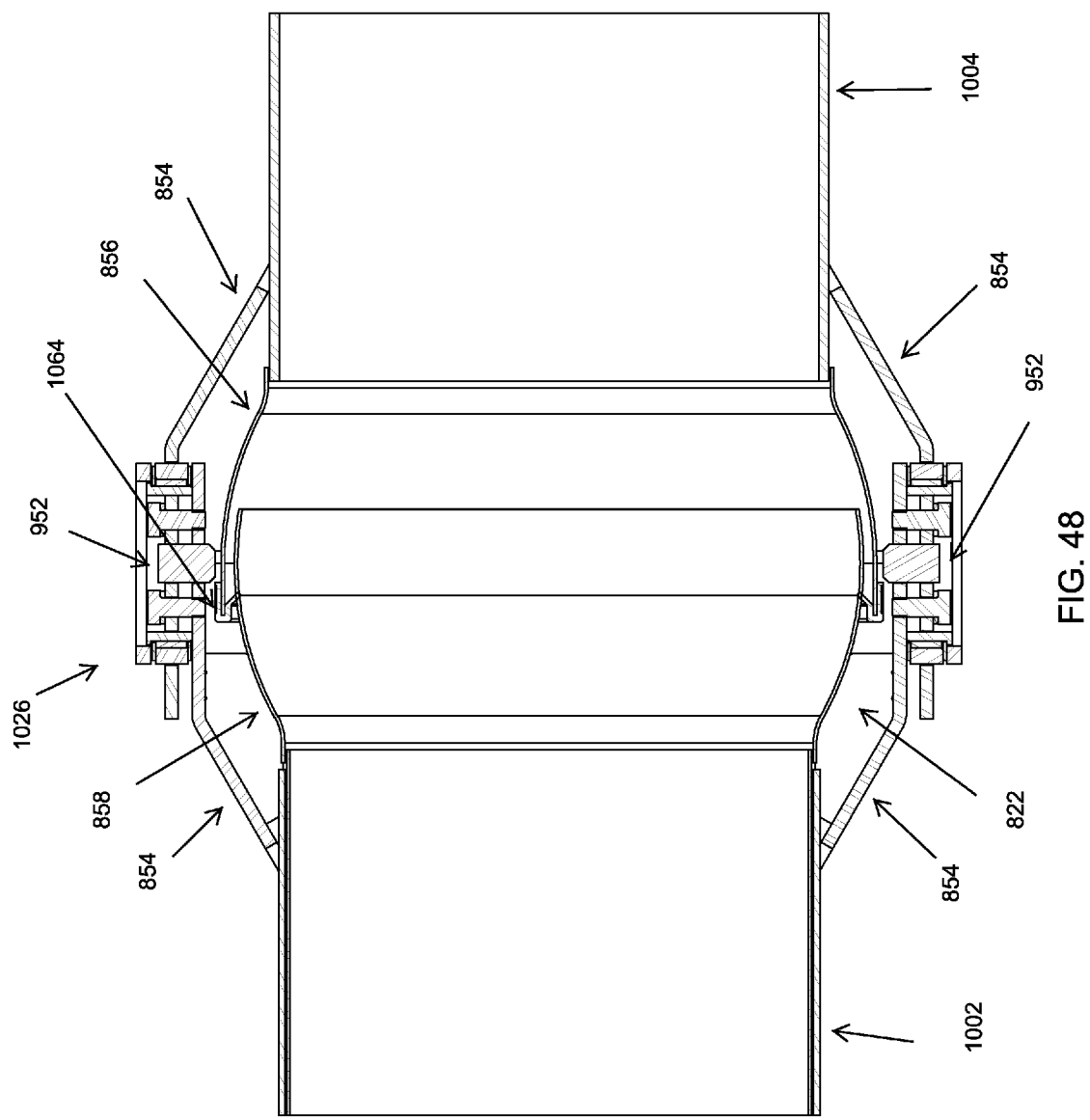

GRAIN CART WITH FOLDING AUGER HAVING ADJUSTABLE ELEVATION

CROSS-REFERENCE TO RELATED APPLICATIONS

This application is a continuation-in-part of U.S. patent application Ser. No. 14/231,166, filed on Mar. 31, 2014, which is a continuation of U.S. patent application Ser. No. 13/190,311, filed on Jul. 25, 2011, now U.S. Pat. No. 8,702,368; and claims the benefit of U.S. Provisional Patent Application Ser. No. 61/982,693, filed on Apr. 22, 2014, which are incorporated herein by reference in their entirety.

BACKGROUND

Field of the Invention

The present invention is generally directed to carts for transporting agricultural materials and specifically directed to a grain cart with a folding auger having adjustable elevation.

Discussion of the Background Art

Carts, such as grain carts, can be used to shorten harvesting time by improving the efficiency of harvesting equipment such as combines. Such carts can, for example, be used to transport grain from harvesters or combines in the field to grain trucks or bins at the side of the field. Carts are often preferred for use compared to grain bins or grain trucks because grain bins are typically immobile and grain trucks typically do not perform well in muddy or rough field conditions and have the potential to spark fires in dry fields. Carts usually comprise a bin (i.e., hopper or box) sitting atop a wheeled frame in combination with an auger means or mechanism for unloading grain from the bin. Carts can be designed to handle soft or rough fields with ease and can be designed to be drawn by a tractor alongside a combine that unloads its contents into the cart. Carts can be used to enable a combine to continue to harvest while unloading the grain into the cart. This grain unloading arrangement can increase productivity dramatically because combines need never stop to unload. In addition, it is not necessary for the combines themselves to travel to grain trucks or bins at the side of the field each time the combine is full. After a cart is loaded with grain or other material by one or more combines, the grain is unloaded from the cart into a bin for temporary storage or into a waiting grain truck for transport to another location, such as a grain elevator. Because carts offer a combination of economy, versatility, production savings, and maneuverability, they have been widely accepted by farmers and widely produced by equipment manufacturers.

Carts capable of unloading grain directly into a grain truck or bin often use a conveyor to do so. Often the conveyor is in the form of an auger. Various auger configurations are known. Auger structures can, for example, be contained inside the hopper structure, located entirely outside of it, or in another desired location. Auger configurations can, for example, have a single auger or multiple augers. The auger structure can, for example, be located at the front, side, back, corner, or another desired location of the cart.

In auger configurations having an auger that extends through the hopper such that there is an auger structure contained inside the hopper structure, grain removal from the hopper can be significantly impaired because internal auger structures can hinder downward grain flow, leak grain into the sump causing a high start-up torque, and lessen the depth of the hopper sump area. Therefore, it is often desirable that the auger structure be located entirely outside of the hopper.

A double auger configuration can have, for example, a lower auger and an upper auger. The lower auger can, for example, receive material from the hopper and deposit it into the upper auger. The upper auger can then, for example, carry the material received from the lower auger and deposit it into a trailer, such as a grain trailer. Triple auger configurations are also known, which can include, for example, a lower, horizontally disposed drag auger, a vertically disposed lift auger, and an upper, horizontally disposed discharge auger.

One type of auger configuration is a corner auger. A corner auger can extend outward and upward from a lowermost portion of the hopper along a corner of the hopper. A folding, auger can, for example, include a retractable section that can be pivoted to a compact, folded position during non-use or travel and to an extended, unfolded position during use.

In some carts, the height at which material is discharged cannot be adjusted to accommodate trailers, trucks and bins of different heights. As a result, these carts could either be incompatible with tall containers or would need to be designed to accommodate the highest container that they would be expected to encounter. However, when such a grain cart is used with a shorter container, a gap between the dispensing end of the auger and the container can be created. Because material, such as grain, can often be light and susceptible to being blown away in windy conditions, such a gap can increase the amount of material that spills from the auger while attempting to unload the material into the container. Therefore, it can often be desirable for the elevation at which a cart discharges material to be adjustable. There exists a need for a cart having an auger, such as a corner auger cart, with adjustable elevation that can efficiently unload material into a container. Several examples of adjustable elevation augers are disclosed in U.S. Publication No. 2010/0254792 ("Grain wagon with external lift auger"), the content of which is hereby incorporated by reference in its entirety.

SUMMARY

The present disclosure provides for a grain cart having a bin for storing agricultural material and a folding conveyor with a unique adjustable elevation configuration for discharging material from the bin. This conveyor configuration can, for example, provide for less damaged grain and more grain visibility provided, while reducing the amount of lost grain. In some embodiments, the grain cart can include a conveyor assembly having an upper conveyor section coupled to a lower conveyor section via an intermediate conveyor section or junction box. The lower conveyor section may include a lower housing containing a first conveyor, such as a first auger, that transports material from the bin through the lower conveyor housing. The upper conveyor section may include an upper housing containing a second conveyor, such as a second auger, that may be releasably coupled to the first conveyor in an extended operating position in which the conveyor assembly is unfolded so as to move material from the first conveyor through the upper conveyor housing and out a discharge end of the conveyor assembly. The intermediate section may include an intermediate housing that is pivotably coupled to the lower conveyor housing to define a pivot joint having a pivot axis allowing the upper conveyor housing to be tilted relative to the lower conveyor housing to allow a discharge end of the conveyor assembly to be raised or lowered. One advantage of such a configuration is that a conveyor assembly can be designed such that it can tilt about a pivot joint at any desired location along the conveyor assembly. For example, the intermediate section can be positioned midway up a conveyor assembly to define a pivot joint that allows a cart incorporating the conveyor assembly to be positioned closer to a trailer or other receptacle when discharging. In some embodiments, the intermediate section can further be designed to define a folding joint where it intersects the upper conveyor section, the folding joint having a fold axis positioned to allow the upper conveyor section to be folded and unfolded relative to the lower conveyor housing (and the intermediate section) between a storage position in which the upper conveyor section is folded back against a side of the bin and an extended or operating position wherein the upper conveyor section extends outwardly of the bin from the intermediate and lower conveyor sections.

In another embodiment, the intermediate conveyor housing is pivotably coupled to the upper conveyor housing to define a pivot joint having a pivot axis allowing the upper conveyor housing to be tilted relative to the lower conveyor housing (and the intermediate housing) to allow a discharge end of the conveyor assembly to be raised or lowered. In some embodiments, the intermediate section can be further configured to define a folding joint where it intersects the lower conveyor section, the folding joint having a fold axis positioned to allow the upper conveyor section (with the intermediate section) to be folded and unfolded relative to the lower conveyor housing between a storage position in which the upper conveyor section is folded back against a side of the bin and an extended or operating position wherein the upper conveyor section extends outwardly of the bin from the lower conveyor section.

According to one aspect, a cart for transporting and conveying agricultural materials is provided. The cart includes a frame and a plurality of wheels coupled with the frame. The cart further includes a bin supported on the frame and including a plurality of bin walls defining a storage space for an agricultural material. The cart further includes a conveyor assembly having an intake end configured to receive agricultural material from the bin and a discharge end configured to discharge agricultural material, the conveyor assembly including a lower conveyor section, an intermediate conveyor section, and an upper conveyor section. The lower conveyor section includes a lower conveyor housing and a lower conveyor extending within the lower conveyor housing; the intermediate conveyor section includes an intermediate conveyor housing; and the upper conveyor section includes an upper conveyor housing and an upper conveyor extending within the upper conveyor housing. The cart further includes a folding assembly coupled to an end of the intermediate conveyor housing and having a fold axis, the folding assembly configured to move the upper conveyor section between a stored position and an operating position. The cart further includes a tilting assembly coupled to an end of the intermediate conveyor housing and having a tilt axis, the tilting assembly configured to pivot the upper conveyor section relative to the tilt axis when the upper conveyor section is in the operating position.

In some embodiments, the intermediate conveyor section is disposed between the upper and lower conveyor sections and the intermediate conveyor section has a first end adjacent the upper conveyor section and a second end adjacent the lower conveyor section. In some embodiments, the fold axis is positioned at the second end of the intermediate conveyor section and the tilt axis is positioned at the first end of the intermediate conveyor section, such that the upper conveyor section is tiltable relative to the intermediate and lower conveyor sections and the upper and intermediate conveyor sections are foldable relative to the lower conveyor section.

In some embodiments, the intermediate conveyor section further includes an intermediate conveyor extending within the intermediate conveyor housing, the intermediate conveyor having a first end connected to the upper conveyor and having a second end configured to mate with the lower conveyor when the upper conveyor section is in the operating position and to detach from the lower conveyor when the upper conveyor section is in the stored position. In some embodiments, the intermediate conveyor is connected to the upper conveyor via a universal joint.

In some embodiments, the tilting assembly includes a curved convex surface on one of the upper and intermediate conveyor housings and a concave surface on the other of the upper and intermediate conveyor housings configured to receive the convex surface and to allow tilting of the upper conveyor section relative to the intermediate conveyor section. In some embodiments, the tilt assembly further includes an elastic seal member engaging one of the convex and concave surfaces to keep material from escaping the conveyor housing. In some embodiments, the tilt assembly includes at least one trunnion extending from one of the upper and intermediate conveyor housings and at least one bearing assembly on the other housing configured to receive the at least one trunnion.

In some embodiments, the tilting assembly includes a linear actuator having one end connected to the upper conveyor section and another end connected to the intermediate conveyor section. In some embodiments, the folding assembly includes a linear actuator having one end connected to the intermediate conveyor section and another end connected to the lower conveyor section. In some embodiments, the folding assembly includes a linear actuator having one end connected to the intermediate conveyor section and another end connected to one of the lower conveyor section and the frame.

In some embodiments, the fold axis is positioned at the first end of the intermediate conveyor section and the tilt axis is positioned at the second end of the intermediate conveyor section, such that the upper and intermediate conveyor sections are tiltable relative to the lower conveyor section and the upper conveyor section is foldable relative to the intermediate and lower conveyor sections. In some embodiments, the intermediate conveyor section further includes an intermediate conveyor extending within the intermediate conveyor housing, the intermediate conveyor having a second end connected to the lower conveyor and having a first end configured to mate with the upper conveyor when the upper conveyor section is in the operating position and to detach from the upper conveyor when the upper conveyor section is in the stored position. In some embodiments, the intermediate conveyor is connected to the lower conveyor via a universal joint.

In some embodiments, the tilting assembly includes a curved convex surface on one of the lower and intermediate conveyor housings and a concave surface on the other of the lower and intermediate conveyor housings configured to receive the convex surface and to allow tilting of the intermediate conveyor section relative to the lower conveyor section. In some embodiments, the tilt assembly further includes an elastic seal member engaging one of the convex and concave surfaces to keep material from escaping the conveyor housing. In some embodiments, the tilt assembly includes at least one trunnion extending from one of the lower and intermediate conveyor housings and at least one bearing assembly on the other housing configured to receive the at least one trunnion. In some embodiments, the tilting assembly includes a linear actuator having one end connected to the lower conveyor section and another end connected to the intermediate conveyor section. In some embodiments, the folding assembly includes a linear actuator having one end connected to the upper conveyor section and another end connected to one of the lower conveyor section, the intermediate conveyor section, and the frame.

In some embodiments, the cart is configured to be pulled by a tractor and the tilt and fold assemblies are configured to be controlled remotely from the tractor by a control system. In some embodiments, the control system is configured to only move the upper conveyor section to the stored position when the upper conveyor section is in a predefined tilt position. In some embodiments, the control system is configured to automatically move the upper conveyor section to a suitable tilt position before moving the upper conveyor section to the stored position.

In some embodiments, the upper conveyor section in the stored position extends along a side of the bin. In some embodiments, the upper conveyor section in the stored position extends along a front of the bin. In some embodiments, the upper conveyor is coupled to the lower conveyor via a universal joint when the upper conveyor section is in the operating position. In some embodiments, the tilt axis and the fold axis are in different planes. In some embodiments, the tilt axis and the fold axis are disposed at opposite ends of the intermediate conveyor section. In some embodiments, the wheels are part of track assemblies comprising continuous belts looped around said wheels.

Other features and advantages of embodiments of the invention will become apparent to those of skill in the art upon reviewing the following detailed description of the preferred embodiments and the accompanying drawings.

BRIEF DESCRIPTION OF THE DRAWINGS

The accompanying drawings, which are incorporated herein and form part of the specification, illustrate embodiments and, together with the detailed description, serve to explain the principles of the invention and to enable a person skilled in the art to make and use the invention. In the drawings, like reference numbers are used to indicate identical or functionally similar elements.

FIG. 4 is side view of an embodiment of a pivoting junction box, auger, auger housing and bin of a cart.

FIG. 5 is a cross-sectional view of an embodiment of a pivoting junction box, auger, auger housing, bin and elastic seal member of a cart.

FIGS. 6A, 6B and 6C are cross-sectional views of an embodiment of a pivoting junction box, bin and elastic seal member and respectively show the elastic seal member when the auger is an intermediate position, elevated position, and lowered position. FIG. 6D is a cross-sectional view of an embodiment of a pivoting junction box, bin and hard seal member and shows the hard seal member when the auger is in an elevated position.

FIGS. 7A and 7B are side views of an embodiment of a pivoting junction box, auger, auger housing and flap of a cart and respectively show the relationship of the flap with a flange of the auger housing when the auger is in an elevated position and in a lowered position.

FIG. 48 is an enlarged cross-sectional view of an embodiment of the conveyor assembly of FIG. 46.

DETAILED DESCRIPTION OF THE PREFERRED EMBODIMENTS

While the present invention may be embodied in many different forms, a number of illustrative embodiments are described herein with the understanding that the present disclosure is to be considered as providing examples and not intended to limit the invention to the preferred embodiments described and/or illustrated herein.

Figure 1A:
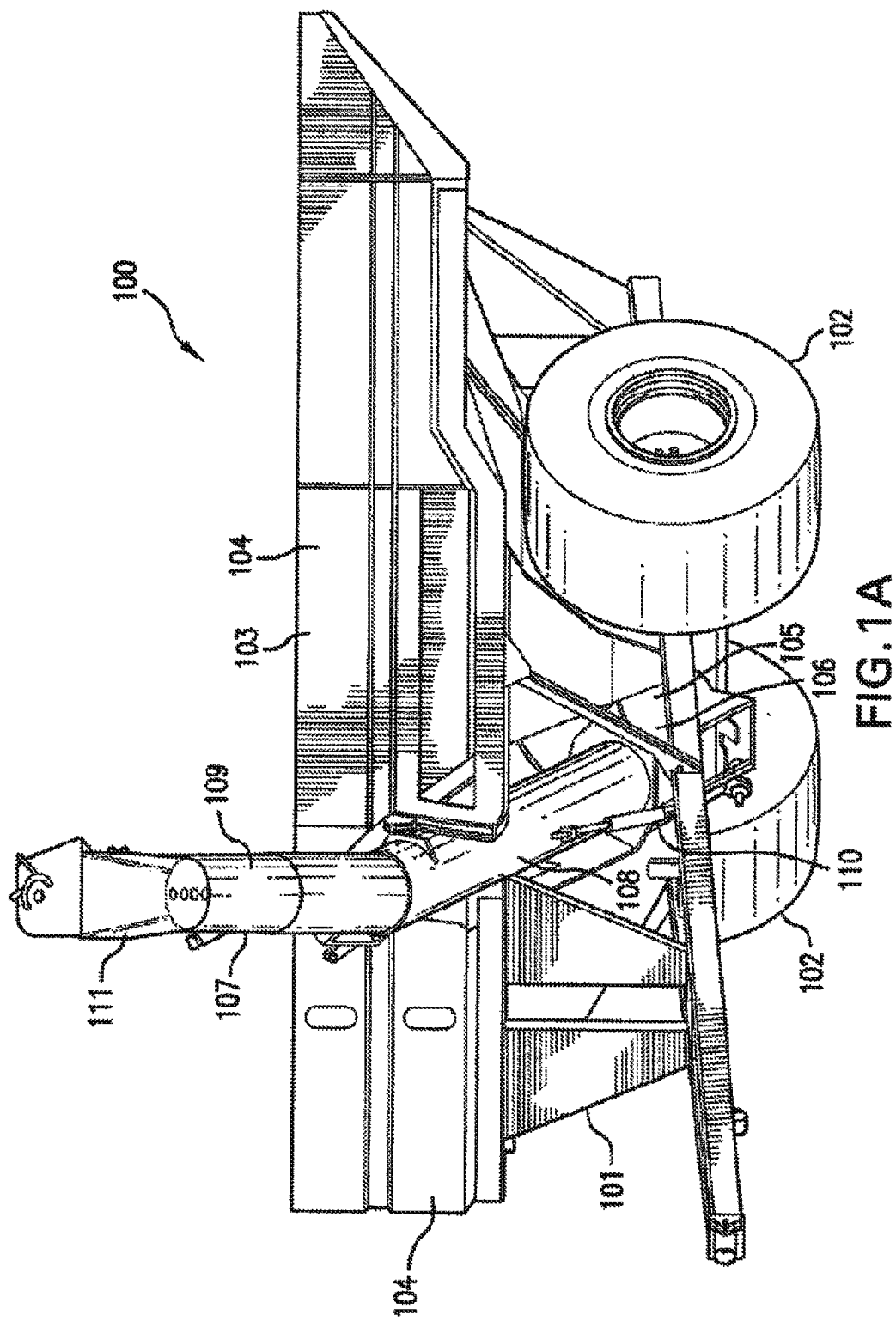
FIG. 1A is a corner view of an embodiment of a cart with an adjustable elevation auger in its elevated position.
Figure 1B:
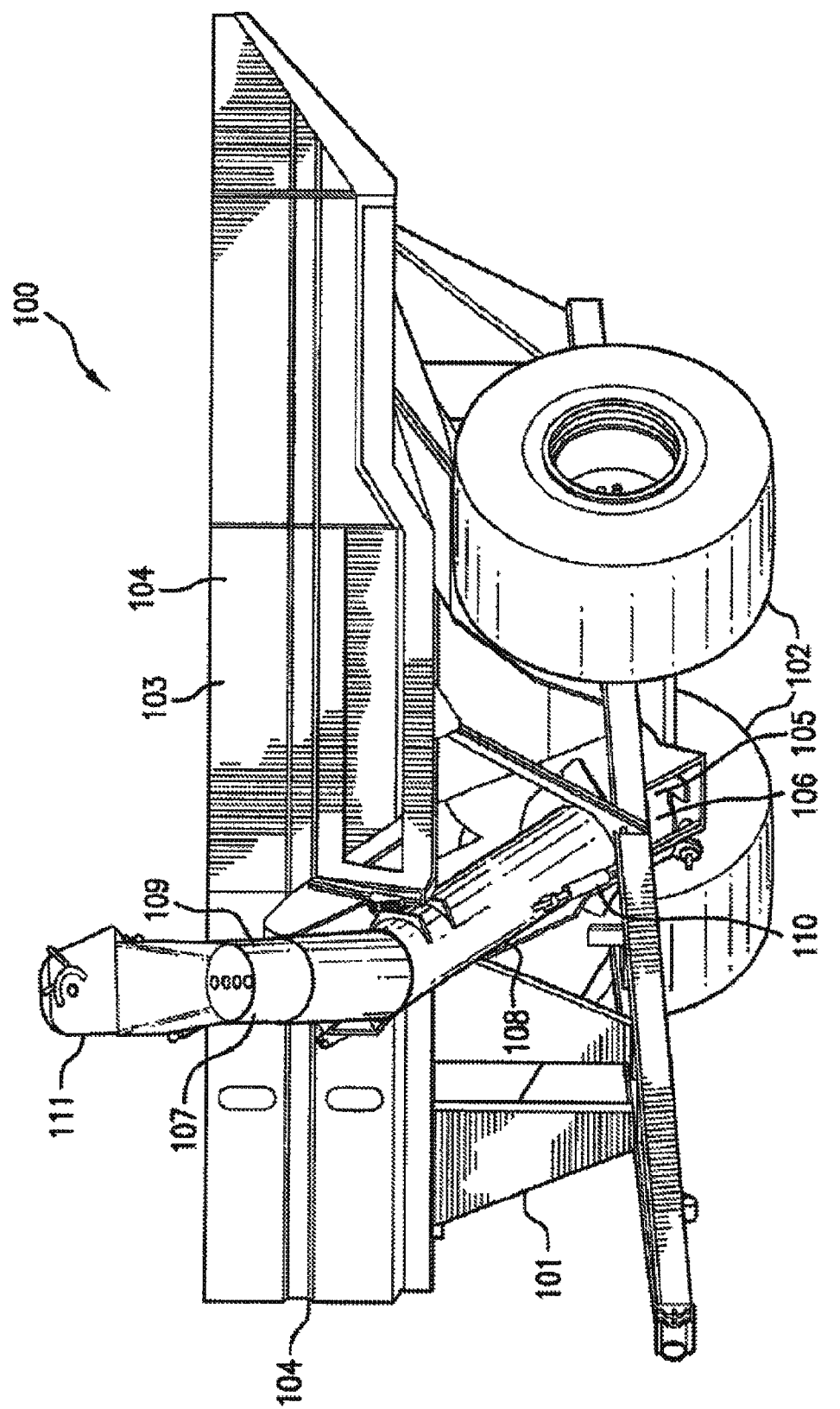
FIG. 1B is a corner view of an embodiment of a cart with an adjustable elevation auger in its lowered position.

FIGS. 1A and 1B illustrate a grain cart 100. Cart 100 has a frame 101 supported by a plurality of wheels 102. Frame 101 supports a bin 103 having a plurality of bin walls 104. The bin walls 104 define a storage space converging at the opening of a sump 105. A junction box 106 is pivotably mounted to bin 103 at the opening of sump 105. An auger housing 107 is connected to and extends upwardly from pivoting junction box 106 along a corner of bin 103.

The auger housing 107 has a lower auger housing 108 and an upper auger housing 109. Lower auger housing 108 is pivotably secured to upper auger housing 109 such that the upper auger housing is pivotable between an extended position, in which said upper auger housing is substantially in alignment with said lower auger housing, and a retracted position, in which said upper auger housing folds along an outer surface of bin 103. For example, in the retracted position, the upper auger housing may be disposed along the outer surface of bin 103 in a substantially horizontal direction.

Figure 2:
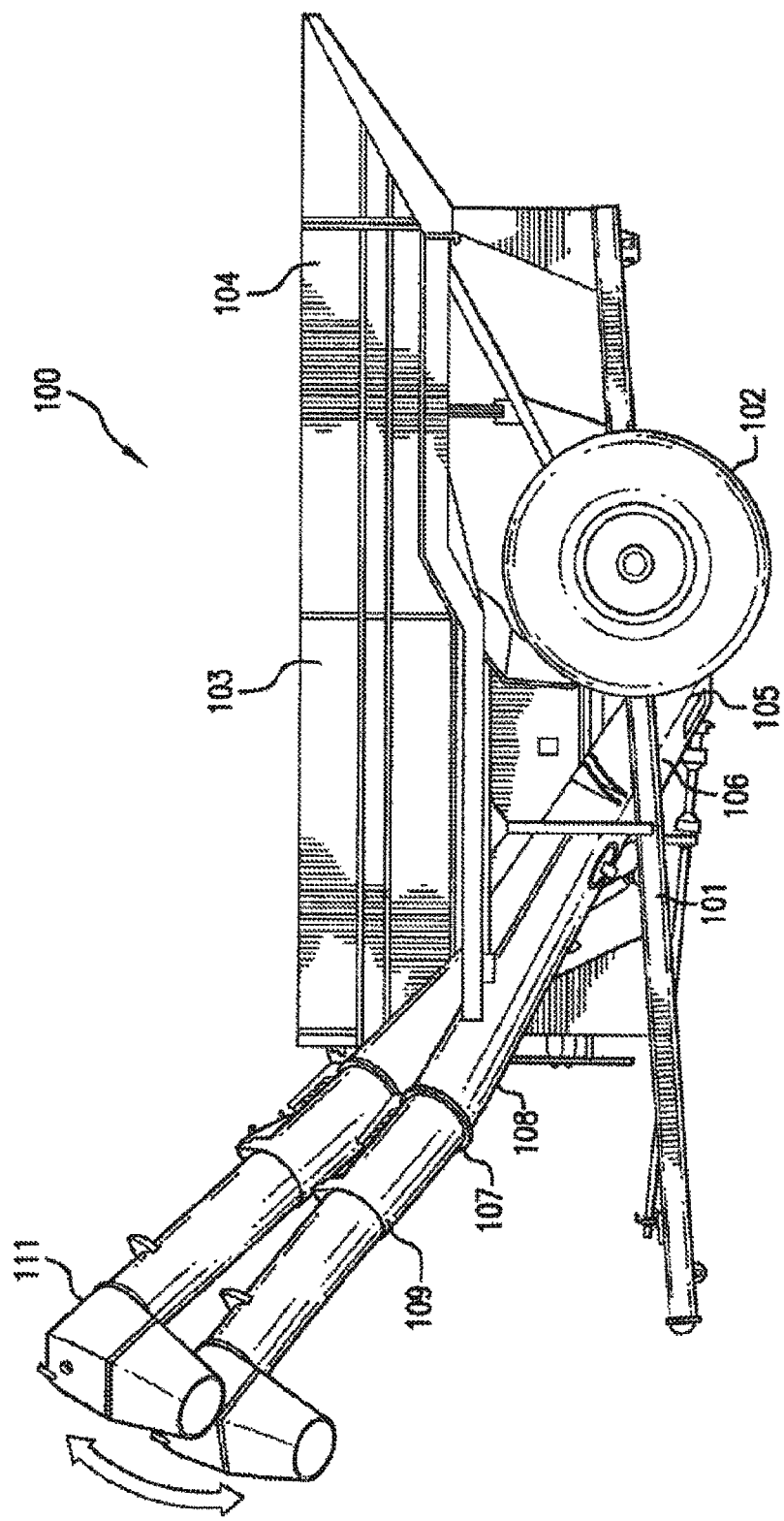
FIG. 2 is a side view of an embodiment of a cart showing the adjustable elevation auger in both its elevated and lowered positions.

A lift assembly 110 is connected between auger housing 107 and frame 101 and is movable to cause the auger housing 107 to pivot with pivoting junction box 106 between an elevated position, as shown in FIG. 1A, and a lowered position, as shown in FIG. 1B. Furthermore, FIG. 2 illustrates a side view of the cart 100 with the auger housing 107 both in its elevated and lower positions. Lift assembly 110 may include, for example, a piston.

Cart 100 may be configured to be pulled by a tractor, and lift assembly 110 may be configured to be controlled remotely from a cab of the tractor. Bin 103 may be configured to hold material, such as grain or seed.

Figure 3:
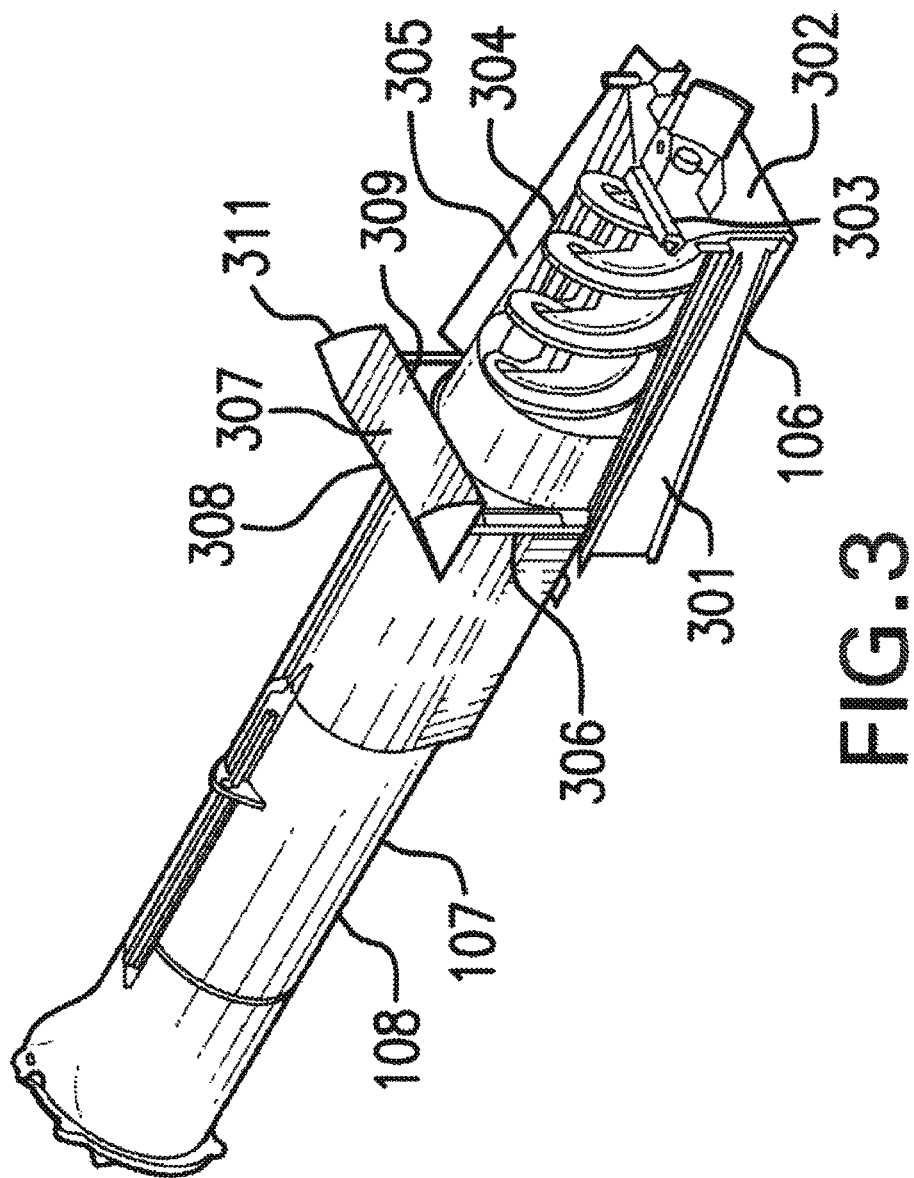
FIG. 3 is a perspective view of an embodiment of a pivoting junction box, auger, auger housing and flap of a cart.

FIGS. 3-5 illustrate the details of pivoting junction box 106, sump 105 and auger housing 107 of cart 100 having an adjustable elevation auger. Pivoting junction box 106 includes a closed bottom 401, sides 301 and a back wall 302. Pivoting junction box 106 also includes an open top. The open top of pivoting junction box 106 is located at the opening of sump 105. Junction box 106 is pivotably secured to bin 103 via a hinge 303. For example, hinge 303 may pivotably secure a top edge of back wall 302 of junction box 106 to bin 103.

An auger 304 extends through auger housing 107. Auger 304 has an intake end 305 disposed within pivoting junction box 106 at the opening of sump 105. Intake end 305 of auger 304 is rotatably secured to back wall 302 of pivoting junction box 106.

Lower auger housing 108 of auger housing 107 includes a flange 306 that connects lower auger housing 108 to pivoting junction box 106. A flap 307 extends from bin 103 to an upper edge of flange 306. Flap 307 may be mounted on a bin wall of the plurality of bin walls 104. Flap 307 includes a top edge 308 attached to the bin wall and a free bottom edge 309. The top edge 308 of flap 307 can be attached to bin 103 using any suitable fasteners, which may include rivets and/or bolts. Flap 307 also includes side edges 310 and may include wings 311 extending from side edges 310. Wings 311 may have a triangular shape and may extend perpendicular to a planar surface of flap 307.

Flap 307 extends into pivoting junction box 106 to guide material in bin 103 into the pivoting junction box 106. The upper edge of flange 306 is configured to slide against flap 307 as junction box 106 pivots. Lower auger housing 108 may be offset from the center of flange 306 to ensure overlapping contact between flap 307 and flange 306 when the auger housing 107 is in the elevated position and slight overlap in the lowered position. Flap 307 is configured to be sufficiently stiff to prevent being pushed, by the weight of material flowing from bin 103 into pivoting junction box 106, over flange 306 but flexible enough to move with flange 306 as the elevation of auger 304 is adjusted. For example, flap 307 may be a rubber flap, and, more particularly, may be made of masticated rubber. However, flap 307 may be constructed of any suitable material.

On each of the opposite sides of pivoting junction box 106, a gap exists between side 301 and bin 103. Seal members 501 are disposed in the gaps between sides 301 of junction box 106 and bin 103. For example, a first elastic seal member 501 may be disposed between one of sides 301 and bin 103, and second elastic seal member 501 may be disposed between the other of sides 301 and bin 103

FIGS. 6A-6C show a cross-sectional view of an elastic seal member 501 according to one embodiment. As shown in FIGS. 6A-6C, a pair of seal support plates 601 may extend away from back wall 302 of junction box 106 on each of opposite sides 301 of junction box 106, and, for each pair of seal support plates 601, at least one of the elastic seal members 501 may extend along the bin 103 in parallel with the seal support plates 601. Further, each of the elastic seal members 501 may be biased toward pivoting junction box 106 using one or more springs 602. For example, the one or more springs 602 may be helical coil springs or leaf springs. FIGS. 6A, 6B and 6C show an elastic seal member 501 when auger 304 is in an intermediate position, elevated position and lowered position, respectively.

In some embodiments, the seal members 501 may be designed to be difficult to bend (e.g., made of a hard rubber, plastic, or other material). Accordingly, the hard seal members 501 remain straight and slide against the bin 103 as the junction box 106 pivots. Here, the springs 602 may be biased towards bin 103 and keep the seal members 501 in contact with bin 103. FIG. 6D shows a cross-sectional view of a hard seal member 501 when the auger is in an elevated position in accordance with this alternative embodiment.

In addition, pivoting junction box 106 may include a clean out door 402.

In operation, lift assembly 110 may be used to cause the auger housing 107 to pivot with junction box 106 between a lowered position and an elevated position. Hinge 303 forms a pivot axis about which junction box 106 pivots. The auger housing 107 pivots with junction box 106 about the pivot axis formed by hinge 303 between the lowered and elevated positions. Cart 100 may be pulled by a tractor, and lift assembly 110 may be controlled remotely from a cab of the tractor. Because auger housing 107 may be pivoted between the lowered and elevated positions, the auger housing 107 may be adjusted to the lowered position, to the elevated position and to any position in between. In other words, in some embodiments, an operator is not limited to choosing solely between the elevated position and the lowered position and may also choose any position between the elevated and lowered positions.

Flap 307, which may include wings 311, guides material in bin 103 into the pivoting junction box 106. As shown in FIGS. 7A and 7B, the upper edge of flange 306 slides against flap 307 as junction box 106 pivots. FIG. 7A shows flap 307 resting on flange 306 when auger housing 107 is in the elevated position. As auger housing 107 and junction box 106 pivot to the lowered position, auger housing 107 moves away from bin 103, and the upper edge of flange 306 slides against flap 307. FIG. 7B shows the relationship between flap 307 and flange 306 when auger housing 107 is in the elevated position. Here, the free bottom edge 309 of flap 307 rests in proximity to the upper edge of flange 306. Still, flap 307 is stiff enough to prevent being pushed over flange 306 by the material from bin 103.

Elastic seal members 501 disposed in the gaps between opposite sides 301 of pivoting junction box 106 and bin 103 maintain a seal between sides 301 and bin 103 when as auger 304, auger housing 107 and junction box 106 pivot between a lowered position and an elevated position. By maintaining the seal between sides 301 and bin 103, elastic seal members 501 prevent material, such as grain, in bin 103 from falling through the gaps before entering junction box 106 within the opening of sump 105 at bottom of bin 103.

Pivoting of auger housing 107 and junction box 106 enables the height of a discharge end 111 of auger 304 to be adjusted. Adjusting the height of discharge end 111 of auger 304 enables the height of the discharge end 111 to more closely match the height of a trailer into which material from the storage space of bin 103 is to be unloaded. Accordingly, the gap between discharge end 111 of auger 304 and the trailer is minimized, thereby minimizing loss of material from the storage space of bin 103 due to wind during unloading. Moreover, the adjustable elevation makes it easier for operators to position the chute over the trailer.

In one embodiment, the elevation of discharge end 111 of auger 304 may be adjusted from about 126 inches in a lowered position to about 161 inches in an elevated position. The two heights correspond to common trailer heights. The taller trailer is known as a Super B trailer, and the shorter trailer is a standard North American trailer. By more closely matching the height of the discharge end 111 to the height of the trailer, the gap between them is minimized thereby minimizing grain loss due to wind during the unloading process.

Figure 8:
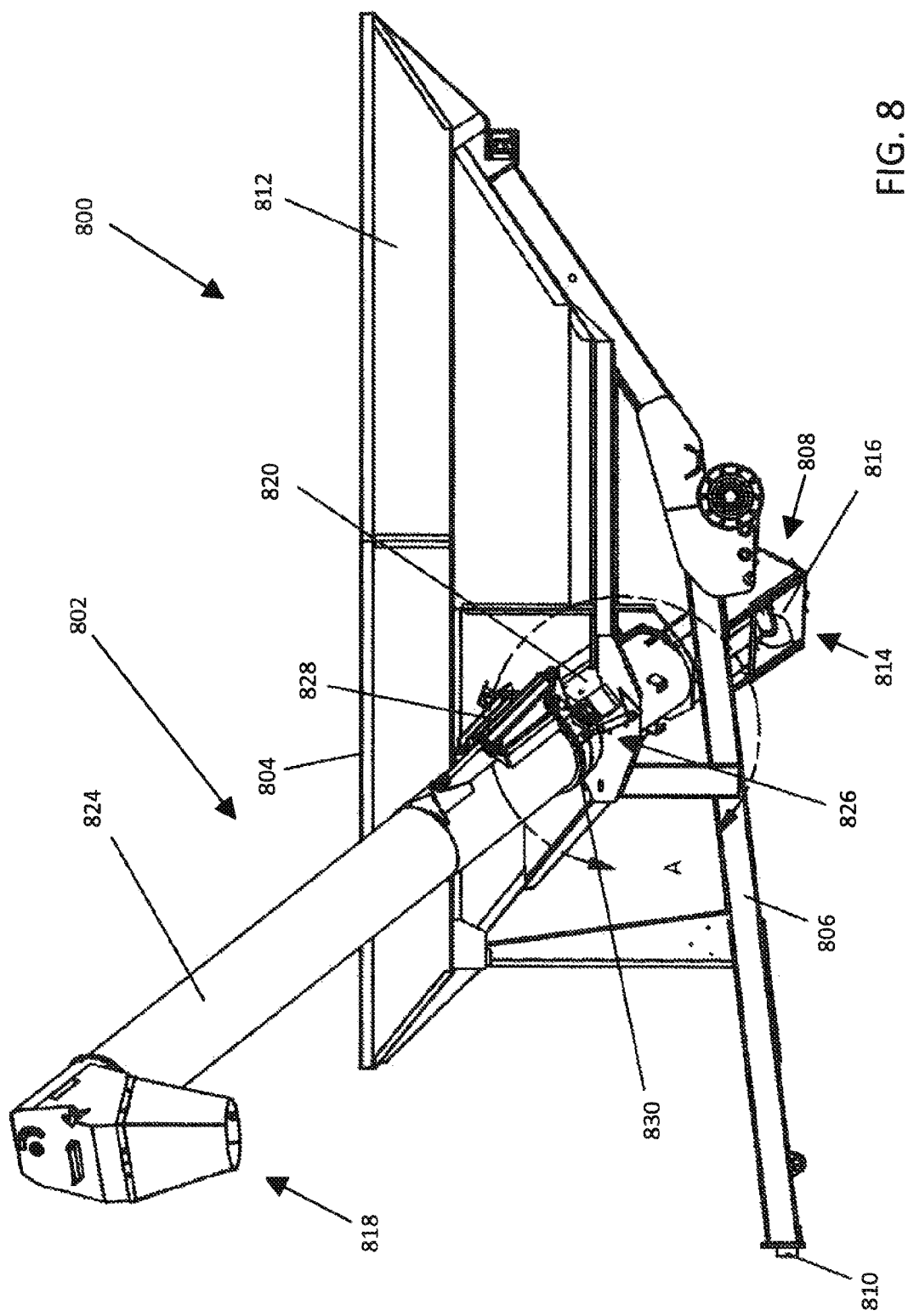
FIG. 8 is a side view of a cart in accordance with an embodiment with its conveyor assembly in an elevated position.
Figure 9:
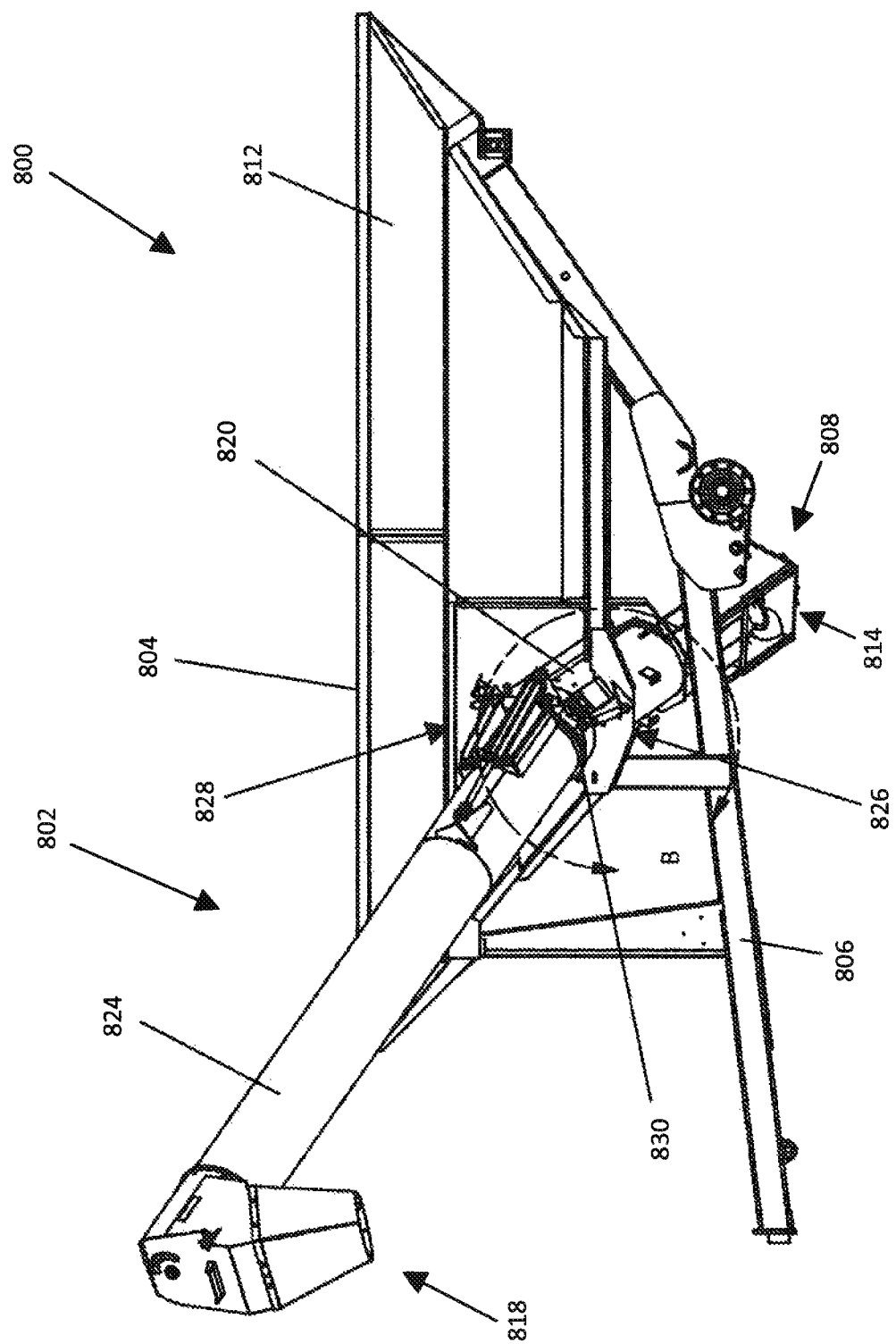
FIG. 9 is a side view of the cart of FIG. 8 with its conveyor assembly in a lowered position.
Figure 10:
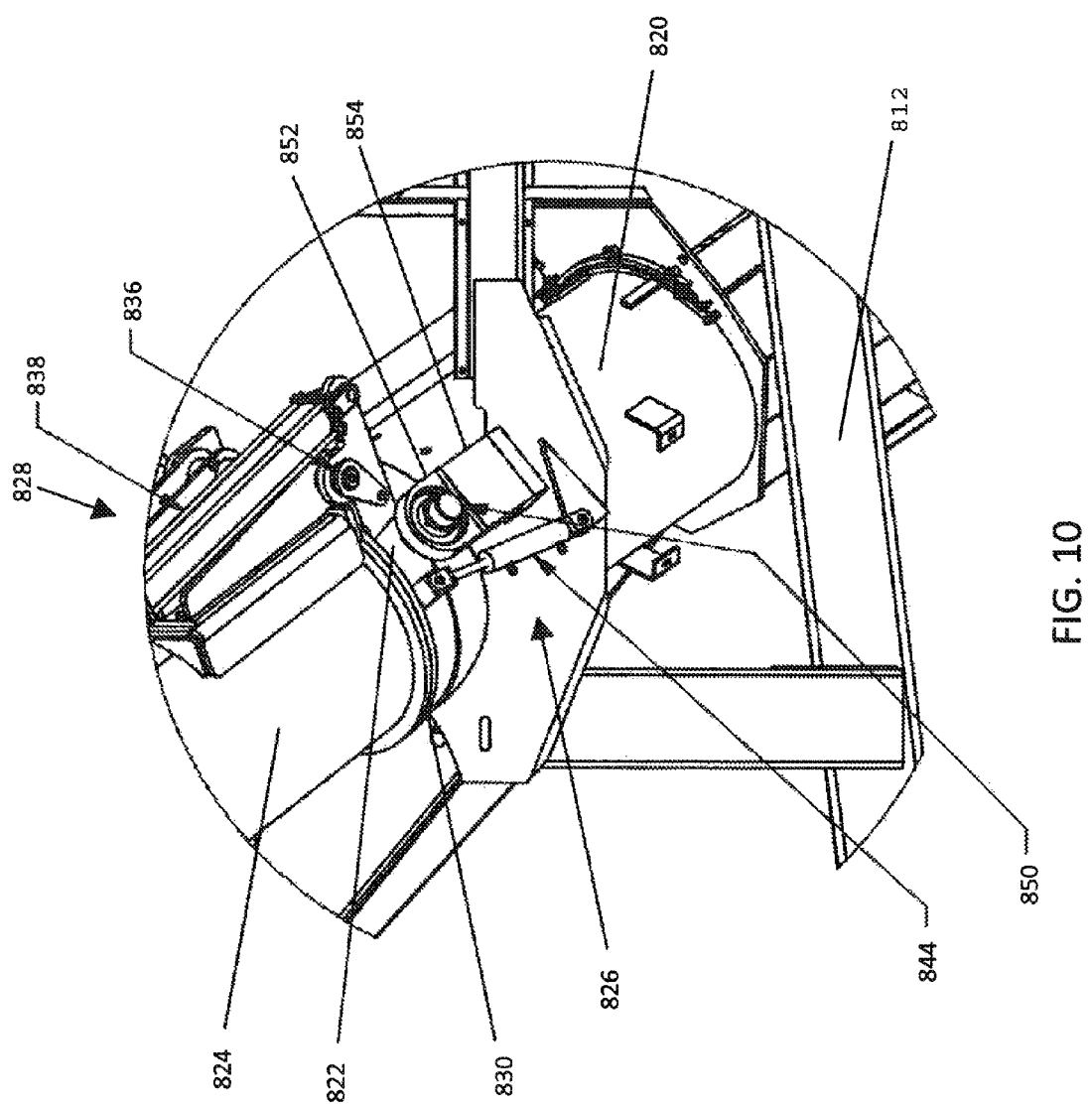
FIG. 10 is an enlarged view of section A of FIG. 8.
Figure 11:
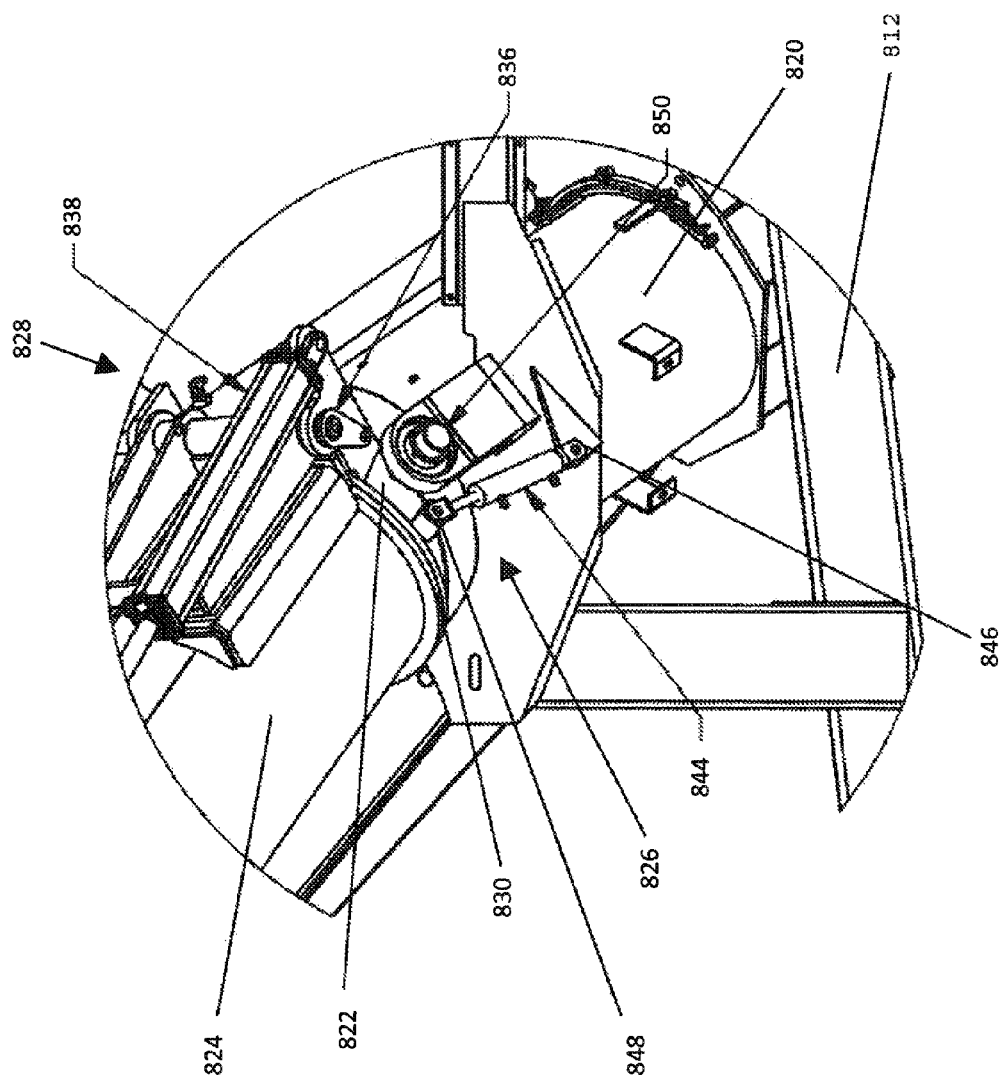
FIG. 11 is an enlarged view of section B of FIG. 9.

FIGS. 8-11 illustrate side views of a grain cart 800 in accordance with another embodiment. In particular, FIG. 8 illustrates cart 800 with a conveyor assembly 802 in an elevated position and FIG. 9 illustrates conveyor assembly 802 in a lowered position. For clarity, FIG. 10 illustrates an enlarged view of section A of FIG. 8, and FIG. 11 illustrates an enlarged view of section B of FIG. 9. As described further herein, cart 800 can include a bin 804, frame 806, sump 808, and conveyor assembly 802.

It is appreciated that cart 800 can include one or more features of grain cart 100 or other grain carts described herein. As but one example, cart 800 does not depict wheels attached to the frame 806, however, it is appreciated that one or more wheels, such as wheels 102 depicted in FIG. 1A, can be attached to the frame of cart 800 or any other grain carts described herein. In some embodiments, cart 800 can include another suitable vehicle propulsion system, such as a track assembly comprising a continuous belt or track looped around wheels. Similarly, one or more components of cart 800 can include one or more aspects of a corresponding one or more components of cart 100 or another grain cart described herein. As but one example, bin 804 of cart 800 can include one or more aspects of bin 103 described herein, such as being configured to hold material, such as grain. One of skill in the art would appreciate that various modifications and changes may be made to cart 800 in view of cart 100 or other carts described herein, or aspects of cart 100 or other carts described herein can be included in cart 800, unless expressly stated otherwise.

Frame 806 can be designed to support the various components of cart 800. Frame 806 can include a hitch 810 at a front end in order to couple cart 800 to a tractor or other vehicle to allow cart 800 to be towed. In some embodiments, cart 800 can be self-powered. Frame 806 can incorporate aspects of other frames described herein, such as for example frame 101.

Bin 804 is supported by frame 806 and includes a plurality of bin walls 812. Bin 804 and bin walls 812 can incorporate aspects of other bins and bin walls described herein, such as for example bin 103 and bin walls 104. Bin 804 and bin walls 812 can, for example, be configured to securely hold material, such as grain or seed, and to funnel such material into a sump located at a bottom of bin 804.

Sump 808 is configured to receive material, such as grain, from the bin and to position this material such that conveyor assembly 802 can convey the material away from bin 804. Sump 808 can incorporate aspects of other sumps described herein, such as for example sump 105. Sump 808 can include a clean out door and a corresponding clean out door opening 814, which can include one or more aspects of other clean out doors and corresponding openings described herein, such as for example clean out door 402. The clean out door for sump 808 is not shown in FIG. 8 in order to illustrate a lower conveyor 816 housed within conveyor assembly 802. As described further herein, lower conveyor 816 can be in the form of an auger as depicted in FIG. 8. In some embodiments, lower conveyor 816 can be in the form of another suitable conveyor type for a grain cart, such as a suitable belt conveyor.

Figure 12:
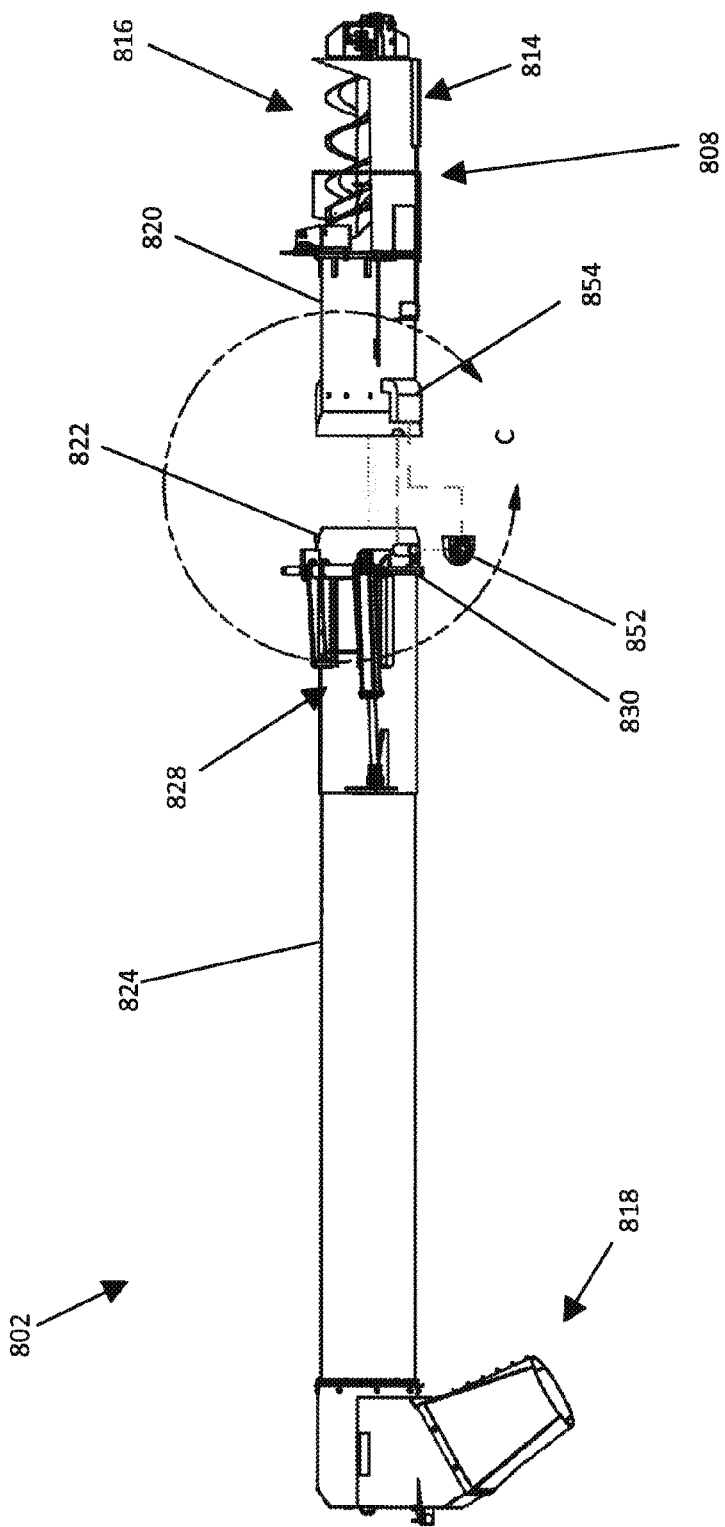
FIG. 12 is an exploded side view of the conveyor assembly of the grain cart of FIG. 9 with certain parts removed for clarity.
Figure 13:
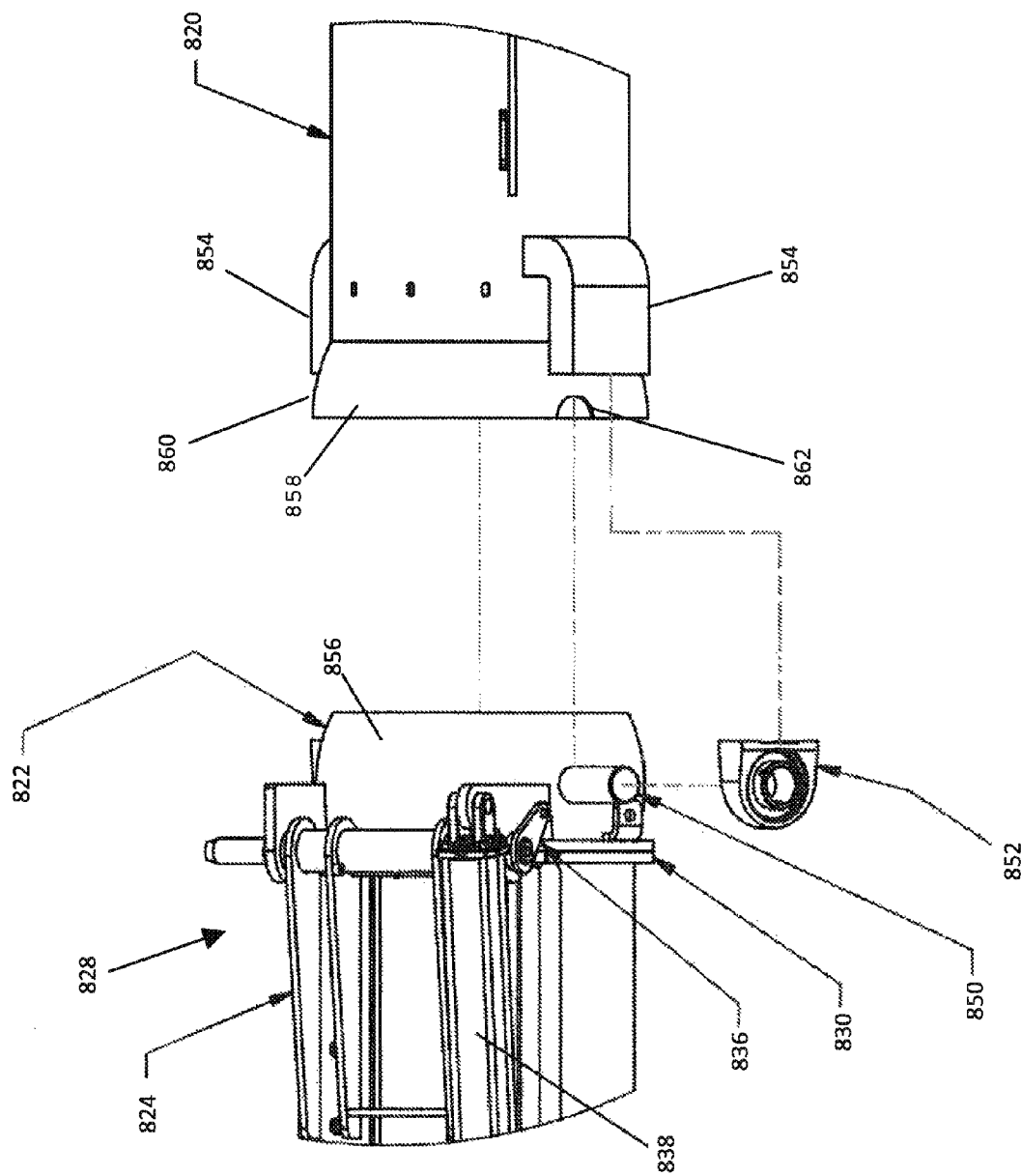
FIG. 13 is an enlarged view of section C of FIG. 12.
Figure 14:
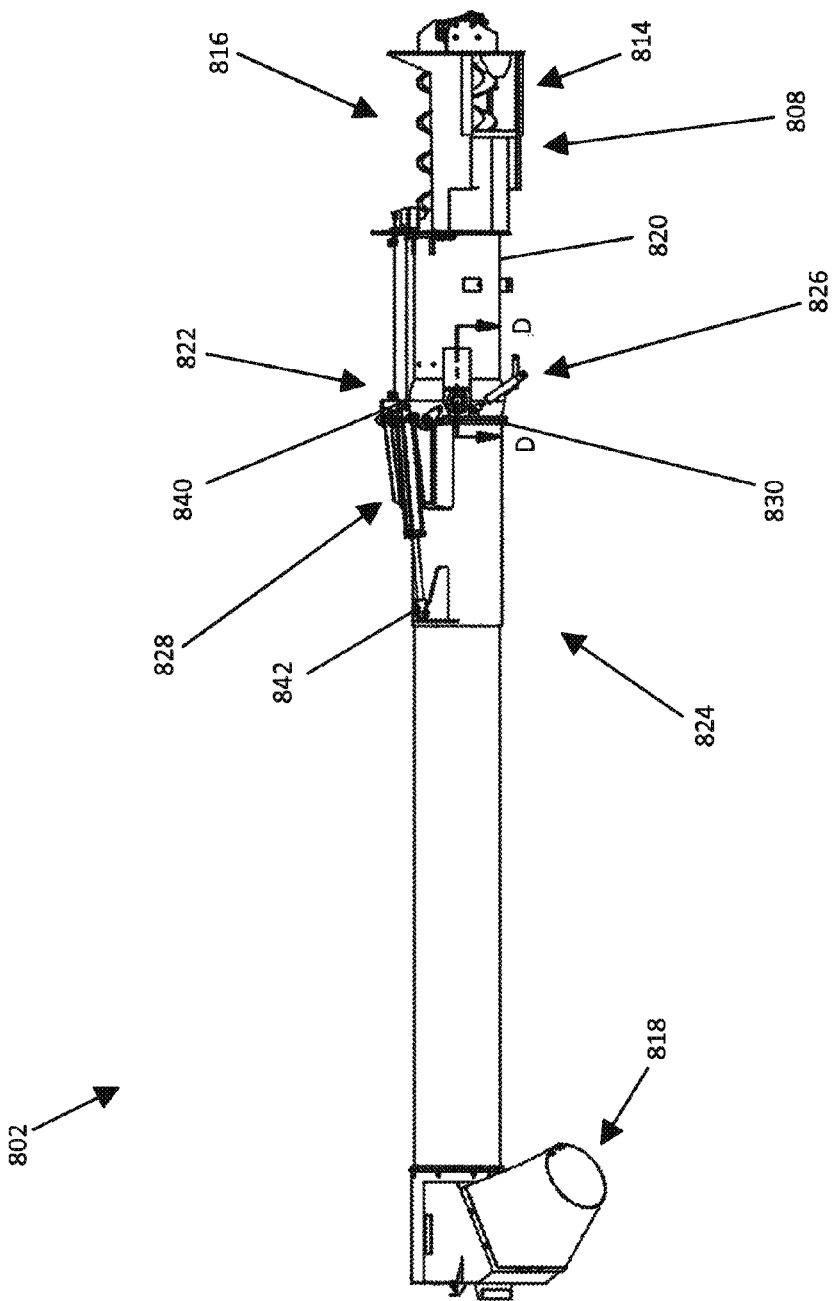
FIG. 14 is a side view of an assembled conveyor assembly of FIG. 9.
Figure 15:
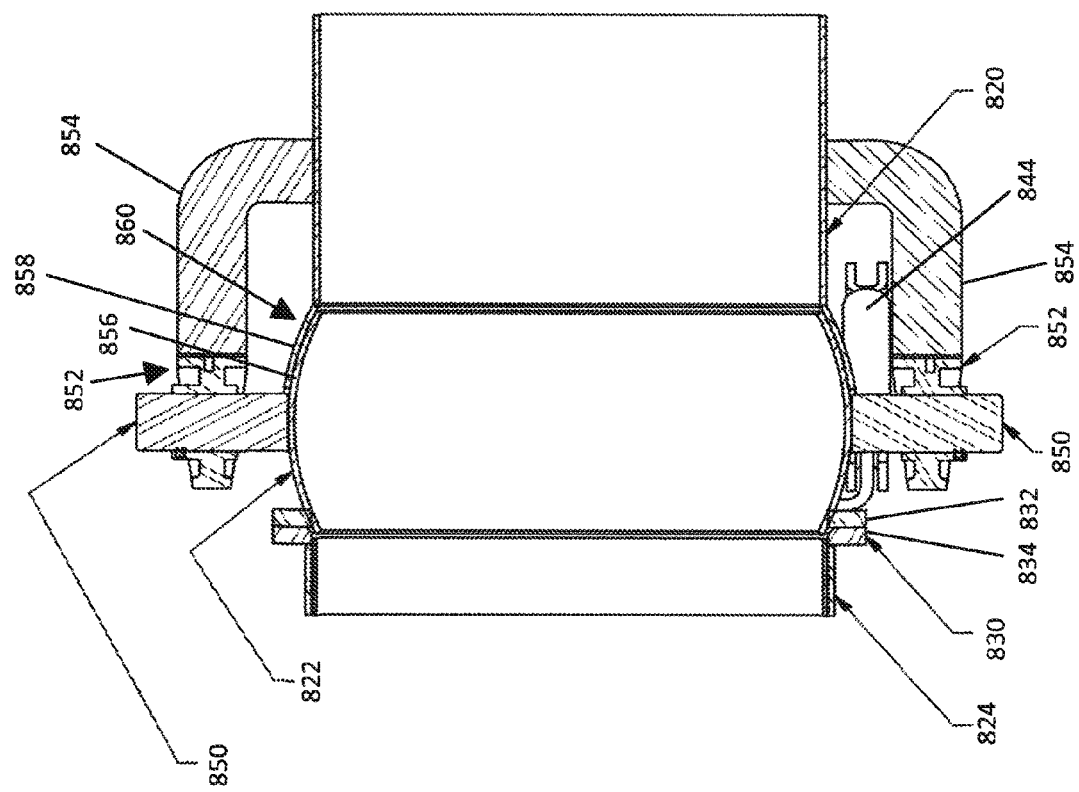
FIG. 15 is a cross-sectional view of the conveyor assembly of FIG. 14 along line D-D.

FIGS. 12-15 illustrate various views of conveyor assembly 802. In particular, FIG. 12 illustrates an exploded side view of conveyor assembly 802 with certain parts removed for clarity, FIG. 13 illustrates an enlarged view of section C of FIG. 12, FIG. 14 illustrates a side view of assembled conveyor assembly 802, and FIG. 15 illustrates a cross-sectional view of FIG. 14 along line D-D. Conveyor assembly 802 is in communication with sump 808 and is designed to convey material from sump 808 out of a discharge end 818 of conveyor assembly 802. Conveyor assembly 802 can incorporate aspects of other conveyor assemblies described herein, such as for example auger housing 107 and its related components, such as the adjustable elevation auger depicted in FIG. 2.

As described in detail below, conveyor assembly 802 includes a lower conveyor section 820, an upper conveyor section 824 with a discharge end 818, and an intermediate conveyor section or housing 822 coupled between the upper and lower conveyor sections. Also described further herein are a tilting assembly 826, and a folding assembly 828. As described further herein, conveyor assembly 802 is designed to allow upper conveyor housing 824 to tilt with respect to lower conveyor housing 820 via tilting assembly 826 such that a height of discharge end 818 can be adjusted to correspond to a trailer, truck, bin, or other receptacle. Conveyor assembly 802 can be pivoted between a lowered and elevated position, and any position in between. In other words, in some embodiments, an operator is not limited to choosing solely between the elevated position and the lowered position depicted in FIGS. 8 and 9, respectively, and may also choose any position between the elevated and lowered positions. It is appreciated that adjusting the height of discharge end 818 of conveyor assembly 802 enables the height of discharge end 818 to more closely match a height of a trailer into which material from bin 804 is to be unloaded. Accordingly, a gap between discharge end 818 and the trailer is minimized, thereby minimizing loss of material from bin 804 due to wind during unloading. Moreover, the adjustable elevation makes it easier for operators to position the chute over the trailer. It is appreciated that conveyor assembly 802 may be configured to be controlled via a controller disposed on cart 800, or can be controlled remotely from a cab of the tractor or other suitable location.

In one embodiment, the elevation of discharge end 818 of conveyor assembly 802 may be adjusted from about 126 inches in a lowered position to about 161 inches in an elevated position. This range of heights is suitable to load most common trailers. The taller height is suitable for loading a tall trailer known as a Super B trailer, and the shorter height is suitable for loading a short trailer known a standard North American trailer. By more closely matching the height of the discharge end 818 to the height of the trailer, any gap between them is minimized thereby minimizing grain loss due to wind during the unloading process.

As further described herein, conveyor assembly 802 is designed to allow upper conveyor section 824 to fold with respect to lower conveyor section 820 via folding assembly 828 at a folding joint 830 such that upper conveyor section can be folded back against a side of cart 800 while in storage, transport, or in other situations. The various components of conveyor assembly 802 will be described in further detail below.

Lower conveyor housing 820 has a lower or bottom end in communication with sump 808 and an upper or top end configured to couple with intermediate housing 822 (as shown for example in FIGS. 12 and 14). In an embodiment, the lower conveyor housing 820 is a tubular member of cylindrical configuration. Lower conveyor 816 is movably (e.g., rotatably) disposed with lower conveyor housing 820 to convey material, such as grain, from sump 808 to upper conveyor housing 824. Lower conveyor housing 820 can incorporate aspects of other lower conveyor housings described herein, such as for example lower auger housing 108. Lower conveyor 816 can be in the form of a rotatable auger as depicted in FIG. 12. In some embodiments, lower conveyor 816 can be in the form of another suitable conveyor type for a grain cart, such as a suitable belt conveyor.

Intermediate housing 822 is coupled to both upper conveyor housing 824 and lower conveyor housing 820 and is designed to allow upper conveyor housing 824 to securely tilt relative to lower conveyor housing 820 without spilling material such as grain or seeds passing through conveyor assembly 802. Intermediate housing 822 includes a rounded lower end configured to sit within a curved recess or cavity formed at the upper end of lower conveyor housing 820. In an embodiment, an upper end of lower conveyor housing 820 is generally longitudinally aligned with folding joint 830.

Intermediate housing 822 is coupled to upper conveyor housing 824 via folding assembly 828. Folding assembly 828 is configured to allow an intermediate housing flange 832 (see, e.g., FIG. 15) of intermediate housing 822 to abut against an upper conveyor housing flange 834 of upper conveyor housing 824 in an unfolded position, and further allows upper conveyor housing 824 to pivot about a conveyor fold hinge pin 836 (see, e.g., FIG. 13) relative to intermediate housing 822 to position the upper conveyor section 824 in a folded position. Folding assembly 828 can include a conveyor fold actuator 838, such as a hydraulic cylinder, that is rotatably fixed at a first end 840 (see FIG. 14) to intermediate housing 822 and rotatably fixed at a second end 842 to upper conveyor housing 824. In some embodiments, first end 840 can be fixed at a location other than intermediate housing 822 and second end 842 can be fixed at a location other than upper conveyor housing 824. For example, in some embodiments, first end 840 can be rotatably fixed on lower conveyor housing 820. As another example, second end 842 can be rotatably fixed on intermediate housing 822. Conveyor fold actuator 838 can, for example, be a hydraulic cylinder designed to facilitate folding and unfolding of upper conveyor housing 824. Conveyor fold actuator 838 can be configured to lock upper conveyor housing 824 in either an unfolded or folded state as desired.

Intermediate housing 822 is coupled to lower conveyor housing 820 via tilting assembly 826. Tilting assembly 826 is configured to allow intermediate housing 822 to tilt relative to lower conveyor housing 820. When upper conveyor housing 824 is locked in its unfolded or operating position, the resulting configuration results in upper conveyor housing 824 also being tilted relative to lower conveyor housing 820 via intermediate housing 822. Tilting assembly 826 can, for example, include a conveyor tilt actuator 844, such as a hydraulic cylinder, that is rotatably fixed at a first end 846 (see FIG. 11) to frame 806 and rotatably fixed at a second end 848 (see FIG. 11) to intermediate housing 822. In some embodiments, first end 846 can be fixed at a location other than frame 806 and second end 848 can be fixed at a location other than intermediate housing 822. For example, in some embodiments, first end 846 can be rotatably fixed to lower conveyor housing 820 or to intermediate housing 822. As another example, second end 848 can be rotatably fixed upper conveyor housing 824.

Conveyor tilt actuator 844 can, for example, be a hydraulic cylinder for facilitating tilting of intermediate housing 822 (and thereby upper conveyor housing 824 when upper conveyor housing 824 is locked to intermediate housing 822). Conveyor tilt actuator 844 can be configured to lock upper conveyor housing 824 in either a tilted or untilted (i.e., oriented in line with the lower conveyor housing) state as desired. Tilting assembly 826 can further include one or more conveyor tilt trunnions 850 (see, e.g., FIGS. 13 and 15)

extending from intermediate housing 822 along a tilt axis. Conveyor tilt trunnions 850 can be designed such that they can be pivoted within a bearing assembly 852 secured to lower conveyor housing 820 or another suitable part of cart 800, such as frame 806. In some embodiments, bearing assembly 852 can be coupled to a bearing arm 854 extending from lower conveyor housing 820. In some embodiments, conveyor tilt trunnions can be mounted on the lower conveyor housing and a bearing assembly can be mounted on the intermediate section.

To facilitate the tilting of intermediate housing 822 relative to lower conveyor housing 820, intermediate housing 822 can include a curved exterior or convex surface 856 that corresponds to a curved interior or concave surface 858 of a flared portion 860 of lower conveyor housing 820. In some embodiments, flared portion 860 can include a notch 862 to provide further support for trunnion 850.

The coupling between lower conveyor housing 820 and intermediate housing 822 described above can function similar to a ball and socket joint that allows smooth movement along only a single rotational axis (defined by conveyor tilt trunnions 850). It is appreciated that other couplings can be provided to allow intermediate housing 822 to be tilted relative to lower conveyor housing 820. In some embodiments, intermediate housing 822 can be positioned outside of lower conveyor housing 820 such that a curved interior surface of intermediate housing 822 corresponds to a curved exterior surface of lower conveyor housing 820. The use of corresponding surfaces between intermediate housing 822 and lower conveyor housing 820 can be configured to provide a material seal between intermediate housing 822 and lower conveyor housing 820 to prevent material such as grain or seed from escaping when conveyor assembly 802 is in use. It is appreciated that seal members, such as one or more suitable seal members described elsewhere herein, can be added to tilting assembly 826 to further seal intermediate housing 822 against lower conveyor housing 820.

Upper conveyor housing 824 is coupled to lower conveyor housing 820 via intermediate housing 822. Upper conveyor housing 824 includes a lower or bottom end configured to abut the intermediate housing 822 in an unfolded operating position and an upper or top end with a discharge end 818, which can for example be in the form of a discharge spout. In the embodiment shown, the upper conveyor housing 824 is a tubular member of cylindrical configuration, and an upper conveyor is movably (e.g., rotatably) disposed in the upper conveyor housing (see, e.g., upper conveyor 827 in FIG. 24) such that a lower end of the upper conveyor is generally longitudinally aligned with folding joint 830. Upper conveyor section 824 is configured to convey material, such as grain, from the lower conveyor section 820 to discharge end 818. Upper conveyor housing 824 can incorporate aspects of other upper conveyor housings described herein, such as for example upper auger housing 109. The upper conveyor of upper conveyor housing 824 can be in the form of an auger. In some embodiments, the upper conveyor can be in the form of another suitable conveyor type for a grain cart, such as a suitable belt conveyor.

Discharge end 818 is coupled to upper conveyor housing 824 and is designed to discharge material, such as grain and seeds, into trailers, trucks and bins. Discharge end 818 can incorporate aspects of other discharge ends described herein, such as for example discharge end 111.

In accordance with some embodiments, sump 808 and lower conveyor housing 820 are designed to stay fixed relative to bin 804 and frame 806. Upper conveyor section 824 is designed to pivot about a tilt axis, e.g., as defined by one or more shafts (e.g., trunnions 850). Such shafts can be secured by bearing assembly 852, or bushings, to lower conveyor housing 820. The mating surfaces between intermediate housing 822 and lower conveyor housing 820 can be arched, curved or rounded, e.g., as shown in FIG. 15, to allow for a secure tilting motion. The figures provided herein depict a semi-spherical shape, but this shape could instead be a boxed section, and include for example appropriate arched, curved or rounded sides. These surfaces can include a seal of some manner to seal material from escaping conveyor assembly 802. The tilt motion is moved by an actuator, which can for example be a linear actuator such as a hydraulic cylinder. One end of the actuator attached to the upper tilting portion, such as intermediate housing 822, upper conveyor housing 824, or another tilting portion of cart 800, and the other end can be fixed to lower conveyor housing 820, frame 806, or another non-tilting portion of cart 800.

In the provided example, one end of fold actuator 838 attaches to an upper tilting portion of cart 800, such as upper conveyor housing 824. This allows fold actuator 838 to hold upper conveyor housing flange 834 and intermediate housing flange 832 (which can, for example, be in the form of picture frame flanges) in position through a tilting motion of conveyor assembly 802.

An alternative design can include rotatably fixing one end of conveyor tilt actuator 844 to upper conveyor housing 824 and a second end to intermediate housing 822 or lower conveyor housing 820. Depending on the location of tilting assembly 826, the folding assembly 828 may incorporate a linkage to fold the upper conveyor housing from an extended or operating position to a folded storage or transport position and back. In some embodiments, tilting assembly 826 can, for example, be placed above a connection point of folding assembly 828 towards discharge end 818 along conveyor assembly 802.

The position of intermediate section 822 along the length of conveyor assembly 802 can be determined based on a desired amount of vertical movement of discharge end 818. Another consideration can include a sidewall clearance of a container that the material is being unloaded into. For example, the lower the intermediate section 822 is positioned along conveyor assembly 802, the shallower the angle the upper tilt portion will have and vice versa. It is therefore appreciated that intermediate section 822 can be positioned at any desired location along conveyor assembly. In some embodiments, intermediate section 822 is positioned near sump 808. In some embodiments, intermediate section 822 is positioned near a mid-point of conveyor assembly 802 between sump 808 and discharge end 818. In some embodiments, intermediate section 822 is positioned near discharge end 818. In some embodiments, intermediate section 822 is positioned to correspond to an average height of a transport (e.g., a grain truck) used to receive material from cart 800. For example, in such an embodiment, upper conveyor housing 824 can be substantially horizontal when unloading material into the transport (e.g., a grain truck). In some embodiments, the position of intermediate section 822 along conveyor assembly 802 can be chosen such that upper conveyor housing 824 is angled downward to discharge material into a transport. In such an embodiment, intermediate housing can be substantially the highest point of conveyor assembly 802 in such a position. In some embodiments, a transport rest can be used to accommodate the folding of upper conveyor housing 824 in a tilted or folded position.

In some embodiments, a control system with a computer processor and a memory storing computer code for execution by the processor can be coupled to one or more of the actuators and configured to only allow the conveyor assembly 802 to be folded once it is in a predetermined tilt position. For example, the control system can be configured to only allow conveyor assembly 802 to be folded when it is in an untilted position. In some embodiments, the control system can be configured to receive a command to fold conveyor assembly 802 and determine whether conveyor assembly 802 is in an acceptable tilt position to allow folding. If the control system determines that conveyor assembly 802 is not in an acceptable tilt position for folding, the control system can provide an alert to an operator, which can, for example, provide an indication to the operator to adjust the conveyor assembly to a suitable tilt position. Alternatively or additionally, control system can automatically move conveyor assembly 802 such that it is in a suitable tilt position without requiring operator intervention. In some embodiments, a suitable tilt position for folding can include the highest tilted position. In some embodiments, a suitable tilt position for folding can include a zero tilt position.

Figure 36:
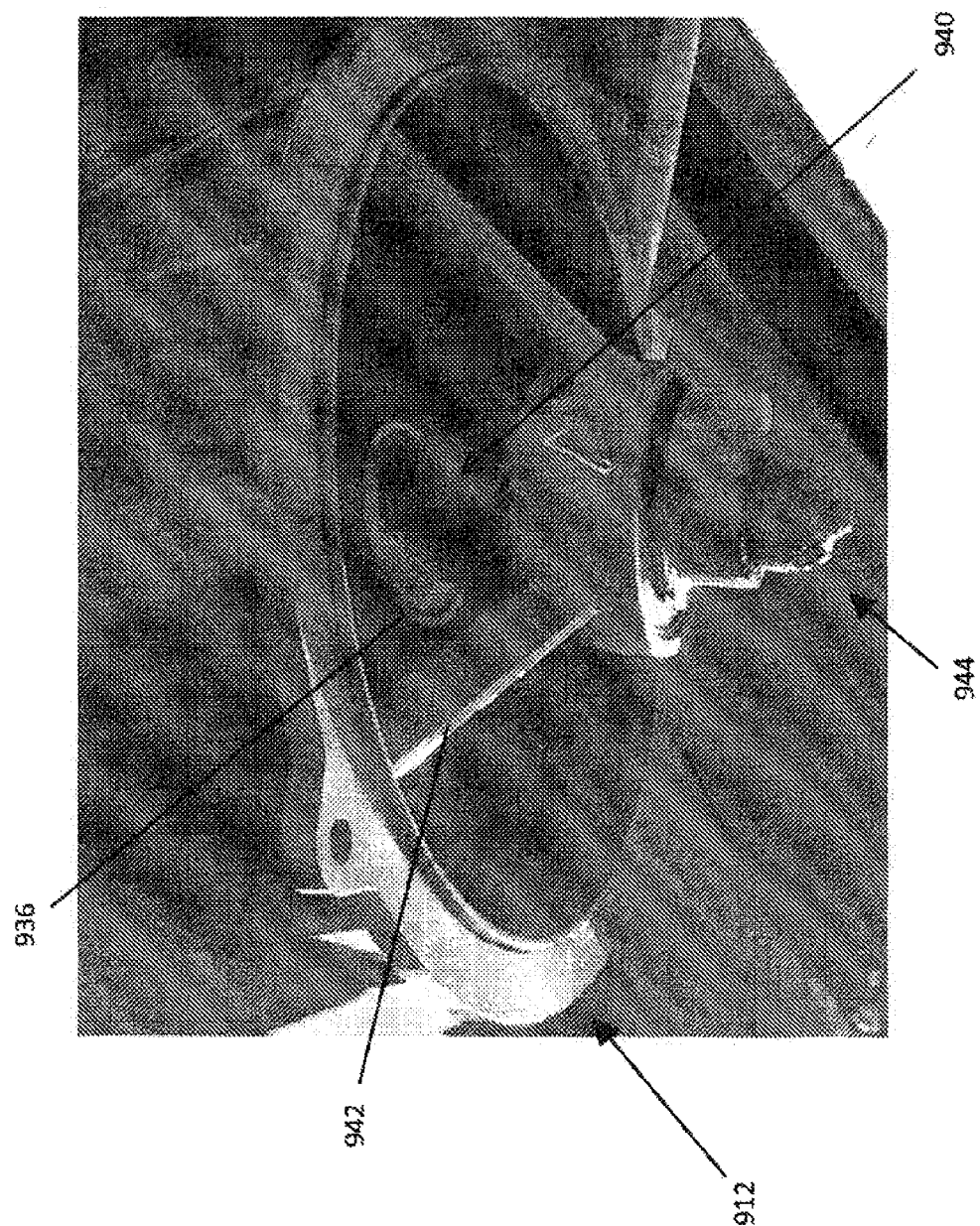
FIG. 36 is a photograph of an exemplary universal joint for use with a conveyor assembly of one or more grain carts described herein.

As described above, conveyor assembly 802 can include one or more suitable conveyors, such as an auger. In the embodiment shown for example in FIG. 8, conveyor assembly 802 includes a first conveyor in the form of an auger that is housed in upper conveyor housing and a second conveyor also in the form of an auger (i.e., lower conveyor 816) that is housed in lower conveyor housing. The coupling section of these conveyors can include a universal joint designed to accommodate a change in angle through the tilting motion, e.g., as shown in FIG. 36 at 940. Such a universal joint and hanger bearing can, for example, mount to an upper tilting portion, such as upper conveyor housing 824 or intermediate housing 822, or to another suitable area on cart 800. It is appreciated that other joints can be used with conveyor assembly 802 or other conveyor assemblies described herein to provide a desired mechanical power transfer between a first conveyor and a second conveyor.

Figure 16:
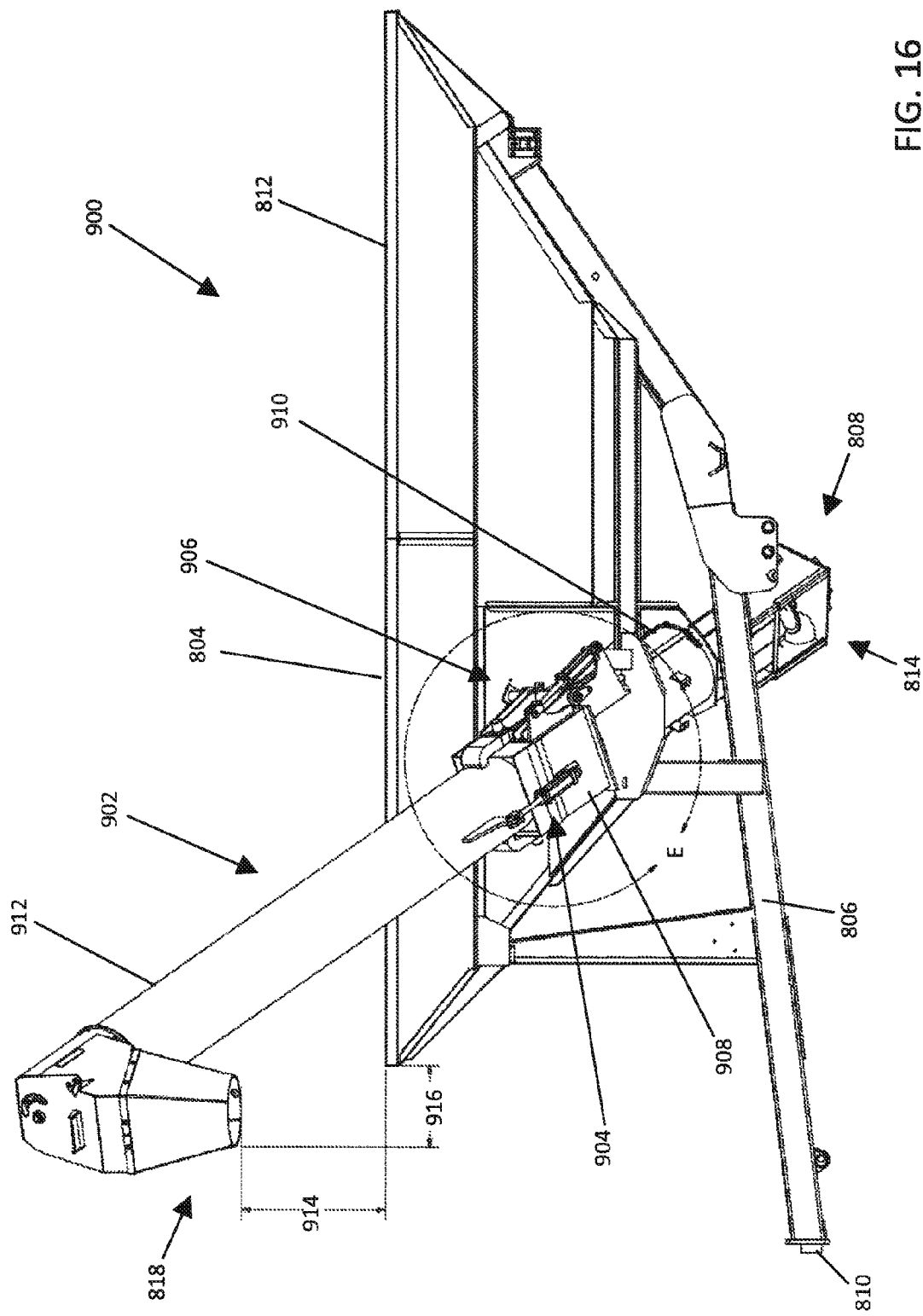
FIG. 16 is a side view of a cart in accordance with an embodiment with its conveyor assembly in an elevated position.
Figure 17:
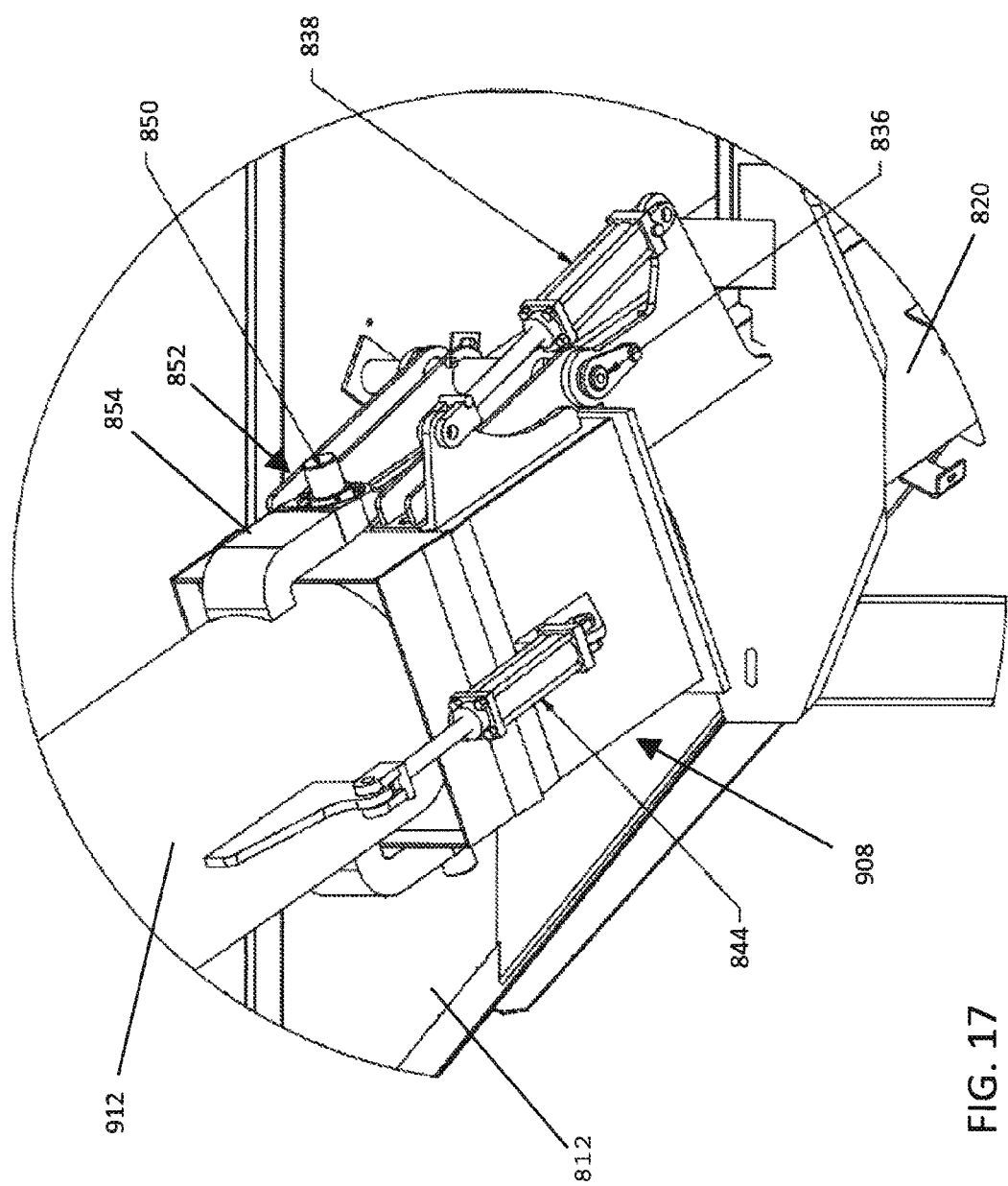
FIG. 17 is an enlarged view of section E of FIG. 16.
Figure 18:
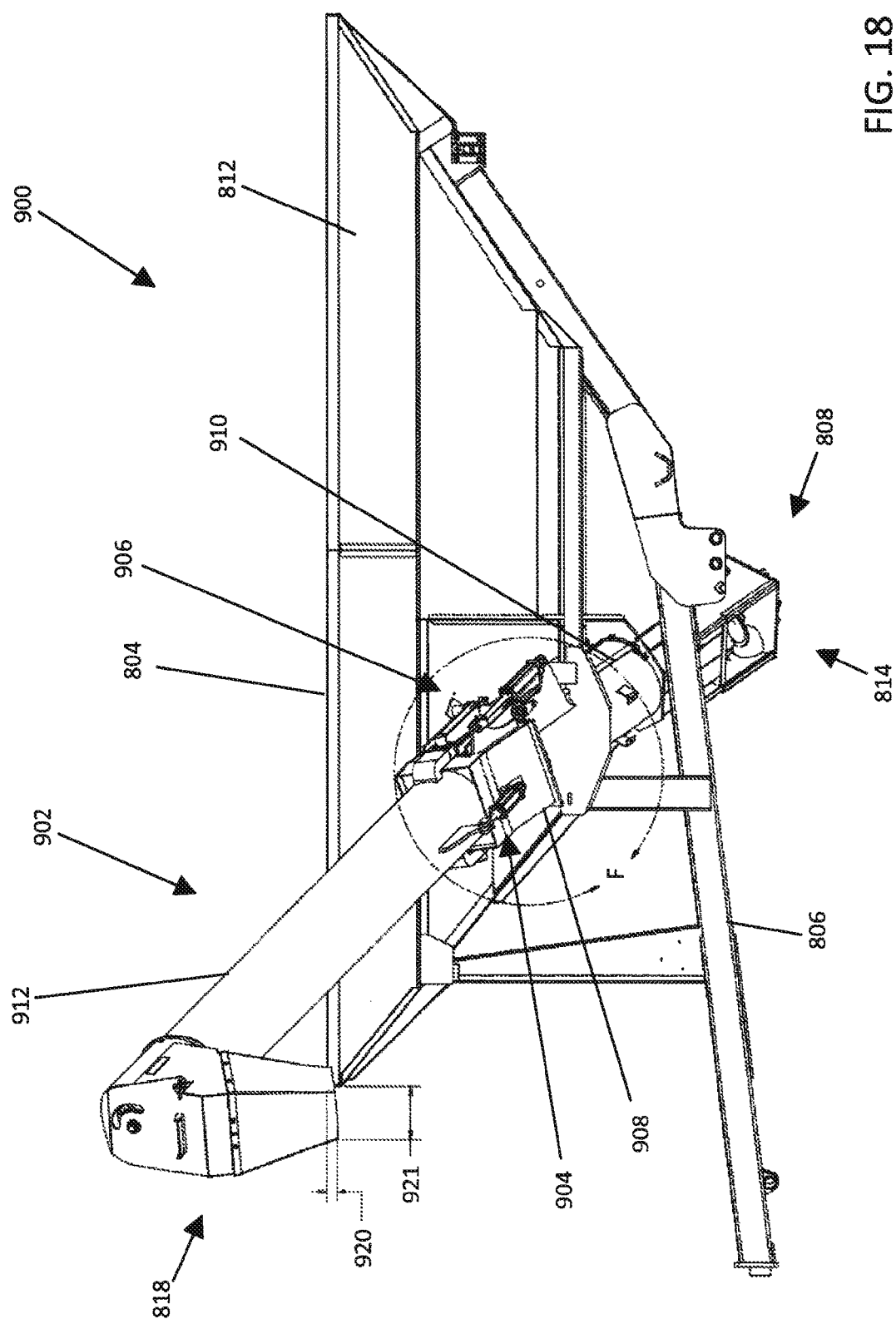
FIG. 18 is a side view of the cart of FIG. 16 with its conveyor assembly in a lowered position.
Figure 19:
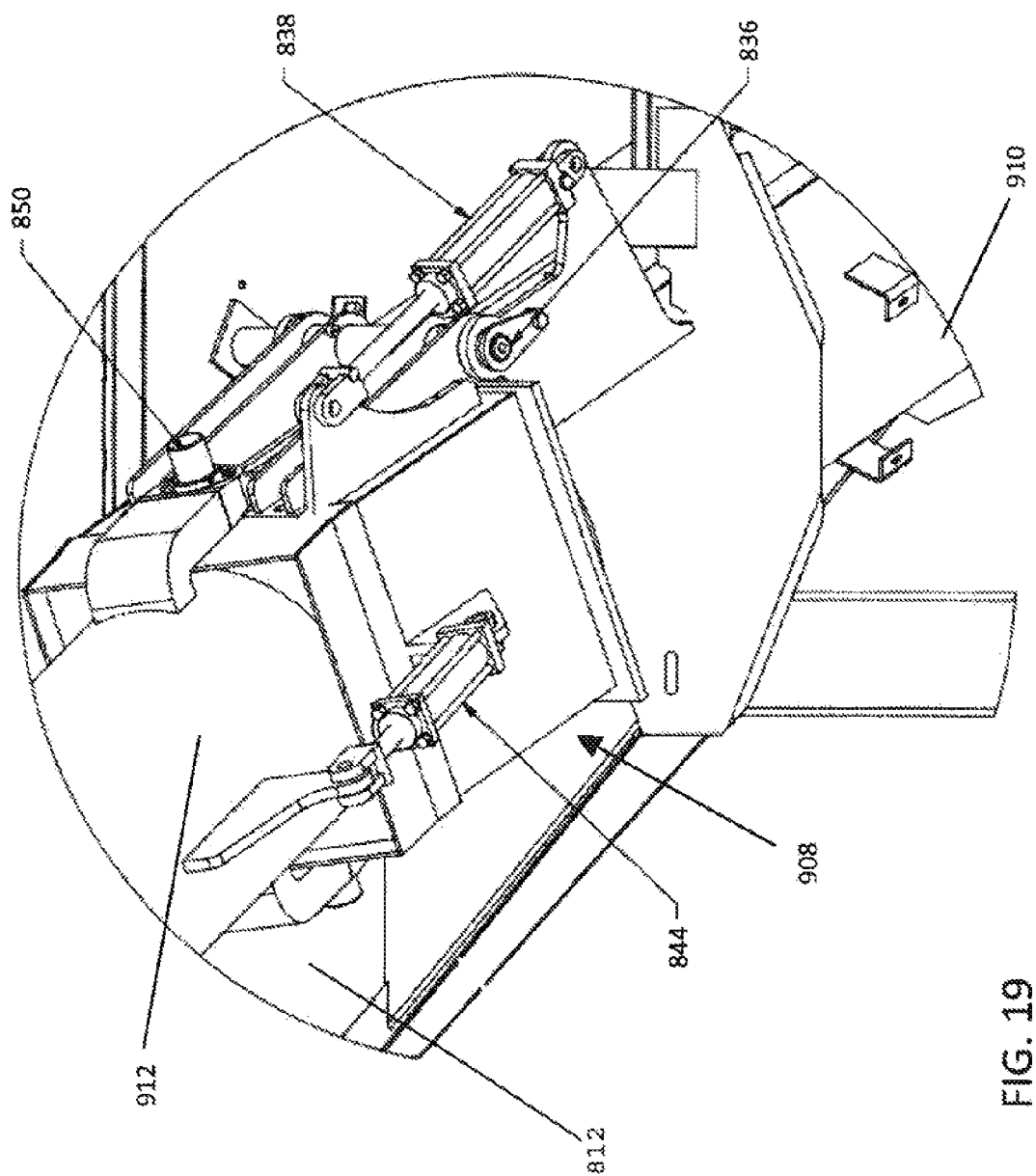
FIG. 19 is an enlarged view of section F of FIG. 18.
Figure 20:
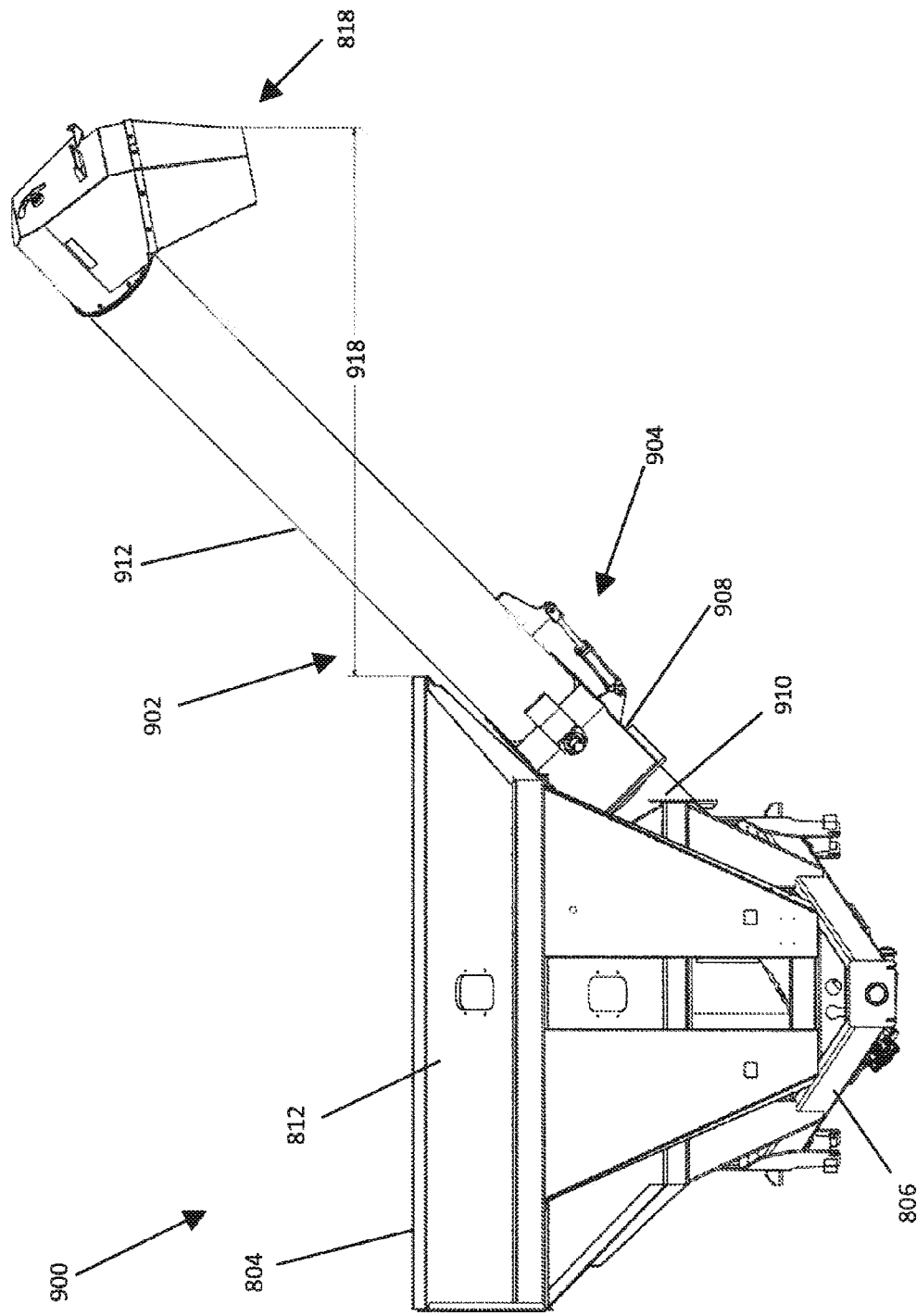
FIG. 20 is a front view of the cart of FIG. 16 with its conveyor assembly in an elevated position.
Figure 21:
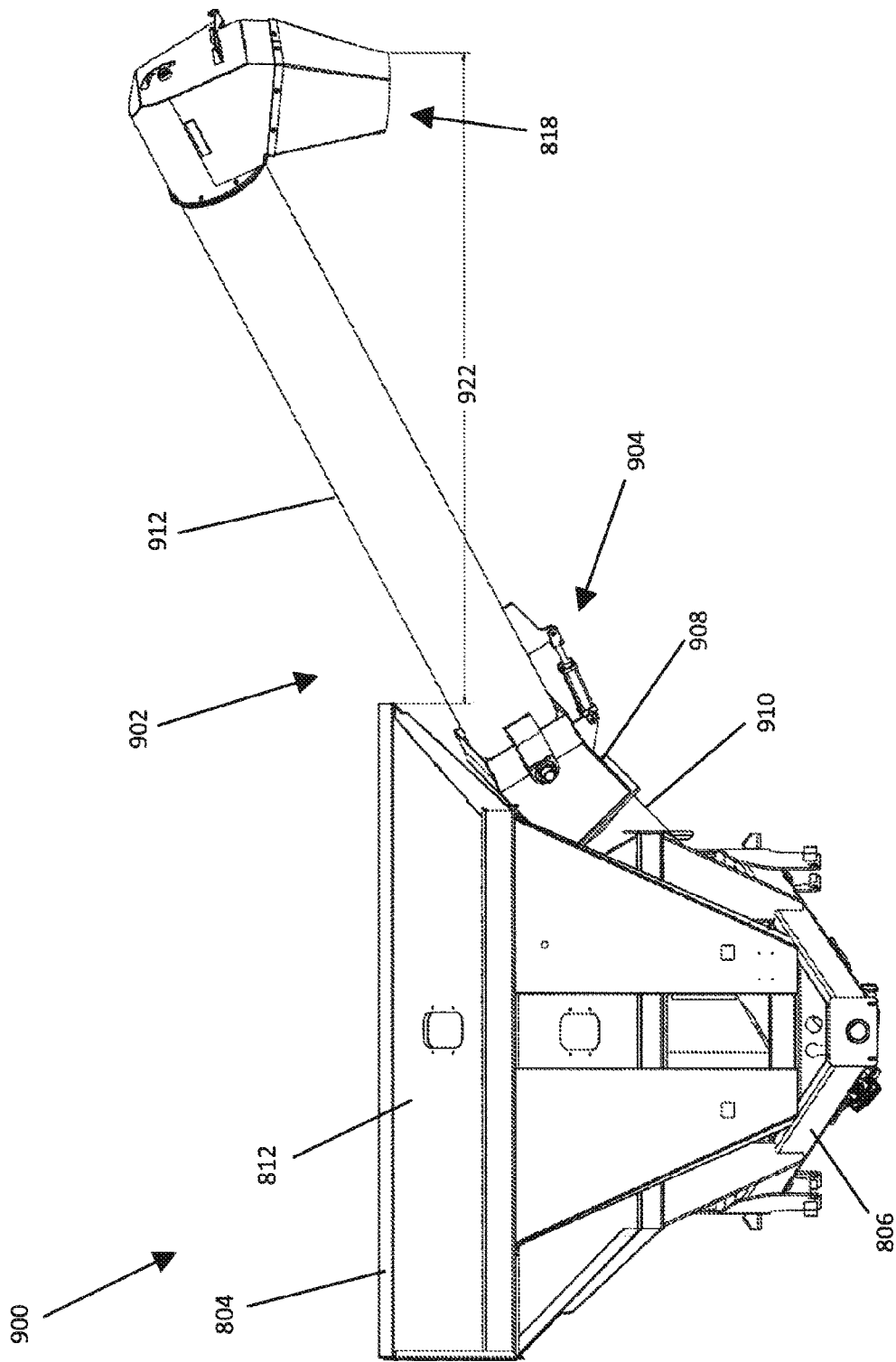
FIG. 21 is a front view of the cart of FIG. 16 with its conveyor assembly in a lowered position.
Figure 22:
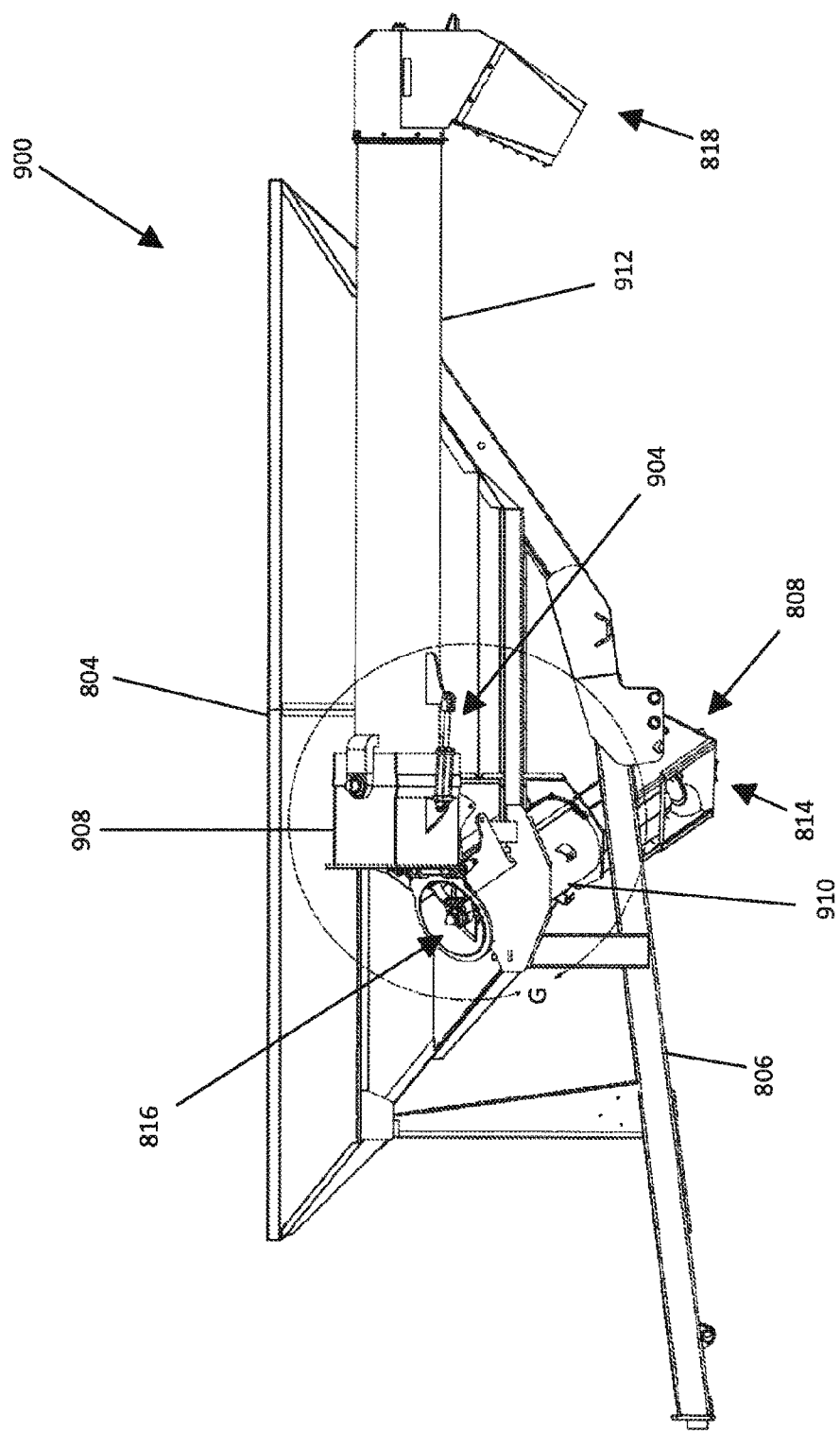
FIG. 22 is a side view of the cart of FIG. 16 with its conveyor assembly in a folded position.
Figure 23:
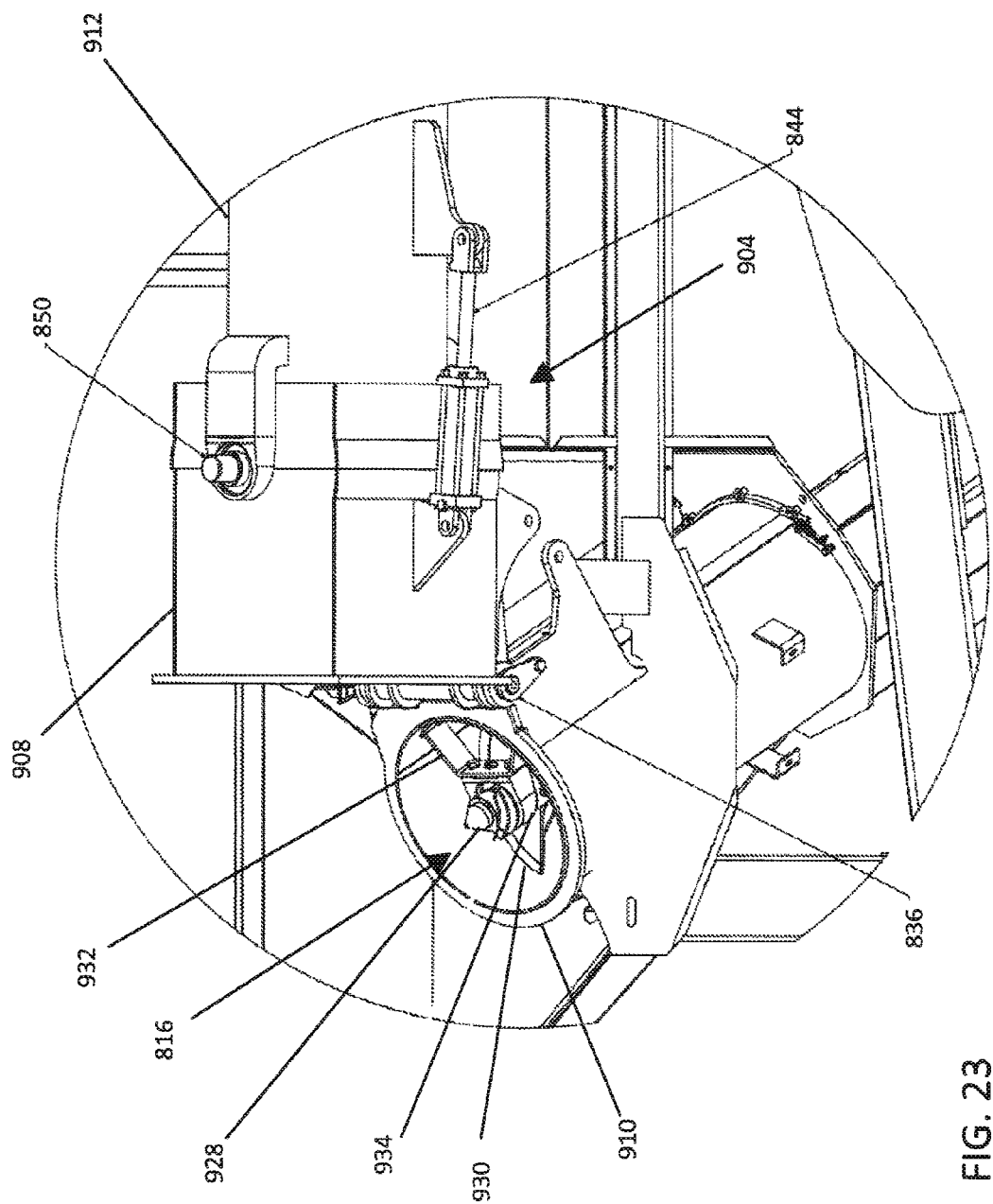
FIG. 23 is an enlarged view of section G of FIG. 23.
Figure 24:
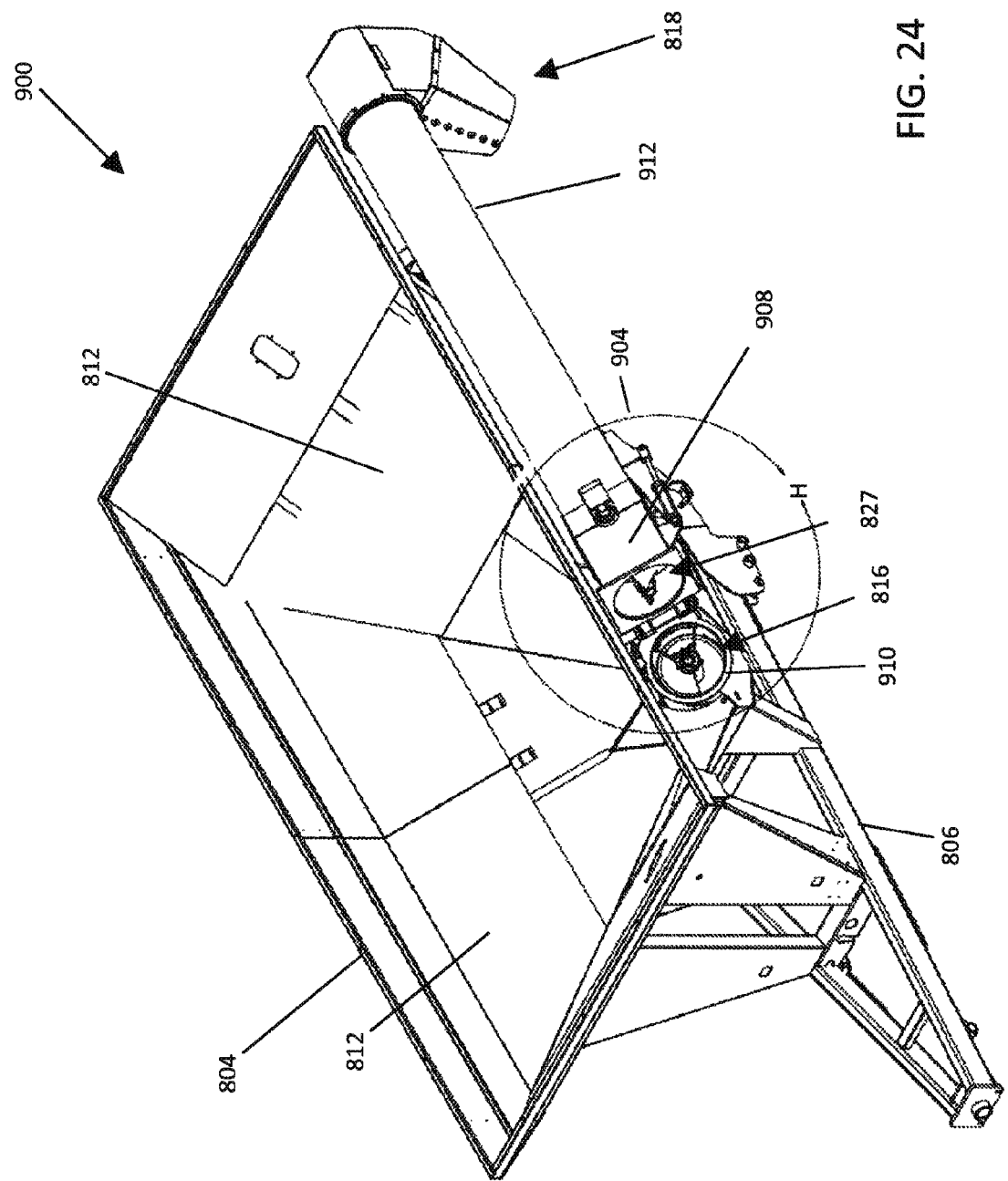
FIG. 24 is a top perspective view of the cart of FIG. 16 with its conveyor assembly in a folded position.
Figure 25:
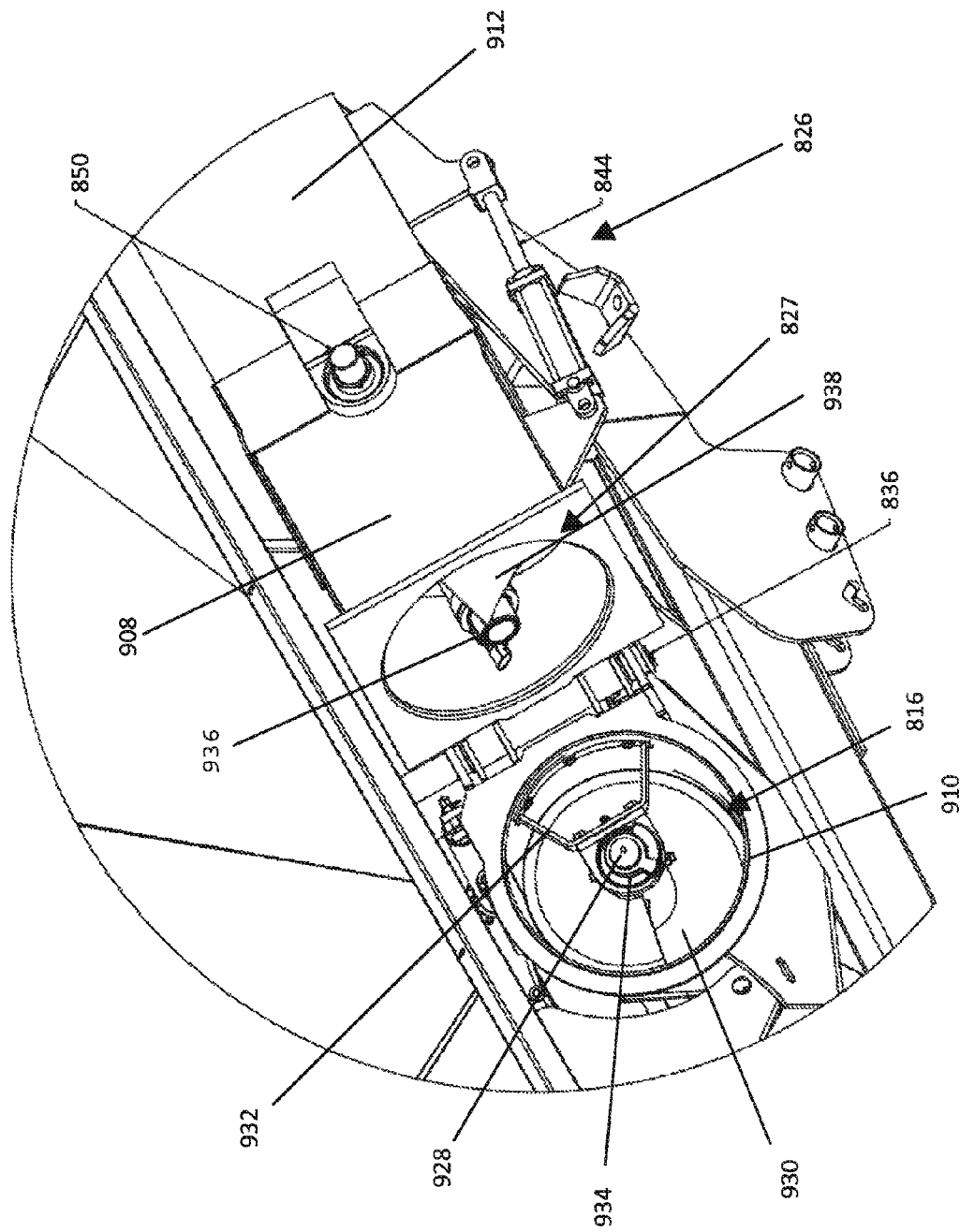
FIG. 25 is an enlarged view of section H of FIG. 24.
Figure 26:
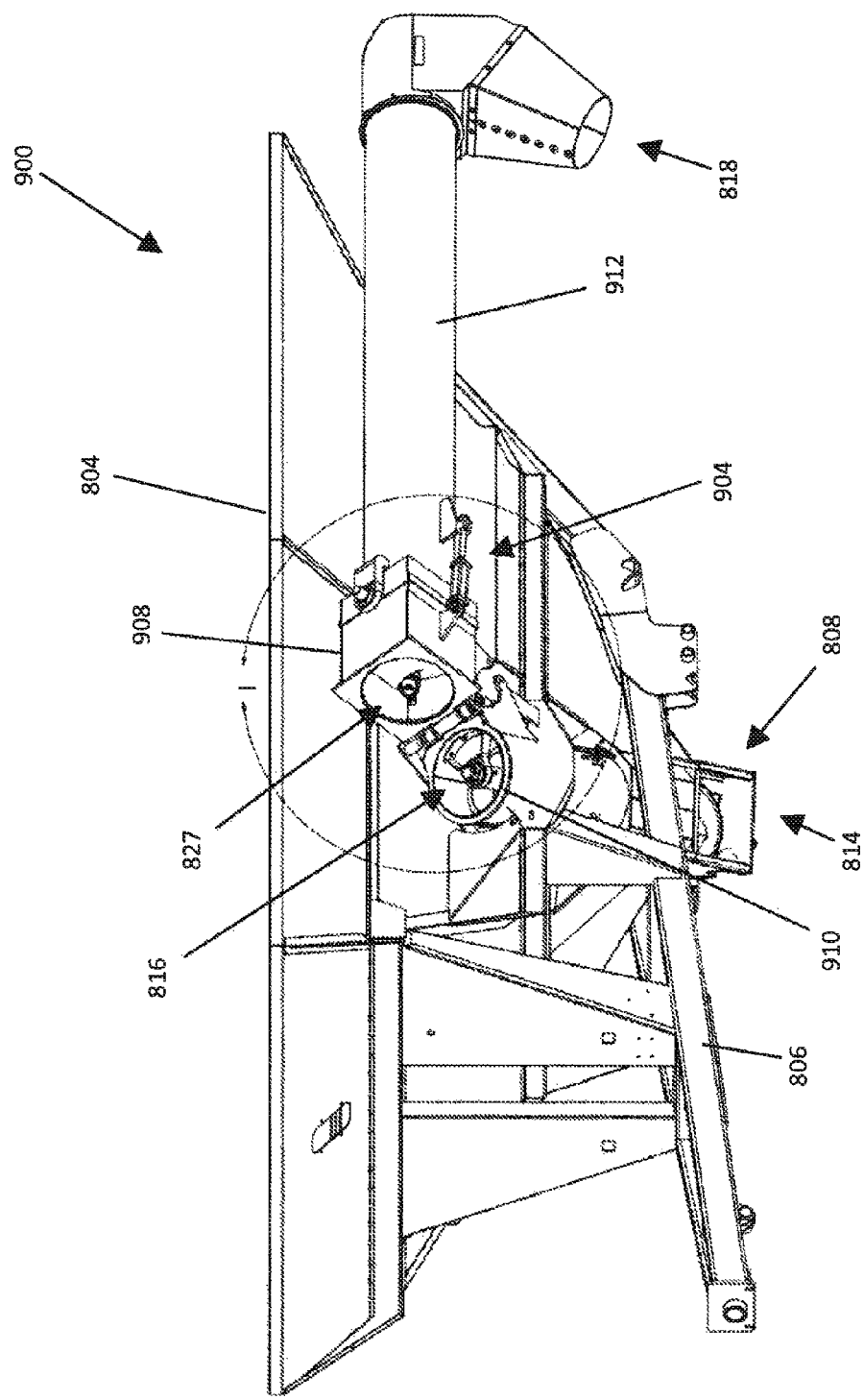
FIG. 26 is a side perspective view of the cart of FIG. 16 with its conveyor assembly in a folded position.
Figure 27:
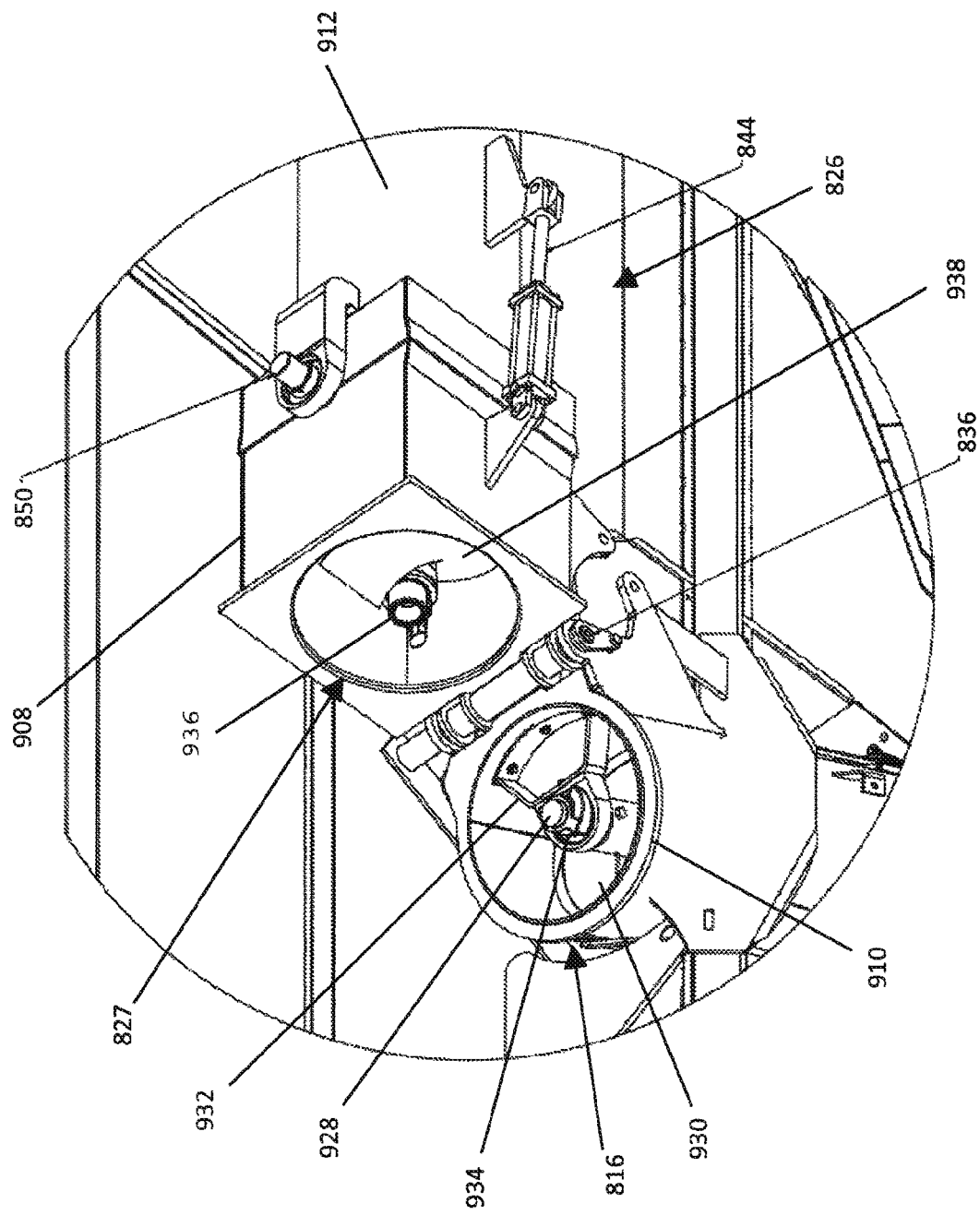
FIG. 27 is an enlarged view of section I of FIG. 26.

FIG. 16-27 illustrate various views of a grain cart 900 in accordance with another embodiment. In particular, FIG. 16 illustrates a side view of cart 900 with a conveyor assembly 902 in an elevated position and FIG. 17 illustrates an enlarged view of section E of FIG. 16. FIG. 18 illustrates a side view of cart 900 with conveyor assembly 902 in a lowered position and FIG. 19 illustrates an enlarged view of section F of FIG. 18. FIG. 20 illustrates a front view of cart 900 with conveyor assembly 902 in an elevated position and FIG. 21 illustrates a front view of cart 900 with conveyor assembly 902 in a lowered position. FIG. 22 illustrates a side view of cart 900 with conveyor assembly 902 in a folded position and FIG. 23 illustrates an enlarged view of section G of FIG. 23. FIG. 24 illustrates a top perspective view of cart 900 in a folded position and FIG. 25 illustrates an enlarged view of section H of FIG. 24. FIG. 26 illustrates a side perspective view of cart 900 in a folded position and FIG. 27 illustrates an enlarged view of section I of FIG. 26.

Cart 900 can include one or more components that correspond to components of cart 800 or other carts described herein. For convenience, parts of cart 900, such as for example frame 806, bin 804, sump 808, as well as elements of tilting assembly 904 (for tilting conveyor assembly 902 similar to tilting assembly 826) and folding assembly 906 (for folding conveyor assembly 902 similar to folding assembly 828) that have similar functions as those described above with respect to cart 800 are labelled using the same reference numbers. However, it is appreciated that these parts may have different structures, be positioned in different locations on cart 900, and/or may have other differences as are apparent by their depiction in FIGS. 16-27.

Some differences between conveyor assembly 902 and conveyor assembly 802 is that the upper conveyor housing 912 is configured to tilt relative to the intermediate housing 908, and the fold joint 830 is disposed between the intermediate housing and the lower conveyor section 910. In one embodiment, an intermediate housing flange 832 (see, e.g., FIG. 31) of intermediate housing 908 may abut against a lower conveyor housing flange 980 of lower conveyor housing 910 in an unfolded position. Another difference in the embodiment shown is that intermediate housing 908 has a box-like configuration wider than the lower conveyor housing 910 and upper conveyor housing 912. In this embodiment, intermediate housing 908 includes panels that enclose a junction between upper conveyor housing 912 and lower conveyor housing 910. The panels can, for example, include hinges that allow the panels to tilt to follow upper conveyor housing 912 as upper conveyor housing 912 is tilted. Tilting assembly 904 is rotatably fixed at a first end to intermediate housing 908 and rotatably fixed at a second end to upper conveyor housing 912. In this embodiment, folding assembly 906 is rotatably fixed at a first end to lower conveyor housing 910 or frame 806 and rotatably fixed at a second end to intermediate housing 908.

As shown, for example, in FIGS. 17 and 19, which illustrate enlarged views of a portion of cart 900, tilting assembly 904 includes a bearing arm 854 fixed to upper conveyor housing 912, and a tilt trunnion 850 fixed to intermediate housing 908 that is designed to allow upper conveyor housing 912 to tilt with respect to intermediate housing 908.

As shown in FIG. 16, which depicts a side view of cart 900 with conveyor assembly 902 in an elevated state, a length 914 between the bottom of discharge end 818 and the top of bin 804 can be about 34 and ¾ inches and a length 916 between a left edge of discharge end 818 and the left edge of bin 804 can be about 19 and $^{22}/_{32}$ inches in this elevated state. As shown in FIG. 20, which depicts a front view of cart 900 with conveyor assembly 902 in an elevated state, a length 918 between a right edge of bin 804 and a right edge of discharge end 818 can be about 123 and $^{7}/_{16}$ inches in this elevated state.

As shown in FIG. 18, which depicts a side view of cart 900 with conveyor assembly 902 in a lowered operating state or position, a length 920 between the bottom of discharge end 818 and the top of bin 804 can be about 2 and ½ inches and a length 921 between a left edge of discharge end 818 and the left edge of bin 804 can be about 12 and $^{27}/_{32}$ inches in this lowered state. As shown in FIG. 20, which depicts a front view of cart 900 with conveyor assembly 902 in a lowered state, a length 922 between a right edge of bin 804 and a right edge of discharge end 818 can be about 14 and $^{19}/_{16}$ inches in this lowered state. It is appreciated that other carts described herein can be designed such that their conveyor assemblies provide the same or similar dimensions in elevated and lowered states.

FIGS. 22, 24, and 26 illustrate views of cart 900 with conveyor assembly 902 in a folded position, with FIGS. 23, 25, and 27 illustrating respective views of sections G, H, and I of these figures. As shown for example in FIG. 23, upper conveyor housing 912 is rotated about conveyor fold hinge pin 836 in order to place conveyor assembly 902 in its folded position. In some embodiments, an interior of upper conveyor housing 912 and lower conveyor housing is exposed in this folded position. As shown for example in FIGS. 23, 25, and 27, lower conveyor 816 is in the form of an auger having a shaft 928 supporting flighting 930 for moving material through lower conveyor housing 910. A lower conveyor support 932 can be included within lower conveyor housing 910 to position lower conveyor 816 with respect to lower conveyor housing 910. Lower conveyor support 932 can be in the form of a bracket that is mounted at a first end to lower conveyor housing 910 and mounted at a second end to lower conveyor 816. Lower conveyor support 932 can include a bearing assembly 934 that allows lower conveyor 816 to rotate with respect to lower conveyor support 932. As shown for example in FIGS. 25 and 27, upper conveyor 827 can also be in the form of an auger having flighting 938 for moving material through upper conveyor housing 912. One or more upper conveyor supports can be included in upper conveyor housing 912 to position upper conveyor 827 within upper conveyor housing 912. In some embodiments, intermediate conveyor housing 908 includes an intermediate conveyor. The intermediate conveyor can also be in the form of an auger having fighting 939 for moving material through intermediate conveyor housing 908. One or more intermediate conveyor supports can be included in intermediate conveyor housing 908 to position the intermediate conveyor within intermediate conveyor housing 908.

In some embodiments, lower conveyor shaft 928 can be coupled to upper conveyor shaft 936 in the extended position such that rotational force from lower conveyor shaft 928 can be transmitted to upper conveyor shaft 936 to cause upper conveyor shaft 936 to rotate. A universal joint 940 can be used in such an embodiment that allows the transmission of force between lower conveyor shaft 928 and upper conveyor shaft 936 even if the two shafts are not perfectly aligned, such as in the case of upper conveyor housing being tilted by tilting assembly 826. An exemplary universal joint for use with conveyor assembly 902 is illustrated for example in FIG. 36.

Figure 28:
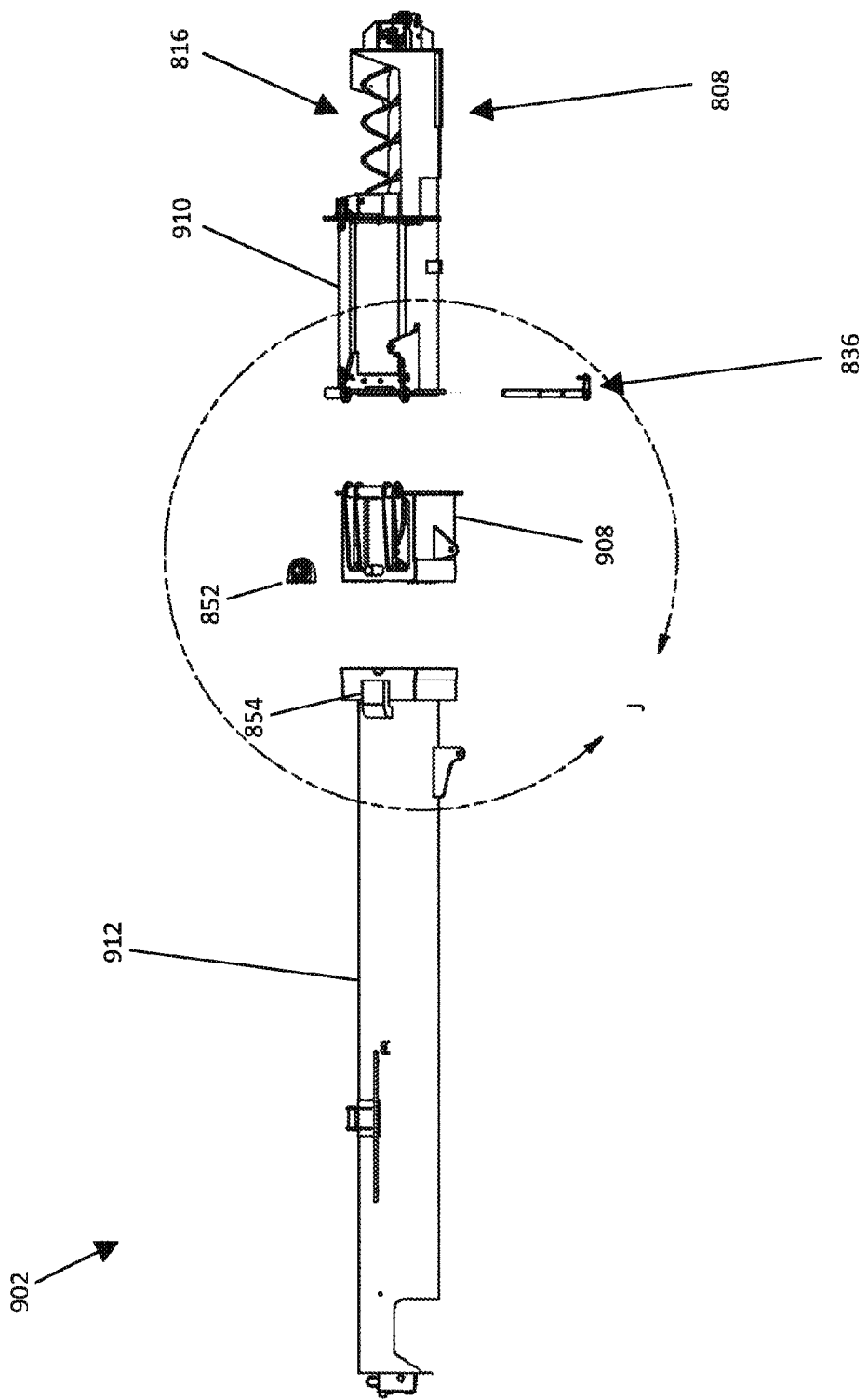
FIG. 28 is an exploded side view of the conveyor assembly of the grain cart of FIG. 16 with certain parts removed for clarity.
Figure 29:
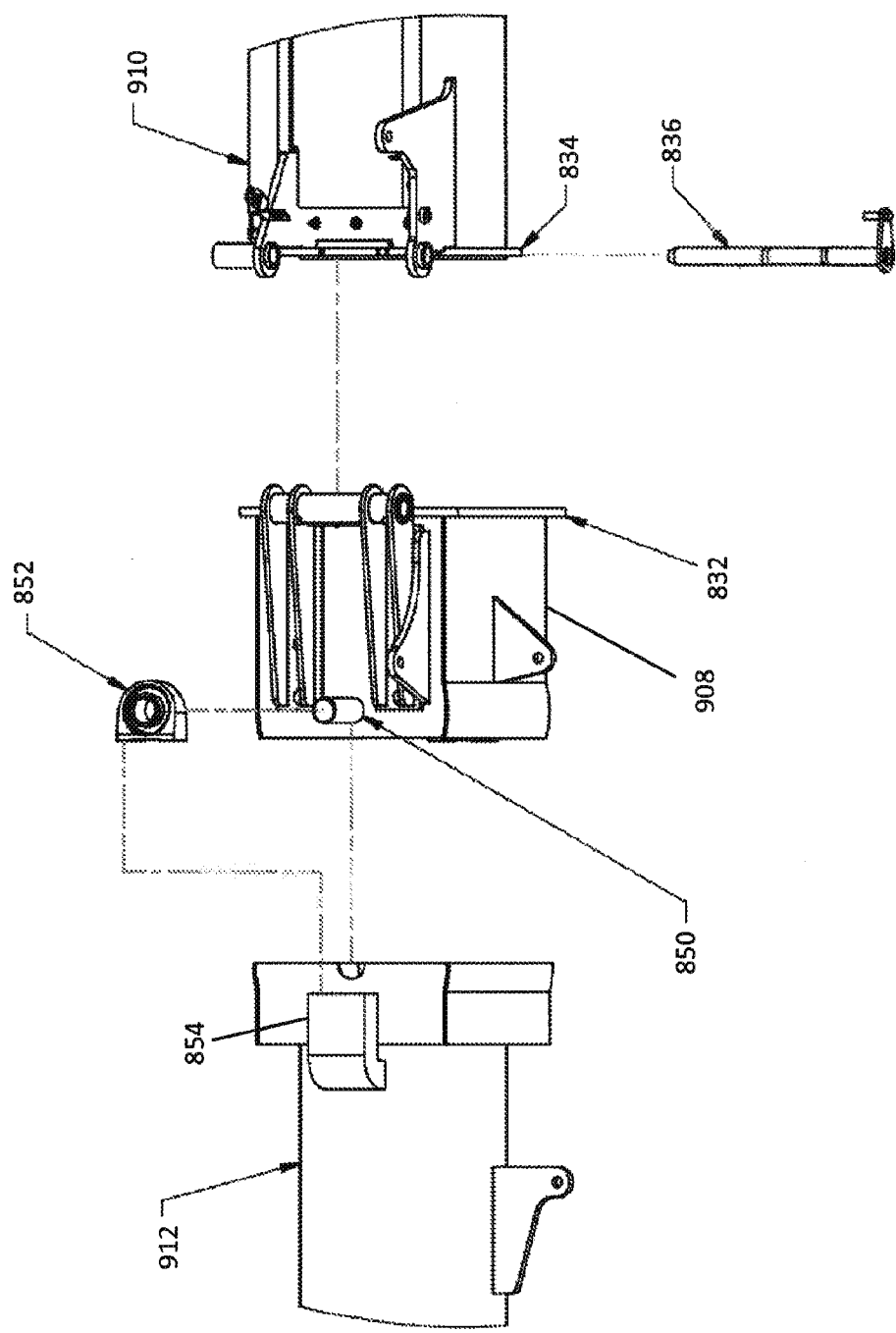
FIG. 29 is an enlarged view of section J of FIG. 28.
Figure 30:
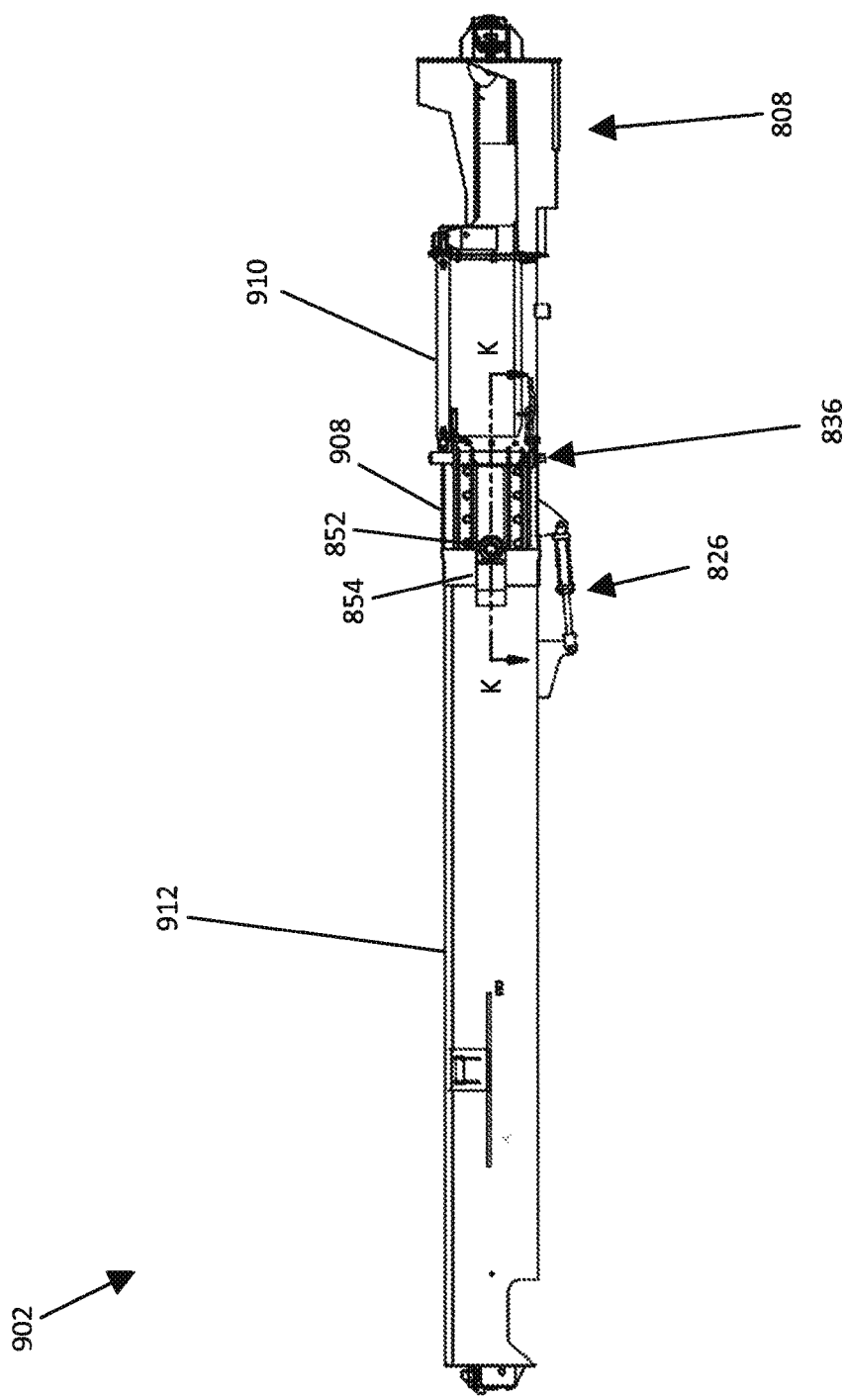
FIG. 30 is an assembled partial section side view of the conveyor assembly of the grain cart of FIG. 16 with certain parts removed for clarity.
Figure 31:
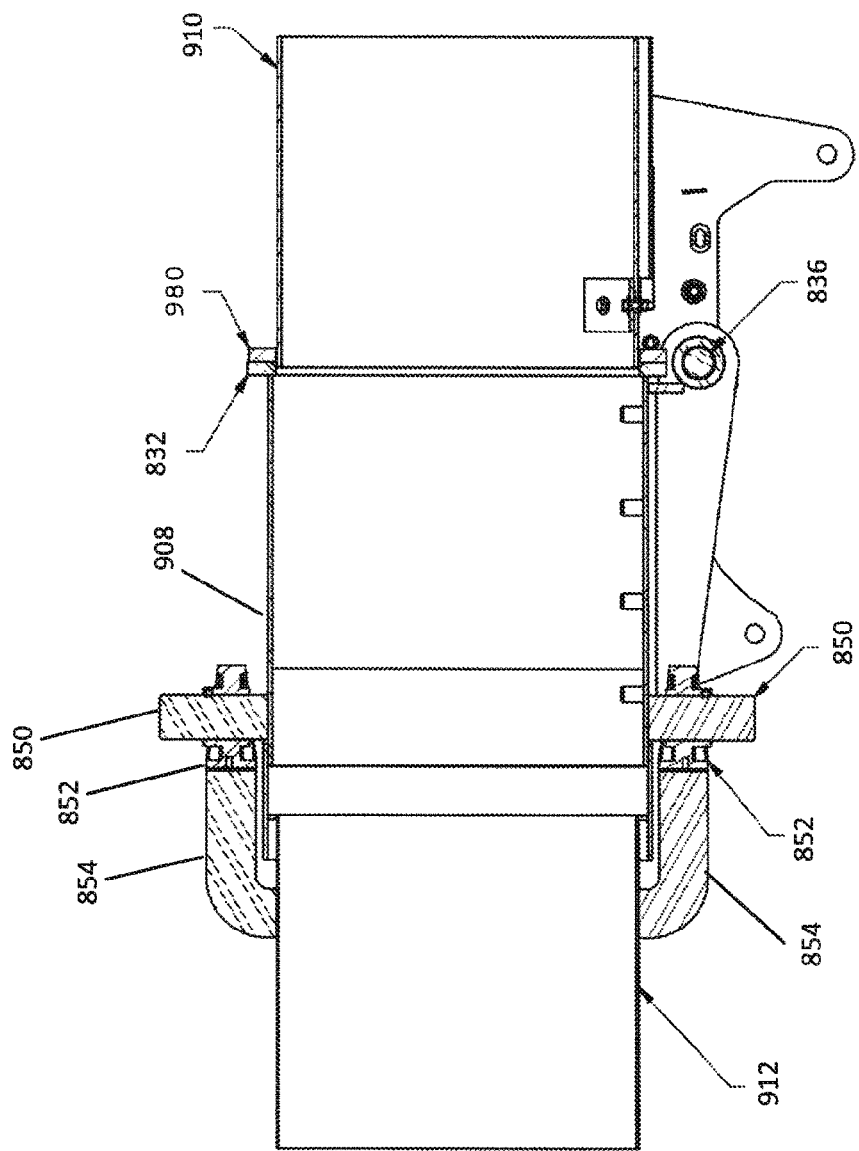
FIG. 31 is a cross-sectional view of the conveyor assembly of FIG. 30 along line K-K.
Figure 32:
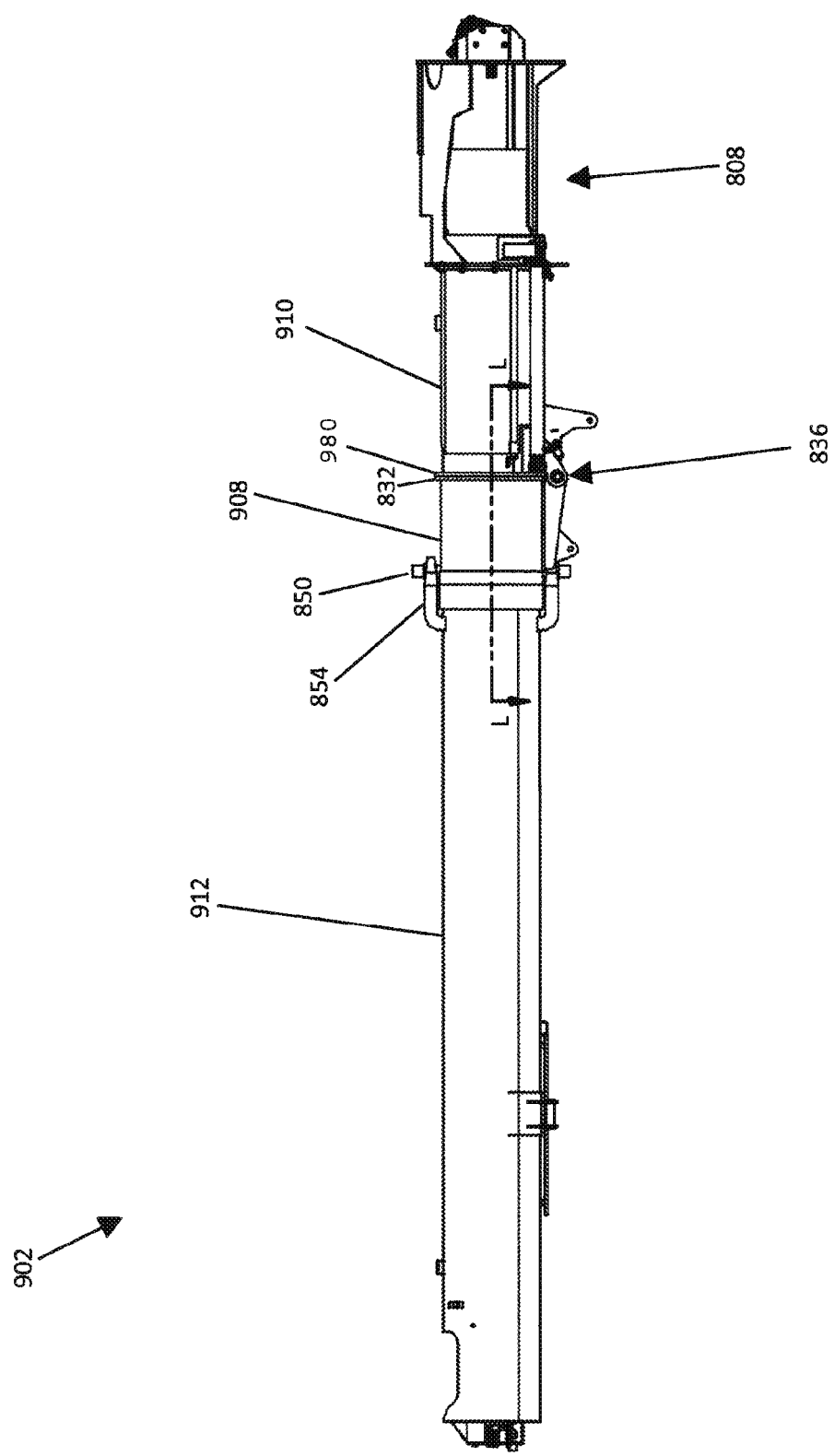
FIG. 32 is another side view of the conveyor assembly of the grain cart of FIG. 16 with certain parts removed for clarity.
Figure 33:
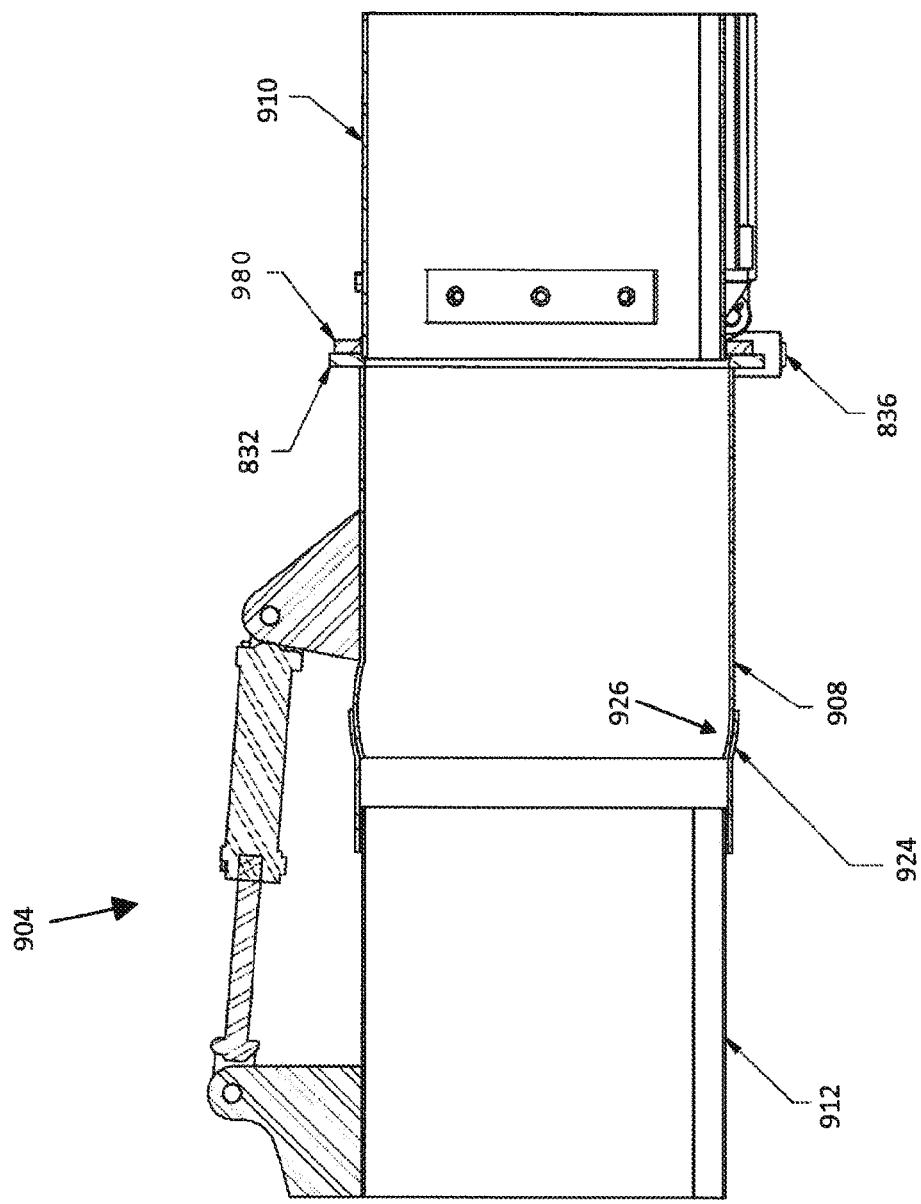
FIG. 33 is a cross-sectional view of the conveyor assembly of FIG. 32 along line L-L.

FIG. 28-33 illustrate various views of conveyor assembly 902 of grain cart 900. In particular, FIG. 28 illustrates an exploded side view of conveyor assembly 902 with certain parts removed for clarity and FIG. 29 is an enlarged view of section J of FIG. 28. FIG. 30 is an assembled partial section side view of conveyor assembly 902 with certain parts removed for clarity and FIG. 31 is a cross-sectional view along line K-K of FIG. 30. FIG. 32 is another side view of conveyor assembly 902 with certain parts removed for clarity and FIG. 33 is a cross-sectional view along line L-L of FIG. 32.

As shown for example in FIG. 33, upper conveyor housing 912 can include a rounded or curved portion 924 of convex configuration at a lower end designed to be received by or interface with a corresponding rounded or curved portion 926 of concave configuration at an upper end of the intermediate housing 908. These curved portions can, for example, be shaped to allow upper conveyor housing 912 to smoothly tilt with respect to lower conveyor housing 910 about a tilt axis defined at 850 while maintaining a seal between these housings to prevent grain or other material from escaping conveyor assembly 902. In some embodiments, these curved portions can only be present in the tilting direction of conveyor assembly 902 (as shown in FIG. 33), whereas in the non-tilting direction of conveyor assembly 902 (shown for example in FIG. 31), the corresponding portions of upper conveyor housing 912 and intermediate housing 908 are substantially flat. Such a configuration can provide for additional support in the non-tilting direction of conveyor assembly 902.

Intermediate housing 908 can fold with the upper conveyor housing 912 about a fold axis defined at 836 between an extended position wherein the upper and lower conveyors are coupled together and a stored position wherein the upper conveyor section extends rearwardly along a side of the bin. Again, in some embodiments, the fold axis can be oriented to cause the upper conveyor section to fold forwardly of the bin in the stored position. Folding of the upper conveyor section can be controlled using an actuator 838 as described above; however, in this embodiment, the actuator is coupled between the lower conveyor housing and the intermediate housing, e.g., with one end of the actuator pivotably connected to the lower conveyor section and the other end of the actuator pivotably connected to the intermediate section. As in the previous embodiment, the intermediate housing can be positioned at different locations along the length of the conveyor assembly to control a tilt height.

Figure 34:
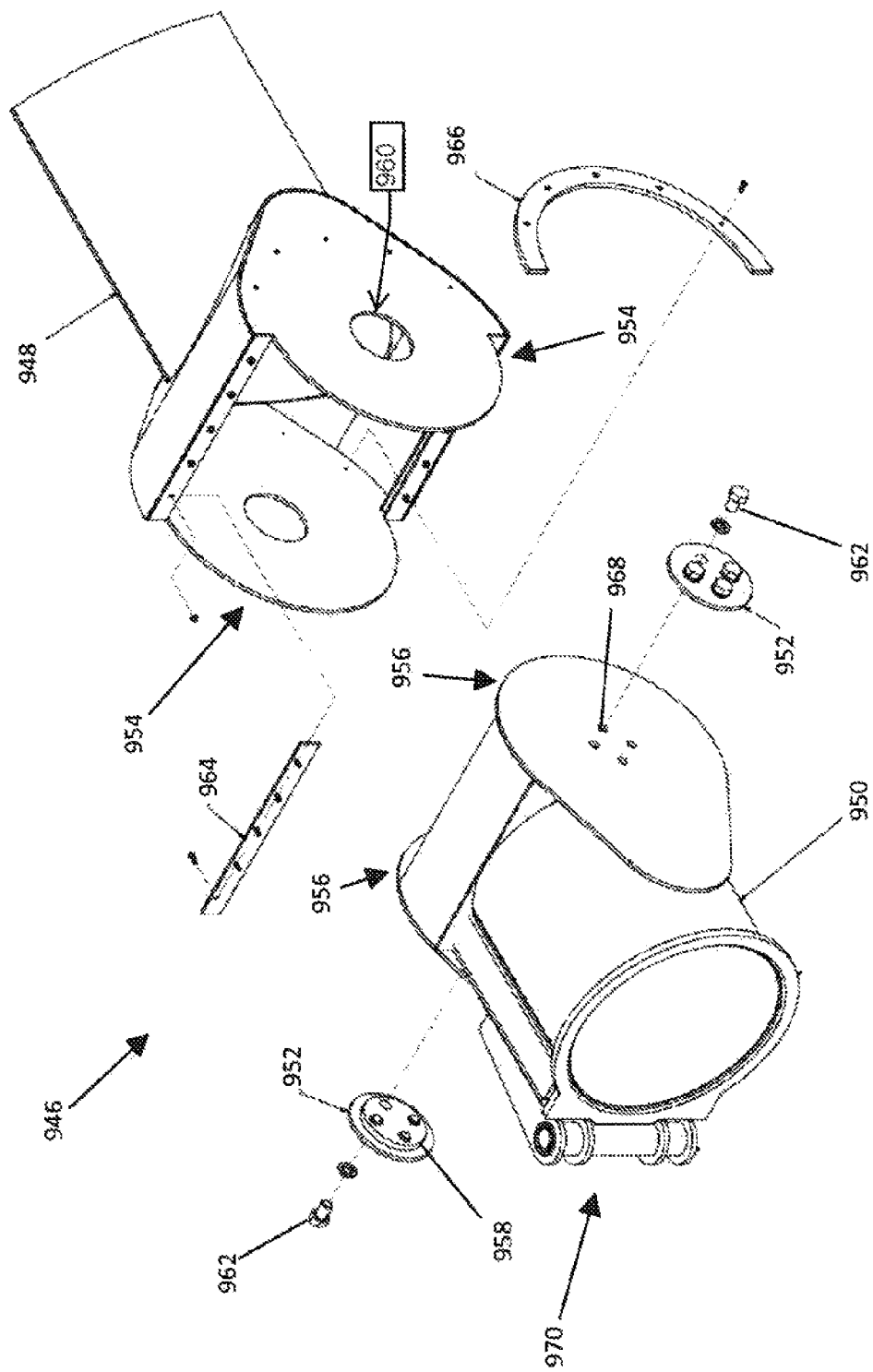
FIG. 34 is an exploded view of a portion of a conveyor assembly in accordance with another embodiment with certain parts removed for clarity.
Figure 35:
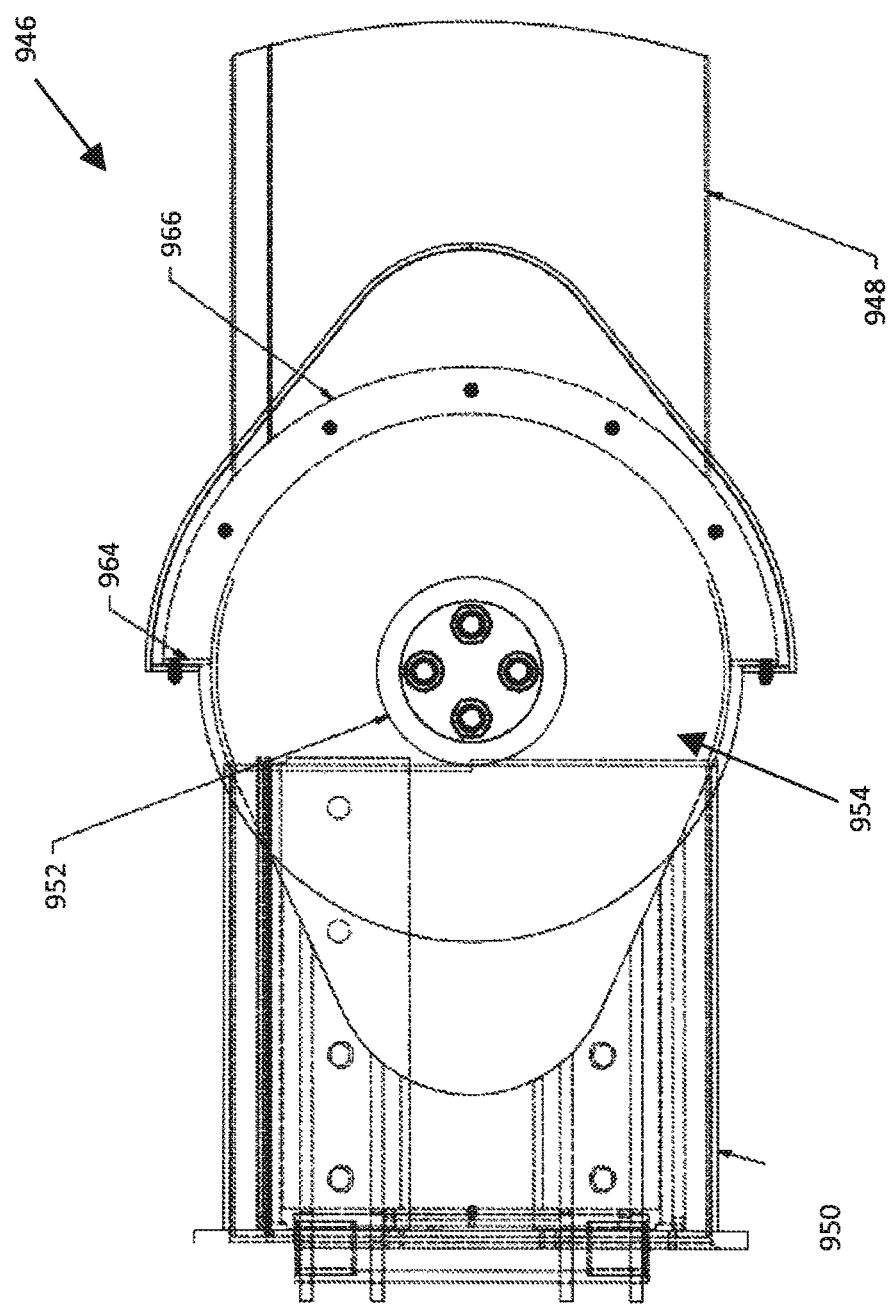
FIG. 35 is an assembled view of the portion of the conveyor assembly of FIG. 34.

FIGS. 34 and 35 illustrate a portion of another embodiment of a conveyor assembly 946 with certain parts removed for clarity. In particular, FIG. 34 is an exploded view of a portion of conveyor assembly 946 and FIG. 35 is a partially transparent assembled view of the portion of conveyor assembly 946 of FIG. 34. Conveyor assembly 946 includes an upper conveyor housing 948, an intermediate housing (or junction box) 950, and two pivot plates 952 designed to allow upper conveyor housing 948 to tilt relative to intermediate housing 950. In some embodiments, a single pivot plate 952, or more than two pivot plates 952, can be used allow upper conveyor housing 948 to tilt relative to intermediate housing 950. Upper conveyor housing 948 includes two substantially flat lateral walls 954 sized to overlap corresponding substantially flat lateral walls 956 of intermediate housing 950 when conveyor assembly 946 is assembled. The use of overlapping walls 954 and 956 as shown in FIGS. 34 and 35 is designed to allow conveyor assembly 946 to be securely tilted in a desired direction (e.g., up and down) while restricting conveyor assembly 946 from excessive movement in another direction (e.g., side-to-side). Intermediate housing 950 can further include a folding pivot 970, which can be used with other pieces of a folding assembly to allow intermediate housing 950 and upper conveyor housing 948 to fold about folding pivot 970 during transport or storage or for other uses.

Pivot plates 952 are used to rotatably secure lateral walls 954 of upper conveyor housing 948 to lateral walls 956 of intermediate housing 950. In the embodiment illustrated in FIGS. 34-35, pivot plates 952 are substantially disc-shaped and include a circular stepped surface 958 sized to correspond to a circular opening 960 in lateral wall 954 of upper conveyor housing 948. Pivot plates 952 are secured to conveyor assembly 946 by way of one or more bolts 962 passed through corresponding bolt holes 968 in pivot plates 952 and secured to intermediate housing 950. When conveyor assembly 946 is fully assembled, upper conveyor housing 948 is positioned between pivot plate 952 and intermediate housing 950, with stepped surface 958 of pivot plate 952 positioned within opening 960 of upper conveyor housing 948. The outer peripheral surface of pivot plate 952 is sized to be larger than opening 960 of upper conveyor housing 948 in order to prevent upper conveyor housing 948 from being removed from conveyor assembly 946. However, stepped surface 958 is sized to create a gap between the outer peripheral surface of pivot plate 952 and lateral wall 956 of intermediate housing 950 so as to allow lateral wall 954 (and therefore upper conveyor housing 948) to freely but smoothly rotate about pivot plate 952.

Conveyor assembly 946 further includes one or more seals, such as seal 964 and seal 966 fixed to upper conveyor housing 948 or another portion of conveyor assembly 946 to materially seal conveyor assembly 946. For example, a first seal, such as seal 964, can be designed to seal a longitudinal direction of conveyor assembly 946. Another seal, such as seal 966, can be designed to seal a lateral direction of conveyor assembly 946. In some embodiments, a single seal can be used to seal both a longitudinal and lateral direction as well as any other desired direction. In some embodiments, one or more of the seals described herein can be attached to upper conveyor housing 948 or another portion of conveyor assembly 946 via bolts, adhesive, or through other fastening arrangements.

FIG. 36 is a photograph of an exemplary universal joint 940 for use with a conveyor assembly of one or more grain carts described herein. Universal joint 940 is configured to allow a lower conveyor, such as lower conveyor 816 to engage with an upper conveyor 827 to allow lower conveyor 816 to transmit torque to upper conveyor 827 at various tilt angles. In some embodiments, a grain cart, such as one or more grain carts described herein provides torque to a lower conveyor via a power take off or other mechanical coupling. The torque from the lower conveyor is transmitted to the upper conveyor via universal joint 940 even if lower conveyor is not perfectly aligned with upper conveyor. For example, as described herein, in some embodiments, an upper conveyor housing may be tilted with respect to a lower conveyor housing via a tilting assembly. This tilting can result in a shaft of the upper conveyor being positioned at a different angle compared to a shaft of the lower conveyor. Universal joint 940 can include a support 942 mounted to the upper conveyor housing (e.g., housing 912). Universal joint 940 can be configured such that a coupling end 944 of the joint is angled in a fixed direction regardless of the angle of upper conveyor shaft 936. Coupling end 944 can transmit torque to upper conveyor shaft 936 via universal joint 940. It is appreciated that universal joint 940 can be positioned at another location within the conveyor assembly. For example, in embodiments where the intermediate housing is tilted along with the upper conveyor housing, such as in conveyor assembly 802, a universal joint can be housed within the intermediate housing or at another suitable location. In some embodiments, a third conveyor, such as a third auger for example, can be positioned within the intermediate housing. The third conveyor can be connected at a first end to the upper conveyor via a universal joint such that the second end of the conveyor is aligned with a corresponding end of the lower conveyor.

While the invention has been particularly taught and described with reference to certain preferred embodiments, those versed in the art will appreciate that modifications in form and detail may be made without departing from the spirit and scope of the invention. For example, although lift assembly 110 is shown as connected between auger housing 107 and frame 101 in FIGS. 1A, 1B and 2, lift assembly 110 may alternatively be connected between auger housing 107 and bin 103. Also, although auger housing 107 is described as having lower auger housing 108 and upper auger housing 109 pivotable between extended and retracted positions, auger housing 107 may alternatively be a single housing that is not capable of pivoting between extended and retracted positions.

For another example, although the pivoting junction box 106 is shown as having a closed bottom 401 that is flat, closed bottom 401 may alternatively have curved profile that corresponds to the shape of auger 304.

Although auger 304 is illustrated as being a corner auger located at the front left corner of bin 103 of cart 100, auger 304 may alternatively be a corner auger located any corner of bin 103. Further, the invention is also applicable to carts having an auger that is not a corner auger.

By way of further example, while the conveyor assemblies shown in FIGS. 8-33 are configured such that the upper conveyor section folds to a storage position in which the upper conveyor section extends rearwardly along a side of the bin (e.g., a left side), it will be appreciated that the conveyor assembly can be configured such that the upper conveyor section extends across a front side of the bin in the storage position.

Figure 37:
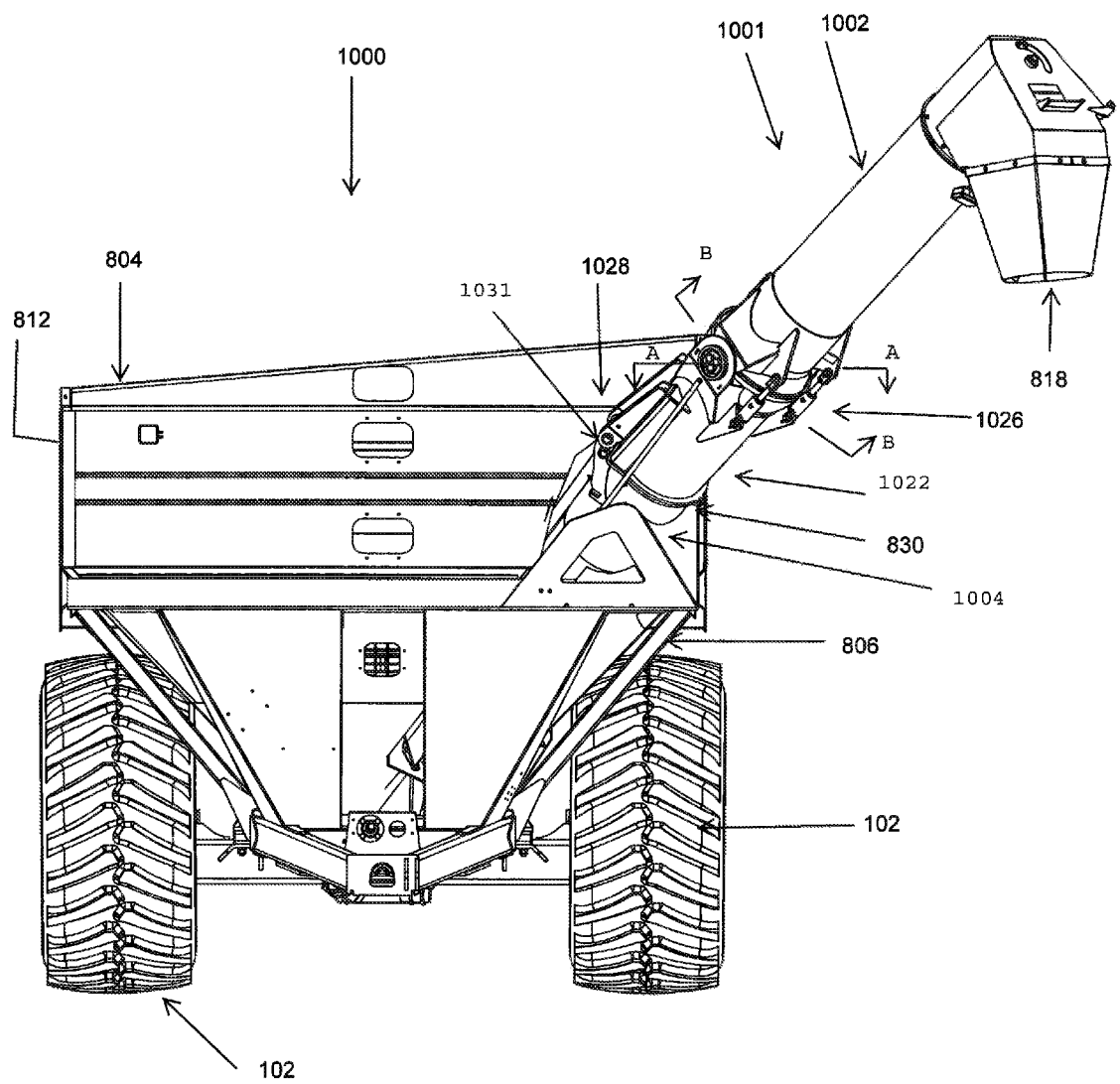
FIG. 37 is a front view of a cart in accordance with an embodiment with its conveyor assembly in an untilted or elevated operating position.
Figure 38:
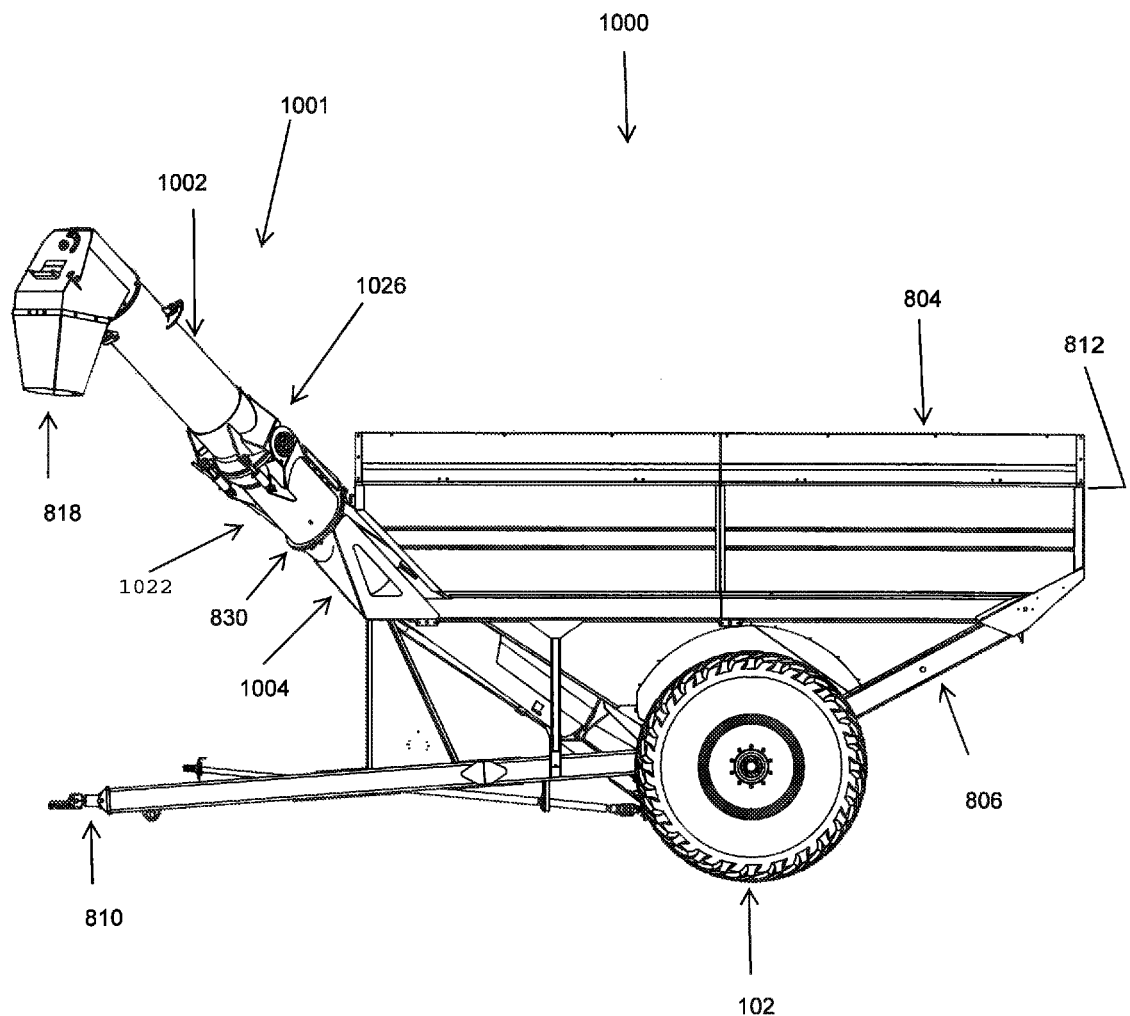
FIG. 38 is a side view of the cart of FIG. 37 with its conveyor assembly in an untilted or elevated operating position.
Figure 39:
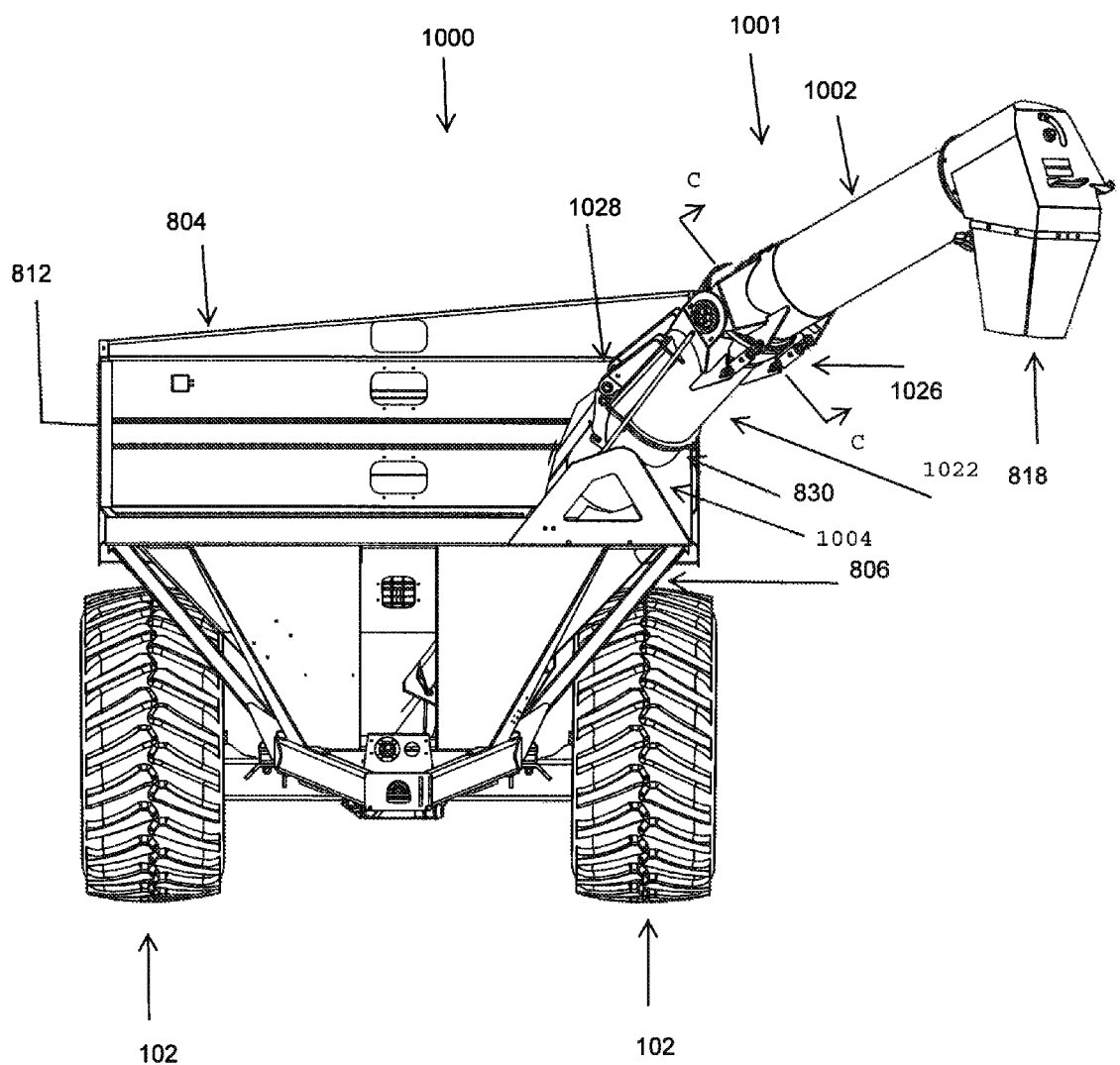
FIG. 39 is a front view of the cart of FIG. 37 with its conveyor assembly in a tilted operating position.
Figure 40:
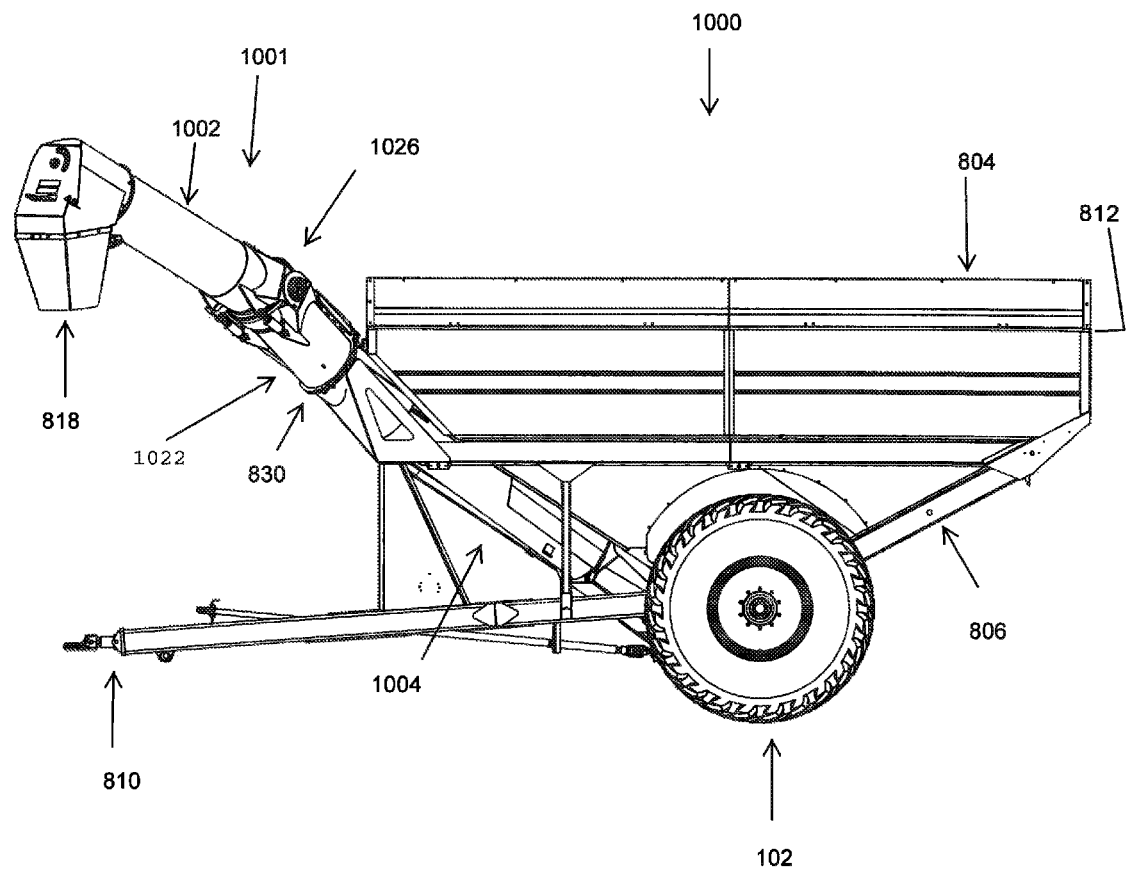
FIG. 40 is a side view of the cart of FIG. 37 with its conveyor assembly in a tilted operating position.
Figure 41:
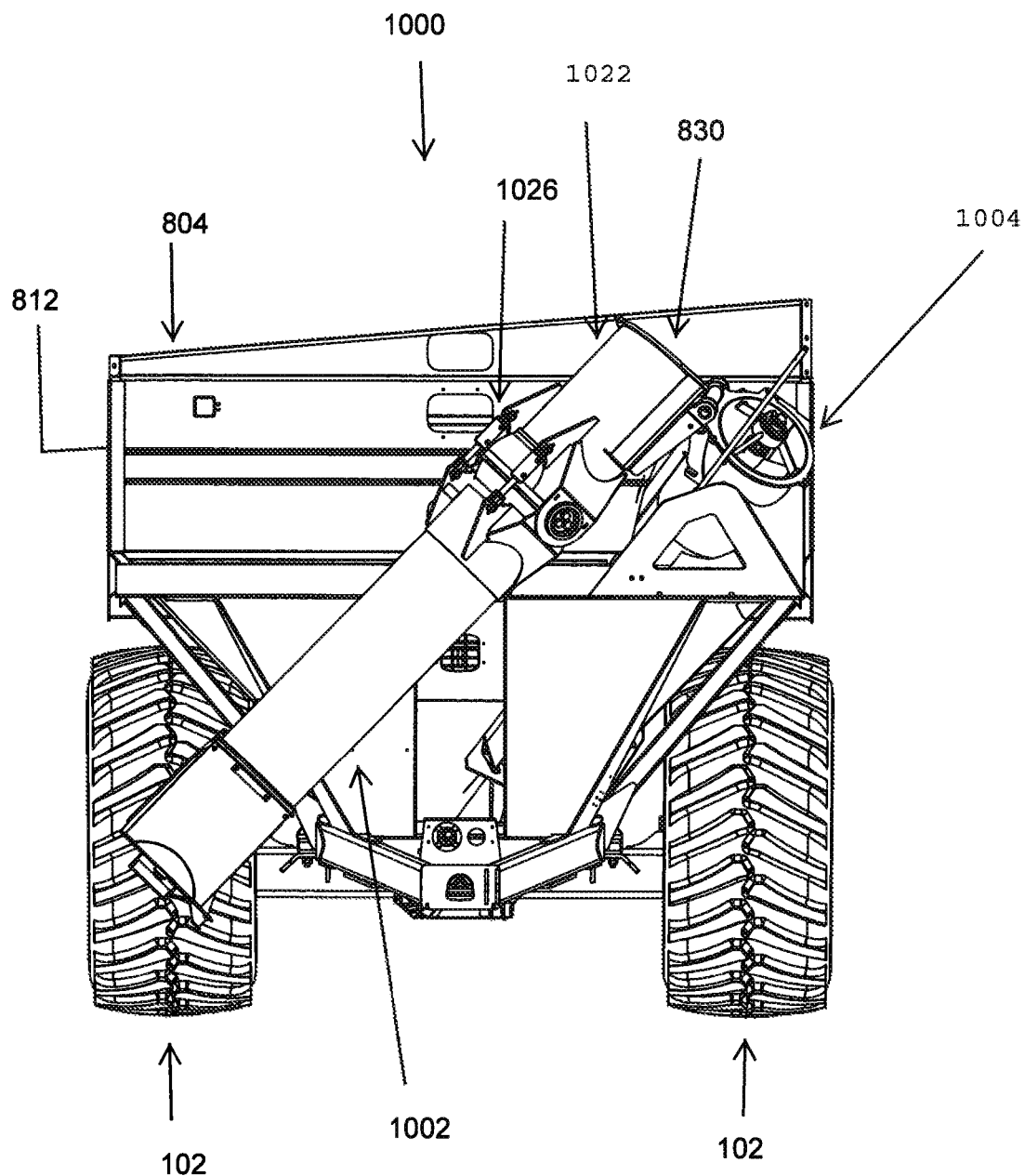
FIG. 41 is a front view of the cart of FIG. 37 with its conveyor assembly in a folded storage position.
Figure 42:
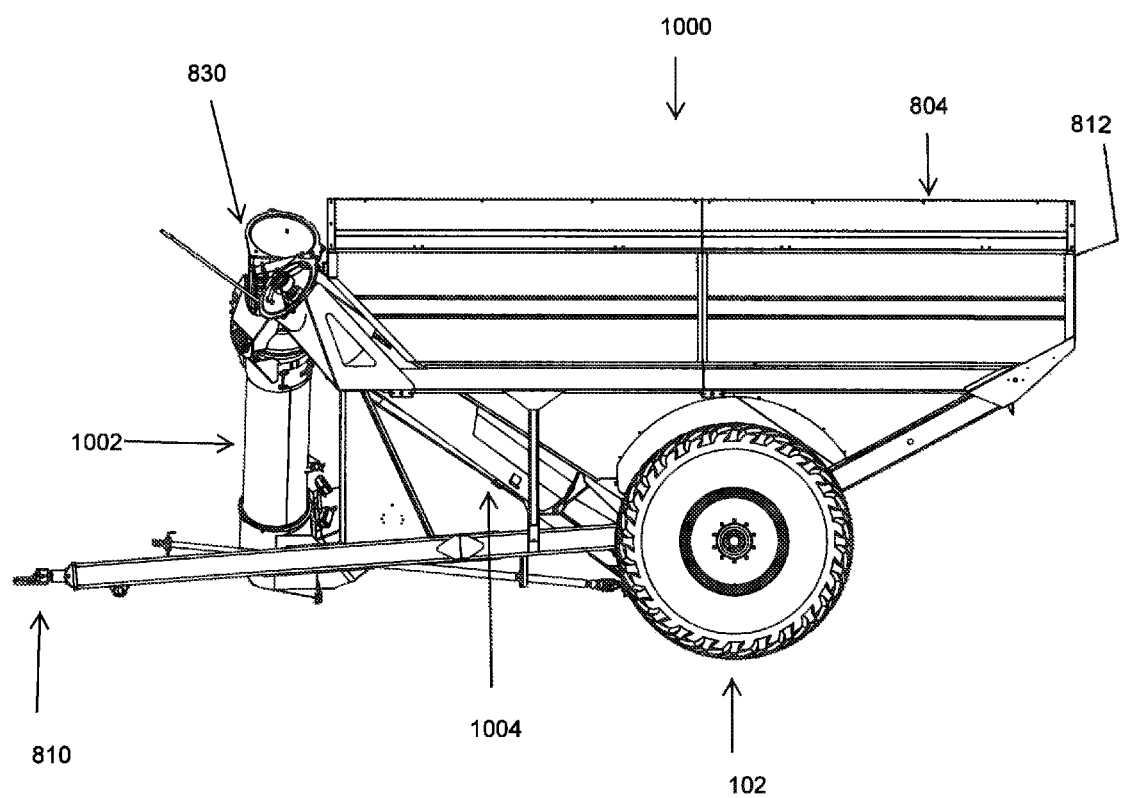
FIG. 42 is a side view of the cart of FIG. 37 with its conveyor assembly in a folded storage position.

FIGS. 37-42 illustrate various views of a grain cart 1000 in accordance with another embodiment of the present invention. In particular, FIGS. 37 and 38 illustrate front and side views of cart 1000 with a conveyor assembly 1001 in an elevated operating position. FIGS. 39 and 40 illustrate front and side views of cart 1000 with conveyor assembly 1001 in a downwardly tilted operating position. FIGS. 41 and 42 illustrate front and side views of cart 1000 with conveyor assembly 1001 in a folded position, where the upper conveyor section is folded across the front of the cart.

Cart 1000 can include one or more components that correspond to components of cart 800 or other carts described herein. For convenience, parts of cart 1000, such as for example frame 806, bin 804, discharge end 818, that have similar functions as those described above with respect to cart 800 are labelled using the same reference numbers. However, it is appreciated that these parts may have different structures, be positioned in different locations on cart 1000, and/or may have other differences as are apparent by their depiction in FIGS. 37-42. As another example, cart 1000 depicts wheels 102 attached to the frame 806, however, it is appreciated that cart 1000 can include another suitable vehicle propulsion system, such as track assemblies comprising a continuous belt or track looped around wheels.

Some differences between conveyor assembly 1001 and conveyor assembly 802 is that fold axis 1031 is on an inboard side of conveyor assembly 1001 so that upper conveyor section 1002 can be folded across or along the front (instead of the side) of cart 1000 via folding assembly 1028 at a folding joint 830. Also, like conveyor assembly 902, folding assembly 1028 of conveyor assembly 1001 is located at the intersection of the intermediate and lower conveyor sections 1022 and 1004 so that the upper and intermediate sections 1002 and 1022 fold as a unit relative to the lower conveyor section 1004. A tilting assembly 1026 is located at an opposite end of the intermediate conveyor section 1022 to permit the upper conveyor section 1002 to tilt relative to the intermediate conveyor section.

Referring now to FIGS. 43-48, it can be seen that conveyor 1001 also includes a tilting assembly 1026 according to another embodiment of the invention. The tilting assembly 1026 is illustrated with reference numbers from cart 800, however it is appreciated that the assembly can be used in any of the carts described herein, such as carts 800, 900 or 1000. Some differences between tilting assembly 1026 and that shown in FIGS. 13 and 14 are that the bearing arms 854 in tilting assembly 1026 extend laterally outward from opposed ends of the upper and intermediate conveyor sections 1002 and 1022 and mate telescopically with one another. When assembled together, openings in the bearing arms are longitudinally aligned so that a pivot plate or bearing assembly 952 may extend through the bearing arms and across the conveyor sections and define a trunnion on diametrically opposite sides of the conveyor about which the upper conveyor section may pivot for tilting. Pivot plate or bearing assembly 952 may, in one embodiment, have a main body 958 of cylindrical configuration and a circular rim 959 of larger diameter, with two bolt holes extending through the assembly and a central shaft or pin 961 extending inwardly from the main body. The main body 958 of the bearing assembly fits rotatably within opening 960 in bearing arm 854 of the intermediate section, and rim 958 engages an outer surface of the bearing arm 854. Pivot plate/bearing assembly 952 is retained by bolts 962 to bearing arm 854 of the upper section 1002. The upper section 1002 pivots about opening 960. The pivot plate or bearing assembly 952 may comprise an inner collar that fits within an outer collar. The intermediate housing 1022 may also comprise a curved exterior or convex surface 856 and the upper conveyor housing may comprise a curved interior or concave surface 858. In another embodiment, the intermediate housing may comprise a curved interior or concave surface and the lower or upper conveyor housings may comprise a curved exterior or convex surface. A seal 1064 may be mounted between exterior and interior (or convex and concave) portions of the tilting assembly 1026 to prevent grain from seeping through gaps between the surfaces. In a preferred embodiment, the seal 1064 is located at a forwardmost or endmost edge of one of the curved surfaces and spaced rearwardly of the other curved surface so that it remains in engagement with the curved surfaces throughout the range of tilt motion.

Figure 43:
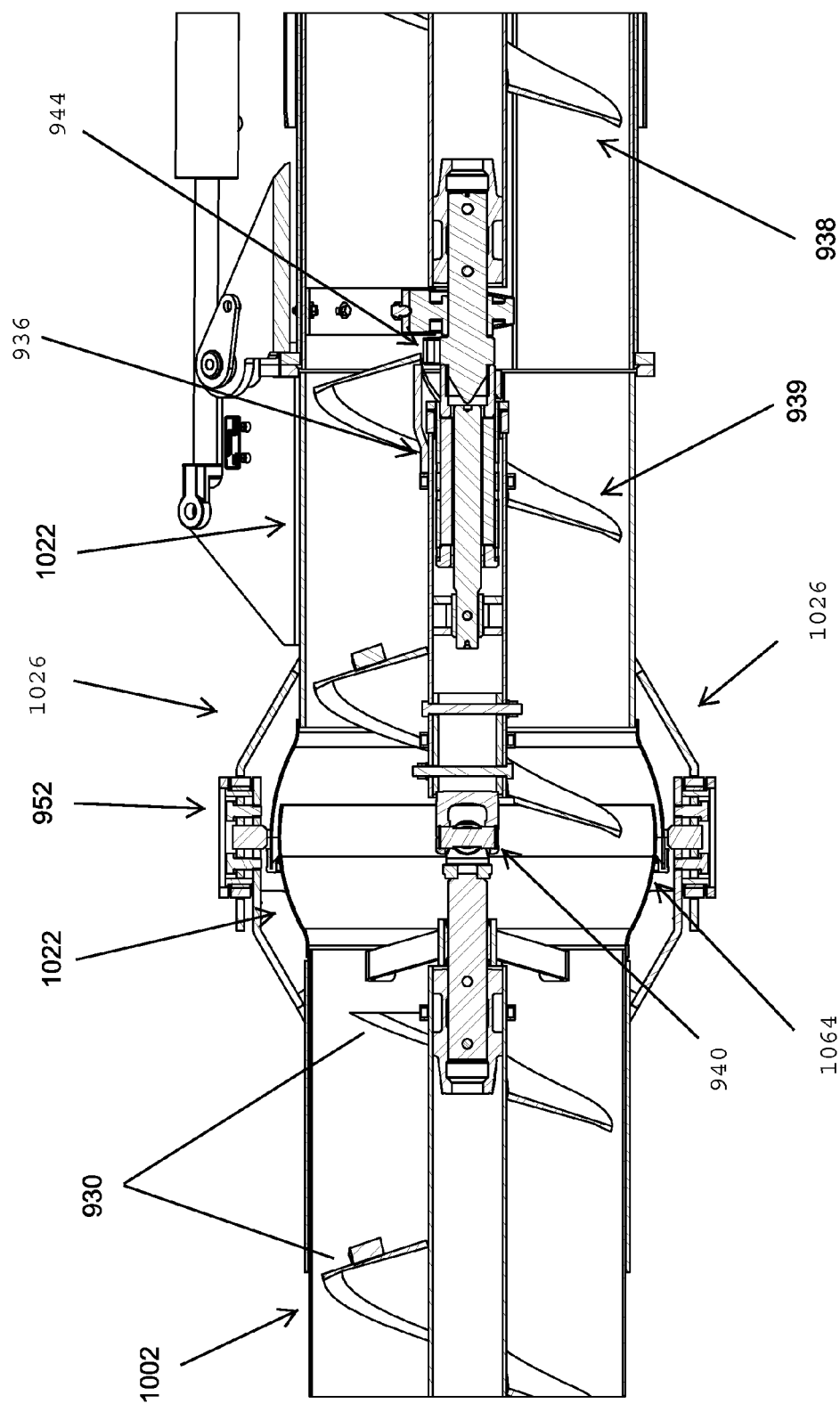
FIG. 43 is an enlarged sectional view of the conveyor assembly taken through section A-A of FIG. 37.
Figure 44:
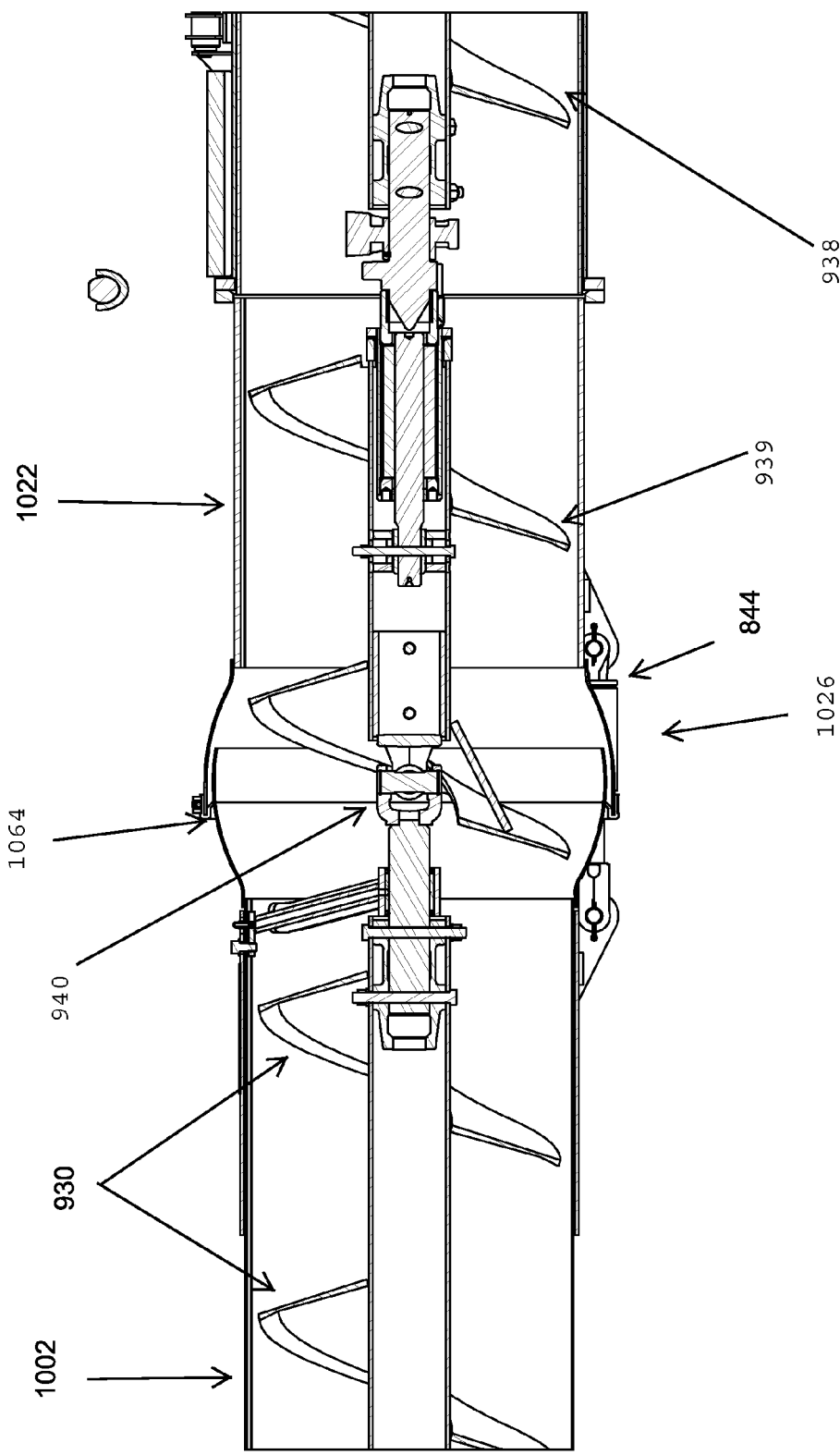
FIG. 44 is an enlarged sectional view of the conveyor assembly taken through section B-B of FIG. 37.
Figure 45:
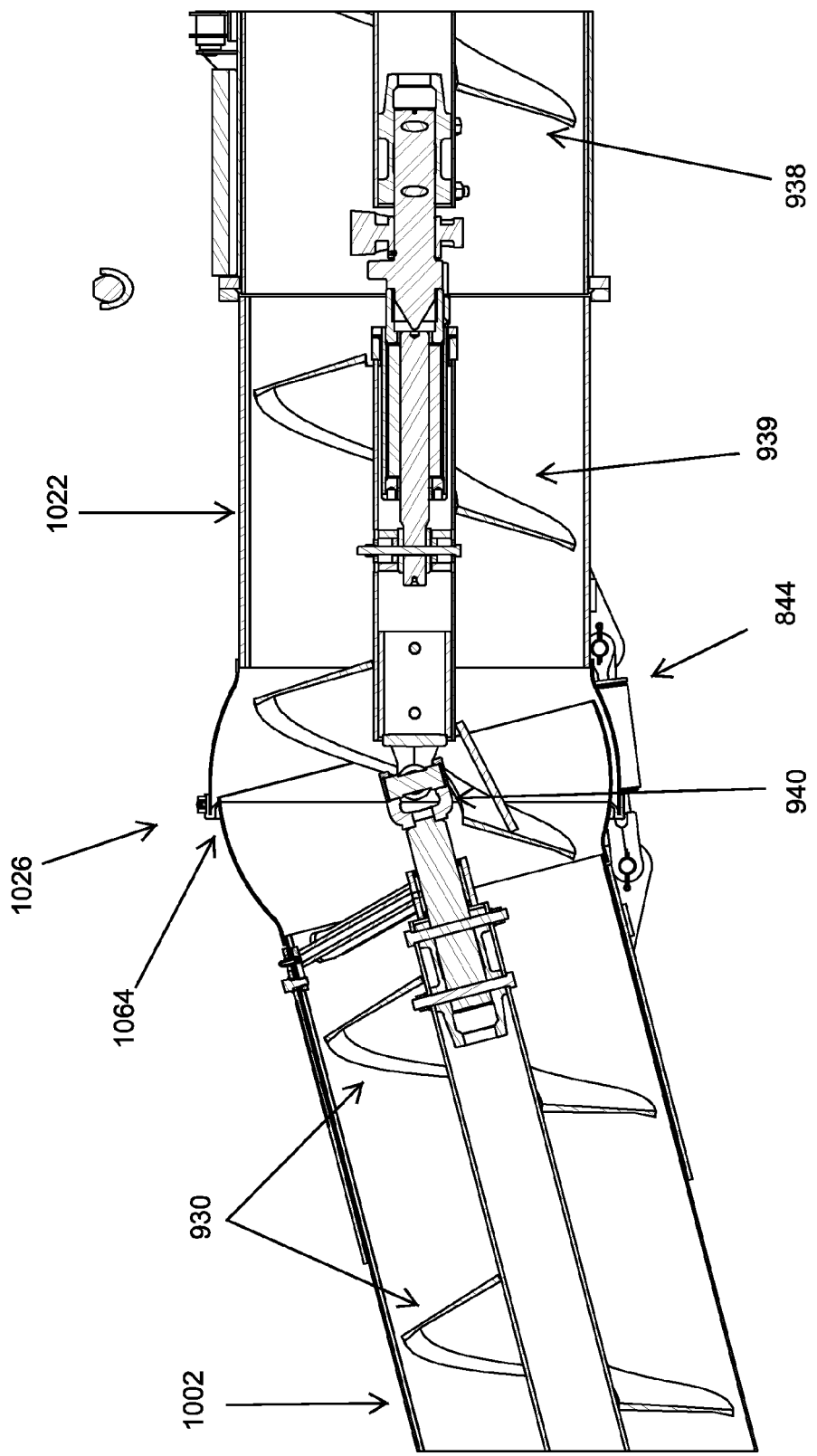
FIG. 45 is an enlarged sectional view of the conveyor assembly taken through section C-C of FIG. 39.
Figure 46:
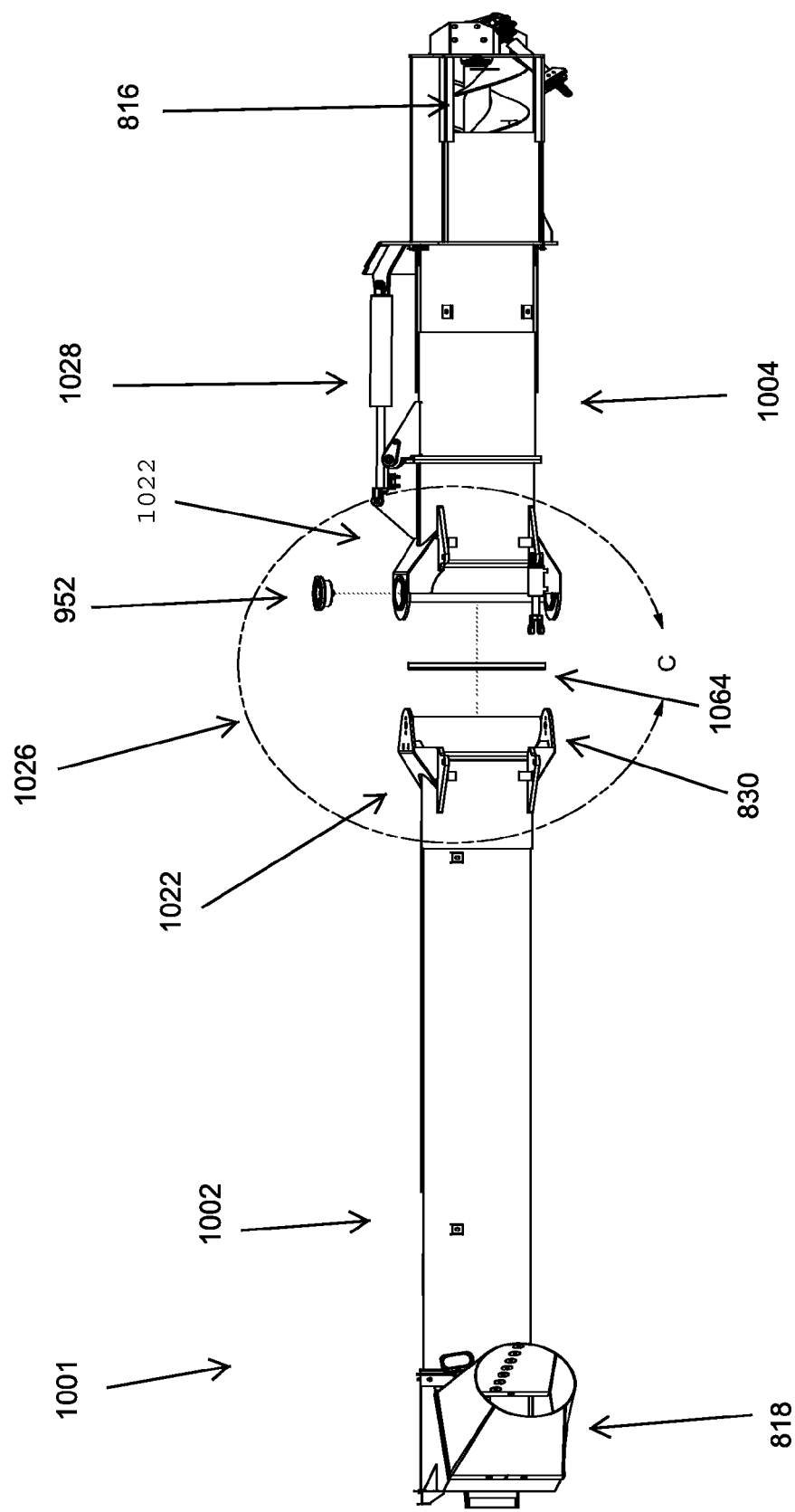
FIG. 46 is an exploded side view of the conveyor assembly of a grain cart according to an exemplary embodiment of the present invention.
Figure 47:
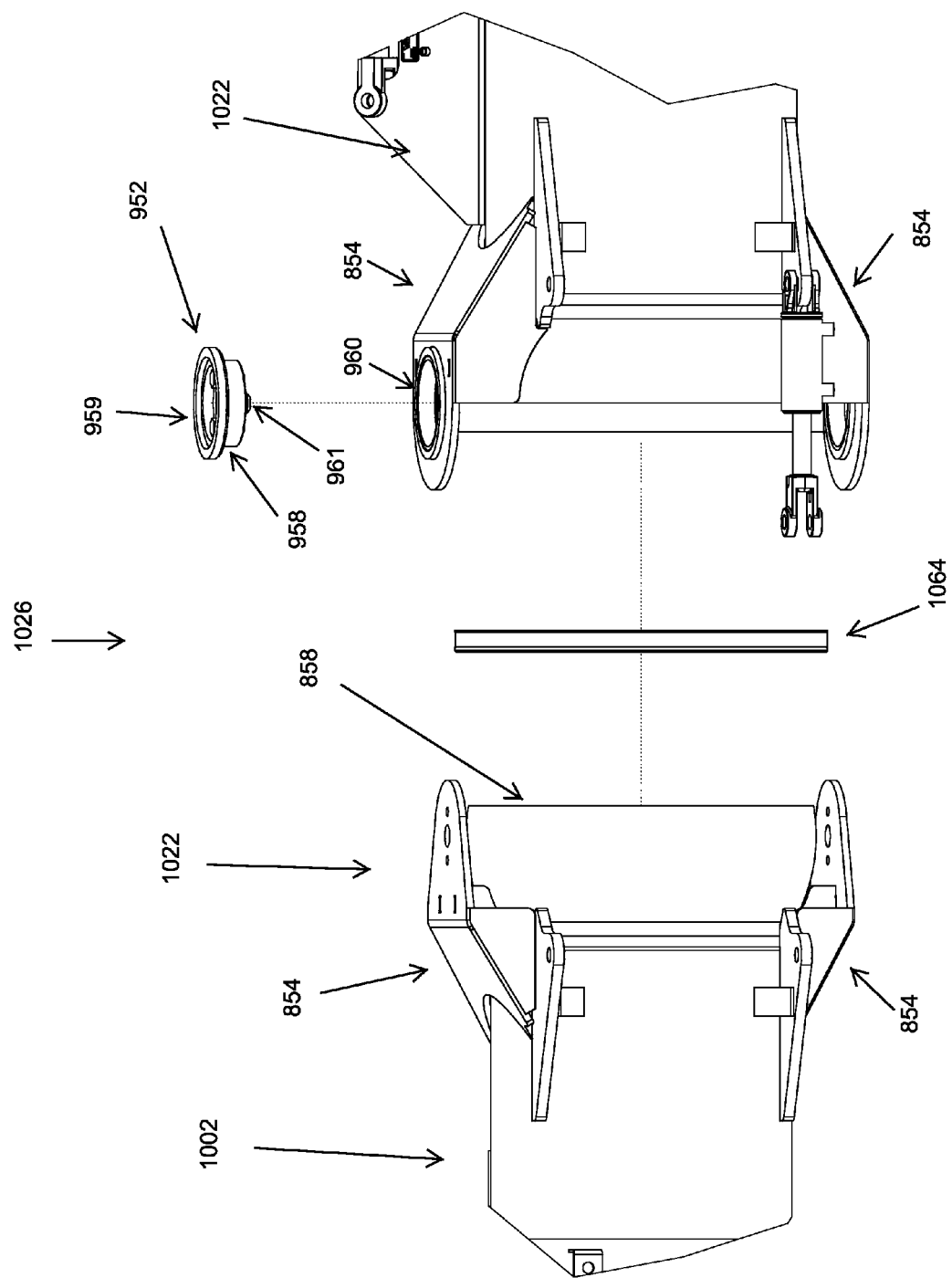
FIG. 47 is an enlarged view of section C of FIG. 46.

Exemplary auger flighting inside the conveyor housing is also shown in FIGS. 43-45. The flighting 930 and 938 can be right-hand or left-hand spirals, with standard, short, or long pitch. The flighting blade can be vertical to the center of the housing or inclined to varying degrees (cupped). The flighting blade thickness can be tailored to the material to be conveyed. The lower conveyor, comprising the lower flighting 930, and the intermediate conveyor, comprising intermediate flighting 939, can be connected by a universal joint 940, in order to transmit torque.

While various embodiments/variations of the present invention have been described above, it should be understood that they have been presented by way of example only, and not limitation. Thus, the breadth and scope of the present invention should not be limited by any of the above-described exemplary embodiments. Further, unless stated, none of the above embodiments are mutually exclusive. Thus, the present invention may include any combinations and/or integrations of the features of the various embodiments. For example, while the conveyor is shown as an auger with flighting, it will be appreciated that other types of conveyors, such as belt conveyors, can be used. Also, while wheels are shown coupled to a frame in the various embodiments, it will be appreciated that track assemblies comprising a track or belt looped around a plurality of wheels may be used. All numbers in this description and figures indicating amounts, ratios of materials, physical properties of materials, and/or use are to be understood as modified by the word "about," except as otherwise explicitly indicated. Dimensions shown in the figures are designated in inches. The choice of materials for the parts described herein can be informed by the requirements of mechanical properties, temperature sensitivity, moldability properties, or any other factor apparent to a person having ordinary skill in the art. For example, one or more of the parts described herein (or a portion of one of the parts) can be made from suitable metals, alloys, plastics, and/or other suitable materials.

In the preceding specification, various preferred embodiments have been described with reference to the accompanying drawings. It will, however, be evident that various modifications and changes may be made thereto, and additional embodiments may be implemented, without departing from the broader scope of the invention. The specification and drawings are accordingly to be regarded in an illustrative rather than restrictive sense. It is also appreciated that the steps of the various methods described herein may be performed in any suitable order. These and other modifications of the present invention are intended to be within the scope of the appended claims.

What is claimed is:

1. A cart for transporting and conveying agricultural materials comprising:
   a frame;
   a plurality of wheels coupled with the frame;
   a bin supported on the frame and including a plurality of bin walls defining a storage space for an agricultural material;
   a conveyor assembly having an intake end configured to receive agricultural material from the bin and a discharge end configured to discharge agricultural material, the conveyor assembly including a lower conveyor section, an intermediate conveyor section, and an upper conveyor section;
   the lower conveyor section including a lower conveyor housing and a lower conveyor extending within the lower conveyor housing, the intermediate conveyor section including an intermediate conveyor housing, and the upper conveyor section including an upper conveyor housing and an upper conveyor extending within the upper conveyor housing;
   a folding assembly coupled to an end of the intermediate conveyor housing and having a fold axis, the folding assembly configured to move the upper conveyor section between a stored position and an operating position, wherein a longitudinal axis of the lower conveyor section, a longitudinal axis of the intermediate conveyor section and a longitudinal axis of the upper conveyor section are coplanar when the upper conveyor section is in the operating position; and
   a tilting assembly coupled to an end of the intermediate conveyor housing and having a tilt axis, the tilting assembly configured to pivot the upper conveyor section about the tilt axis when the upper conveyor section is in the operating position.

2. The cart of claim 1, wherein the intermediate conveyor section is disposed between the upper and lower conveyor sections, and wherein the intermediate conveyor section has a first end adjacent the upper conveyor section and a second end adjacent the lower conveyor section.

3. The cart of claim 2, wherein the fold axis is positioned at the second end of the intermediate conveyor section and the tilt axis is positioned at the first end of the intermediate conveyor section, such that the upper conveyor section is tiltable relative to the intermediate and lower conveyor sections and the upper and intermediate conveyor sections are foldable relative to the lower conveyor section.

4. The cart of claim 3, wherein the tilting assembly includes a curved convex surface on one of the upper and intermediate conveyor housings and a concave surface on the other of the upper and intermediate conveyor housings configured to receive the convex surface and to allow tilting of the upper conveyor section relative to the intermediate conveyor section.

5. The cart of claim 4, wherein the tilt assembly further includes an elastic seal member engaging one of the convex and concave surfaces to keep material from escaping the conveyor housing.

6. The cart of claim 3, wherein the tilt assembly includes at least one trunnion extending from one of the upper and intermediate conveyor housings and at least one bearing assembly on the other housing configured to receive the at least one trunnion.

7. The cart of claim 3, wherein the tilting assembly includes a linear actuator having one end connected to the upper conveyor section and another end connected to the intermediate conveyor section.

8. The cart of claim 3, wherein the folding assembly includes a linear actuator having one end connected to the intermediate conveyor section and another end connected to one of the lower conveyor section and the frame.

9. The cart of claim 2, wherein the fold axis is positioned at the first end of the intermediate conveyor section and the tilt axis is positioned at the second end of the intermediate conveyor section, such that the upper and intermediate conveyor sections are tiltable relative to the lower conveyor section and the upper conveyor section is foldable relative to the intermediate and lower conveyor sections.

10. The cart of claim 9, wherein the tilting assembly includes a curved convex surface on one of the lower and intermediate conveyor housings and a concave surface on the other of the lower and intermediate conveyor housings configured to receive the convex surface and to allow tilting of the intermediate conveyor section relative to the lower conveyor section.

11. The cart of claim 10, wherein the tilt assembly further includes an elastic seal member engaging one of the convex and concave surfaces to keep material from escaping the conveyor housing.

12. The cart of claim 9, wherein the tilt assembly includes at least one trunnion extending from one of the lower and intermediate conveyor housings and at least one bearing assembly on the other housing configured to receive the at least one trunnion.

13. The cart of claim 9, wherein the tilting assembly includes a linear actuator having one end connected to the lower conveyor section and another end connected to the intermediate conveyor section.

14. The cart of claim 9, wherein the folding assembly includes a linear actuator having one end connected to the upper conveyor section and another end connected to one of the lower conveyor section, the intermediate conveyor section, and the frame.

15. The cart of claim 2, wherein the first end of the intermediate conveyor section is aligned with the second end of the intermediate conveyor section.

16. The cart of claim 2, wherein a longitudinal axis of the intermediate conveyor section extends through both the first end of intermediate conveyor section and the second end of the intermediate conveyor section.

17. The cart of claim 2, wherein the folding assembly includes a hinge pin positioned at the second end of the intermediate conveyor section, whereby the intermediate conveyor section and the upper section are configured to pivot about the hinge pin.

18. The cart of claim 2, wherein the folding assembly includes a hinge pin positioned at the first end of the intermediate conveyor section, whereby the upper conveyor section is configured to pivot about the hinge pin.

19. The cart of claim 1, wherein the cart is configured to be pulled by a tractor and wherein the tilt and fold assemblies are configured to be controlled remotely from the tractor by a control system.

20. The cart of claim 19, wherein the control system is configured to only move the upper conveyor section to the stored position when the upper conveyor section is in a predefined tilt position.

21. The cart of claim 19, wherein the control system is configured to automatically move the upper conveyor section to a suitable tilt position before moving the upper conveyor section to the stored position.

22. The cart of claim 1, wherein the upper conveyor section in the stored position extends along a side of the bin.

23. The cart of claim 1, wherein the upper conveyor section in the stored position extends across a front of the bin.

24. The cart of claim 1, wherein the tilt axis and the fold axis are in different planes.

25. The cart of claim 1, wherein the tilt axis and the fold axis are disposed at opposite ends of the intermediate conveyor section.

26. The cart of claim 1, wherein the fold axis extends laterally across the end of the intermediate conveyor section and offset to the longitudinal axis of the intermediate conveyor section.

27. The cart of claim 1, wherein the fold axis extends perpendicular to the longitudinal direction of the intermediate conveyor section.

28. A cart for transporting and conveying agricultural materials comprising:
a frame;
a plurality of wheels coupled with the frame;
a bin supported on the frame and including a plurality of bin walls defining a storage space for an agricultural material;
a conveyor assembly having an intake end configured to receive agricultural material from the bin and a discharge end configured to discharge agricultural material, the conveyor assembly including a lower conveyor section, an intermediate conveyor section, and an upper conveyor section;
the lower conveyor section including a lower conveyor housing and a lower conveyor extending within the lower conveyor housing, the intermediate conveyor section including an intermediate conveyor housing, and the upper conveyor section including an upper conveyor housing and an upper conveyor extending within the upper conveyor housing;
a folding assembly coupled to an end of the intermediate conveyor housing and having a fold axis, the folding assembly configured to move the upper conveyor section between a stored position and an operating position;
a tilting assembly coupled to an end of the intermediate conveyor housing and having a tilt axis, the tilting assembly configured to pivot the upper conveyor section about the tilt axis when the upper conveyor section is in the operating position;
wherein the intermediate conveyor section is disposed between the upper and lower conveyor sections, and wherein the intermediate conveyor section has a first end adjacent the upper conveyor section and a second end adjacent the lower conveyor section; and wherein the fold axis is positioned at the second end of the intermediate conveyor section and the tilt axis is positioned at the first end of the intermediate conveyor section, such that the upper conveyor section is tiltable relative to the intermediate and lower conveyor sections and the upper and intermediate conveyor sections are foldable relative to the lower conveyor section; and wherein the intermediate conveyor section further includes an intermediate conveyor extending within the intermediate conveyor housing, the intermediate conveyor having a first end connected to the upper conveyor and having a second end configured to mate with the lower conveyor when the upper conveyor section is in the operating position and to detach from the lower conveyor when the upper conveyor section is in the stored position.

29. The cart of claim 28, wherein the intermediate conveyor is connected to the upper conveyor via a universal joint.

30. A cart for transporting and conveying agricultural materials comprising:
   a frame;
   a plurality of wheels coupled with the frame;
   a bin supported on the frame and including a plurality of bin walls defining a storage space for an agricultural material;
   a conveyor assembly having an intake end configured to receive agricultural material from the bin and a discharge end configured to discharge agricultural material, the conveyor assembly including a lower conveyor section, an intermediate conveyor section, and an upper conveyor section;
   the lower conveyor section including a lower conveyor housing and a lower conveyor extending within the lower conveyor housing, the intermediate conveyor section including an intermediate conveyor housing, and the upper conveyor section including an upper conveyor housing and an upper conveyor extending within the upper conveyor housing;
   a folding assembly coupled to an end of the intermediate conveyor housing and having a fold axis, the folding assembly configured to move the upper conveyor section between a stored position and an operating position;
   a tilting assembly coupled to an end of the intermediate conveyor housing and having a tilt axis, the tilting assembly configured to pivot the upper conveyor section about the tilt axis when the upper conveyor section is in the operating position;
   wherein the intermediate conveyor section is disposed between the upper and lower conveyor sections, and wherein the intermediate conveyor section has a first end adjacent the upper conveyor section and a second end adjacent the lower conveyor section; and
   wherein the fold axis is positioned at the first end of the intermediate conveyor section and the tilt axis is positioned at the second end of the intermediate conveyor section, such that the upper and intermediate conveyor sections are tiltable relative to the lower conveyor section and the upper conveyor section is foldable relative to the intermediate and lower conveyor sections; and wherein the intermediate conveyor section further includes an intermediate conveyor extending within the intermediate conveyor housing, the intermediate conveyor having a second end connected to the lower conveyor and having a first end configured to mate with the upper conveyor when the upper conveyor section is in the operating position and to detach from the upper conveyor when the upper conveyor section is in the stored position.

31. The cart of claim 30, wherein the intermediate conveyor is connected to the lower conveyor via a universal joint.

32. A cart for transporting and conveying agricultural materials comprising:
   a frame;
   a plurality of wheels coupled with the frame;
   a bin supported on the frame and including a plurality of bin walls defining a storage space for an agricultural material;
   a conveyor assembly having an intake end configured to receive agricultural material from the bin and a discharge end configured to discharge agricultural material, the conveyor assembly including a lower conveyor section, an intermediate conveyor section, and an upper conveyor section;
   the lower conveyor section including a lower conveyor housing and a lower conveyor extending within the lower conveyor housing, the intermediate conveyor section including an intermediate conveyor housing, and the upper conveyor section including an upper conveyor housing and an upper conveyor extending within the upper conveyor housing;
   a folding assembly coupled to an end of the intermediate conveyor housing and having a fold axis, the folding assembly configured to move the upper conveyor section between a stored position and an operating position;
   a tilting assembly coupled to an end of the intermediate conveyor housing and having a tilt axis, the tilting assembly configured to pivot the upper conveyor section about the tilt axis when the upper conveyor section is in the operating position;
   wherein an intermediate conveyor extending within the intermediate conveyor housing is connected to one of the upper and lower conveyors via a universal joint when the upper conveyor section is in the operating position.

* * * * *